US012281683B2

(12) United States Patent
Markison

(10) Patent No.: US 12,281,683 B2
(45) Date of Patent: Apr. 22, 2025

(54) DEFUSING CELL FOR IMPACT FORCE DEFUSION

(71) Applicant: Timothy W. Markison, Mesa, AZ (US)

(72) Inventor: Timothy W. Markison, Mesa, AZ (US)

( * ) Notice: Subject to any disclaimer, the term of this patent is extended or adjusted under 35 U.S.C. 154(b) by 1211 days.

(21) Appl. No.: 16/947,069

(22) Filed: Jul. 16, 2020

(65) Prior Publication Data
US 2020/0347902 A1 Nov. 5, 2020

Related U.S. Application Data

(63) Continuation-in-part of application No. 15/677,918, filed on Aug. 15, 2017, now Pat. No. 10,716,342.
(Continued)

(51) Int. Cl.
| | |
|---|---|
| *F16F 1/44* | (2006.01) |
| *A63B 71/12* | (2006.01) |
| *B32B 3/08* | (2006.01) |
| *B32B 3/20* | (2006.01) |
| *B32B 3/30* | (2006.01) |
| *A42B 3/06* | (2006.01) |
| *A63B 71/08* | (2006.01) |
| *A63B 71/10* | (2006.01) |
| *F16F 7/00* | (2006.01) |

(52) U.S. Cl.
CPC .............. *F16F 1/445* (2013.01); *A63B 71/12* (2013.01); *B32B 3/08* (2013.01); *B32B 3/20* (2013.01); *B32B 3/30* (2013.01); *A42B 3/06* (2013.01); *A63B 71/08* (2013.01); *A63B 71/10* (2013.01); *A63B 2071/1208* (2013.01); *B32B 2307/56* (2013.01); *B32B 2437/04* (2013.01); *B32B 2571/00* (2013.01); *F16F 7/00* (2013.01); *F16F 2236/045* (2013.01)

(58) Field of Classification Search
CPC ......... A63B 71/08; A63B 71/10; A63B 71/12; A63B 2071/1208; B32B 3/08; B32B 3/20; B32B 3/30; B32B 2307/56; B32B 437/04; B32B 2571/00; F16F 1/445; F16F 7/00; F16F 2236/045
USPC .............................. 2/410–414; 267/152, 153
See application file for complete search history.

(56) References Cited

U.S. PATENT DOCUMENTS

| | | |
|---|---|---|
| 2,768,919 A | 10/1956 | Bjorksten |
| 5,431,396 A | 7/1995 | Shieh |
| (Continued) | | |

OTHER PUBLICATIONS

International Searching Authority; International Search Report and Written Opinion; International Application No. PCT/US2017/046992; Oct. 30, 2017; 11 pgs.

*Primary Examiner* — Christopher P Schwartz
(74) *Attorney, Agent, or Firm* — Garlick & Markison; Timothy W. Markison

(57) ABSTRACT

A defusing cell includes walls and spheroid elements. The walls are physically connected together to form a first perimeter, a second perimeter, and a hollow center region. A wall has a length and is an angle with respect to the first perimeter. The first perimeter is separated from the second perimeter by a distance based on the length and an angle of the wall. The second perimeter is larger than the first perimeter. The spheroid elements are arranged in a pattern to distribute and disperse an impact force impacting the defusing cell from the second perimeter with respect to the first perimeter.

7 Claims, 58 Drawing Sheets

Related U.S. Application Data

(60) Provisional application No. 62/375,767, filed on Aug. 16, 2016.

(56) References Cited

U.S. PATENT DOCUMENTS

| | | | |
|---|---|---|---|
| 5,766,094 A | 6/1998 | Mahaffey | |
| 5,918,309 A | 7/1999 | Bachner, Jr. | |
| RE36,950 E * | 11/2000 | Allen | A63B 53/0466 |
| | | | 473/409 |
| 7,827,897 B2 | 11/2010 | Magnusson | |
| 8,524,338 B2 * | 9/2013 | Anderson | A41D 13/0155 |
| | | | 428/34.1 |
| 8,621,973 B2 | 1/2014 | Abbe | |
| 8,631,592 B2 | 1/2014 | Adair | |
| 8,707,586 B2 | 4/2014 | Adair | |
| 8,938,893 B2 | 1/2015 | Adair | |
| 9,022,873 B2 | 5/2015 | Ramirez | |
| 9,023,441 B2 * | 5/2015 | Anderson | A42B 3/121 |
| | | | 428/34.1 |
| 9,212,413 B2 | 12/2015 | Wang | |
| 9,248,364 B2 | 2/2016 | Ramirez | |
| 9,295,300 B2 | 3/2016 | Adair | |
| 9,314,060 B2 | 4/2016 | Giles | |
| 9,332,799 B1 * | 5/2016 | Wenner | A42B 3/064 |
| 9,506,194 B2 | 11/2016 | Schweiger | |
| 9,538,798 B2 | 1/2017 | Toronjo | |
| 9,545,129 B2 | 1/2017 | Adair | |
| 9,586,126 B2 | 3/2017 | Ramirez | |
| 9,603,412 B2 | 3/2017 | Adair | |
| 9,629,397 B2 | 4/2017 | Toronjo | |
| 9,669,283 B2 | 6/2017 | Ramirez | |
| 9,717,302 B2 | 8/2017 | Adair | |
| 9,738,395 B2 | 8/2017 | Martindale | |
| 9,835,429 B2 | 12/2017 | Kerns | |
| 9,863,732 B2 | 1/2018 | Curliss | |
| 9,936,755 B2 | 4/2018 | Blakely | |
| 9,943,746 B2 * | 4/2018 | Kennard | A42B 3/064 |
| 9,944,403 B2 | 4/2018 | Park | |
| 9,949,518 B2 | 4/2018 | Toronjo | |
| 9,961,957 B2 | 5/2018 | Adair | |
| 9,975,645 B2 | 5/2018 | Hemingway | |
| 9,982,736 B2 | 5/2018 | Greenhill | |
| 10,065,101 B2 | 9/2018 | Ramirez | |
| 10,092,057 B2 | 10/2018 | Kovarik | |
| 10,092,061 B2 | 10/2018 | Adair | |
| 10,113,848 B2 | 10/2018 | Germani | |
| 10,161,721 B2 | 12/2018 | Roland | |
| 10,189,576 B2 | 1/2019 | Martindale | |
| 10,195,815 B2 | 2/2019 | Toronjo | |
| 10,219,572 B1 | 3/2019 | Whitcomb | |
| 10,653,193 B2 * | 5/2020 | Markison | B32B 25/045 |
| 10,716,342 B2 * | 7/2020 | Markison | B32B 25/045 |
| 11,122,848 B2 * | 9/2021 | Albertelli | A42B 3/128 |
| 2002/0019265 A1 | 2/2002 | Allen | |
| 2005/0246824 A1 | 11/2005 | Berger | |
| 2008/0076595 A1 | 3/2008 | Lai | |
| 2008/0141852 A1 | 6/2008 | Warren | |
| 2009/0217812 A1 | 9/2009 | Whitaker | |
| 2010/0300275 A1 | 12/2010 | Warren | |
| 2010/0323812 A1 | 12/2010 | Boyd | |
| 2011/0023693 A1 | 2/2011 | Warren | |
| 2011/0059291 A1 | 3/2011 | Boyce | |
| 2011/0117310 A1 * | 5/2011 | Anderson | A41D 13/0155 |
| | | | 428/80 |
| 2011/0271824 A1 | 11/2011 | Wahlquist | |
| 2011/0281665 A1 | 11/2011 | Kawaguchi | |
| 2011/0290104 A1 | 12/2011 | Warren | |
| 2012/0090453 A1 | 4/2012 | Cohen | |
| 2012/0216668 A9 | 8/2012 | Cohen | |
| 2012/0227284 A1 | 9/2012 | Adair | |
| 2012/0227285 A1 | 9/2012 | Adair | |
| 2012/0266745 A1 | 10/2012 | Warren | |
| 2013/0227860 A1 | 9/2013 | Adair | |
| 2013/0232819 A1 | 9/2013 | Adair | |
| 2013/0291405 A1 | 11/2013 | Adair | |
| 2013/0291406 A1 | 11/2013 | Adair | |
| 2013/0291407 A1 | 11/2013 | Adair | |
| 2013/0298316 A1 | 11/2013 | Jacob | |
| 2013/0340150 A1 | 12/2013 | Brantley | |
| 2014/0038737 A1 | 2/2014 | Roach | |
| 2014/0130378 A1 | 5/2014 | Adair | |
| 2014/0208486 A1 | 7/2014 | Krueger | |
| 2014/0230285 A1 | 8/2014 | Adair | |
| 2014/0323237 A1 | 10/2014 | Beno | |
| 2015/0045141 A1 | 2/2015 | Myrhum | |
| 2015/0072800 A1 | 3/2015 | Franklin | |
| 2015/0082663 A1 | 3/2015 | Adair | |
| 2015/0082664 A1 | 3/2015 | Adair | |
| 2015/0082665 A1 | 3/2015 | Adair | |
| 2015/0089837 A1 | 4/2015 | Adair | |
| 2015/0089838 A1 | 4/2015 | Adair | |
| 2015/0164172 A1 | 6/2015 | Linares | |
| 2015/0264991 A1 | 9/2015 | Frey | |
| 2015/0327619 A1 | 11/2015 | Leon | |
| 2015/0377593 A1 | 12/2015 | Walters | |
| 2016/0095362 A1 | 4/2016 | Alomar | |
| 2016/0095363 A1 | 4/2016 | Alomar | |
| 2016/0263449 A1 | 9/2016 | Morales | |
| 2017/0016503 A1 | 1/2017 | Teshima | |
| 2017/0347741 A1 | 12/2017 | Manera | |
| 2018/0049484 A1 | 2/2018 | Markison | |
| 2018/0049485 A1 | 2/2018 | Markison | |
| 2018/0049503 A1 | 2/2018 | Markison | |
| 2018/0049504 A1 | 2/2018 | Markison | |
| 2019/0000161 A1 | 1/2019 | Alomar | |
| 2019/0029360 A1 | 1/2019 | Adair | |
| 2020/0275714 A1 * | 9/2020 | Markison | A42B 3/064 |

* cited by examiner body impact protection system 10

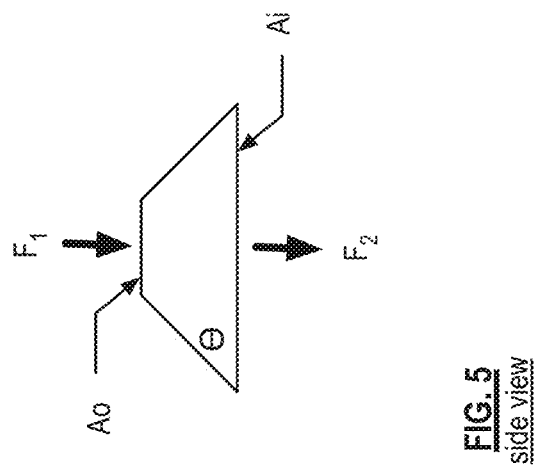
FIG. 5
side view
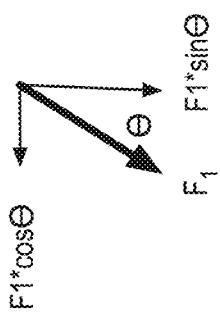
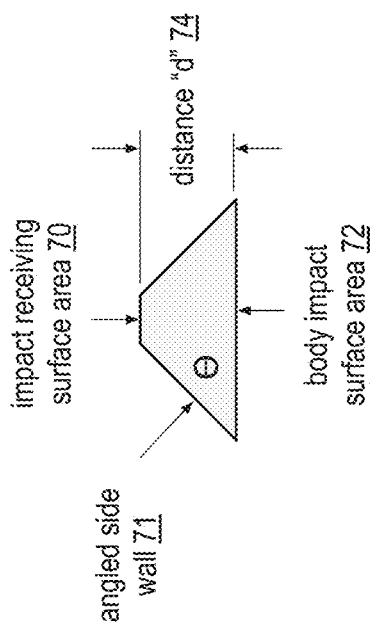
FIG. 4
side view
component 16 body impact protection system 10

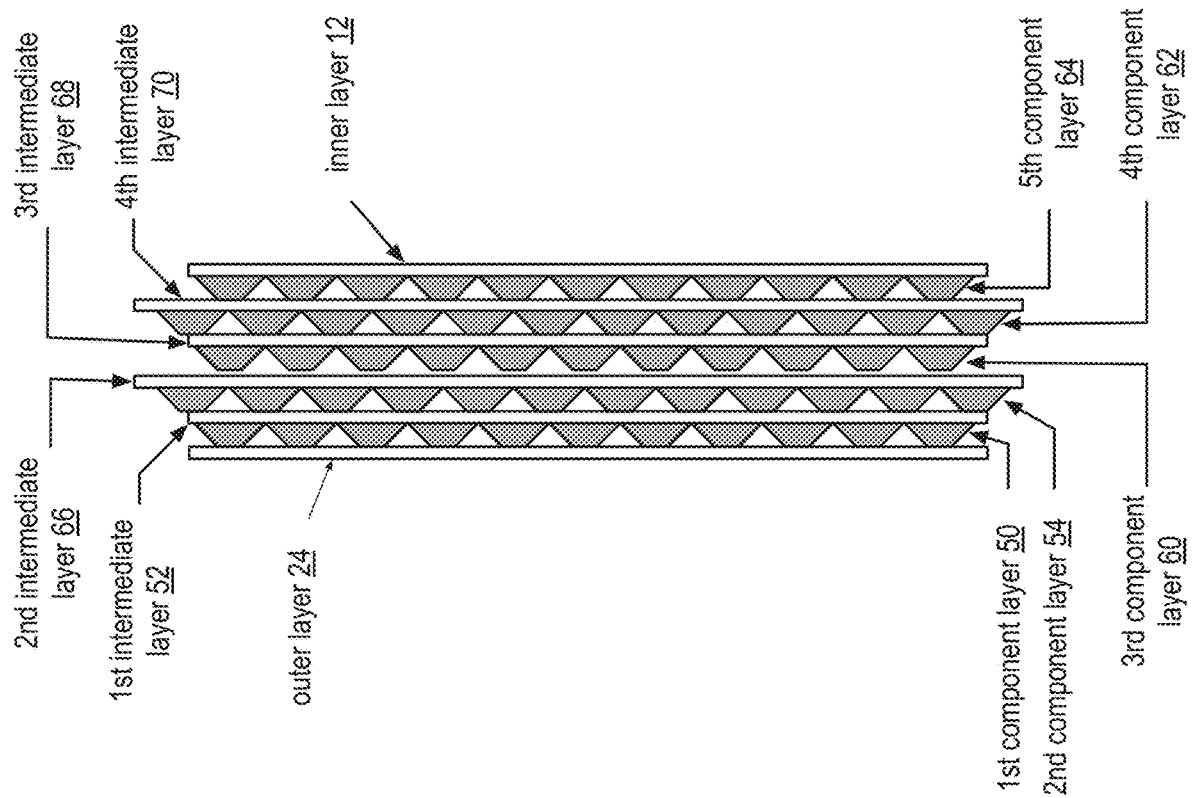

2nd component layer 54

1st component layer 50
system impact area 20

4th component layer 62

3rd component layer 60

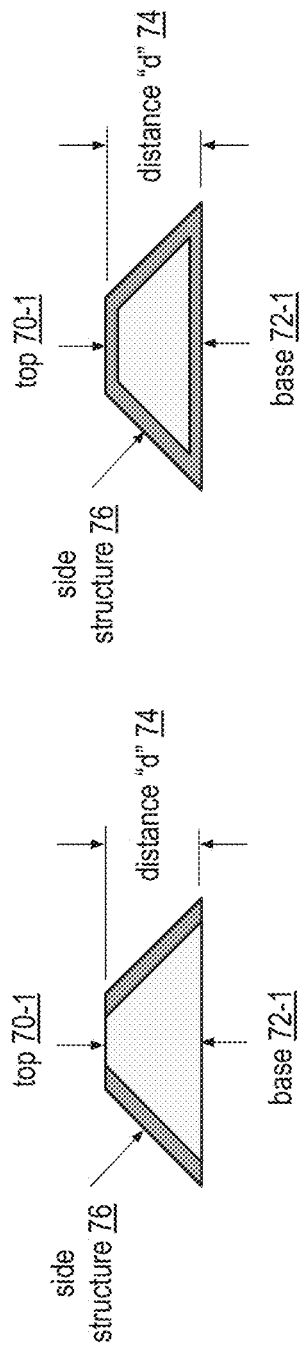

top view top view top view top view top view top view

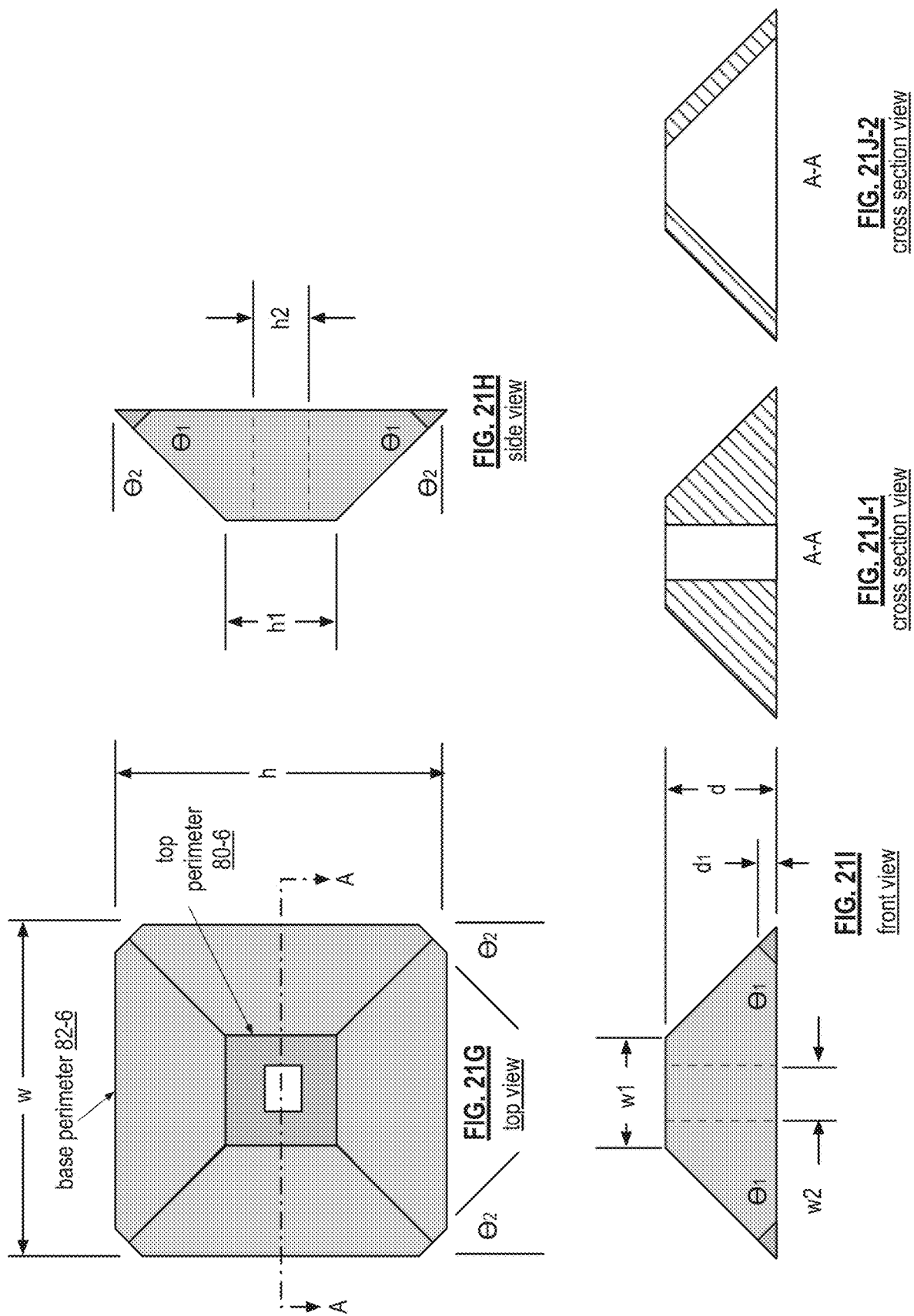

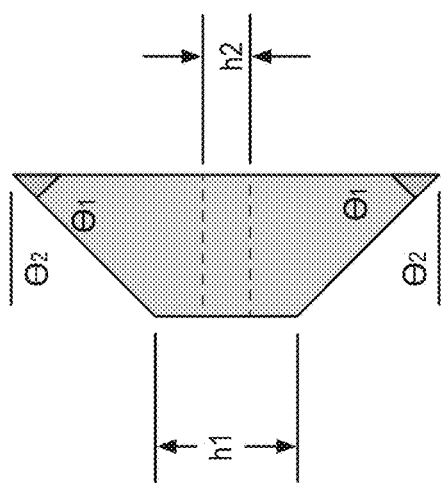
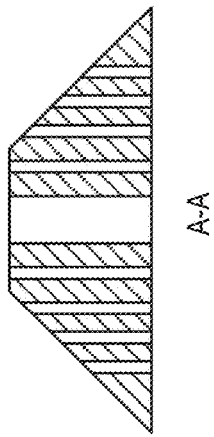
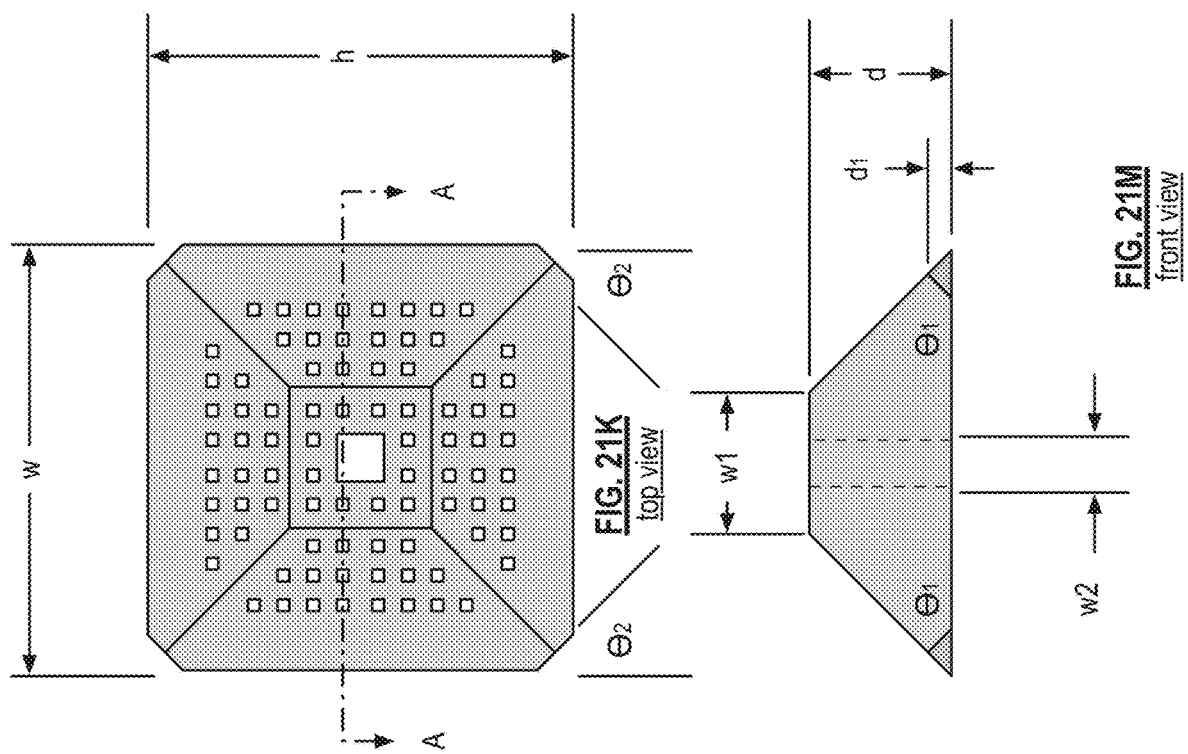
FIG. 21L side view
FIG. 21N cross section view
FIG. 21K top view
FIG. 21M front view

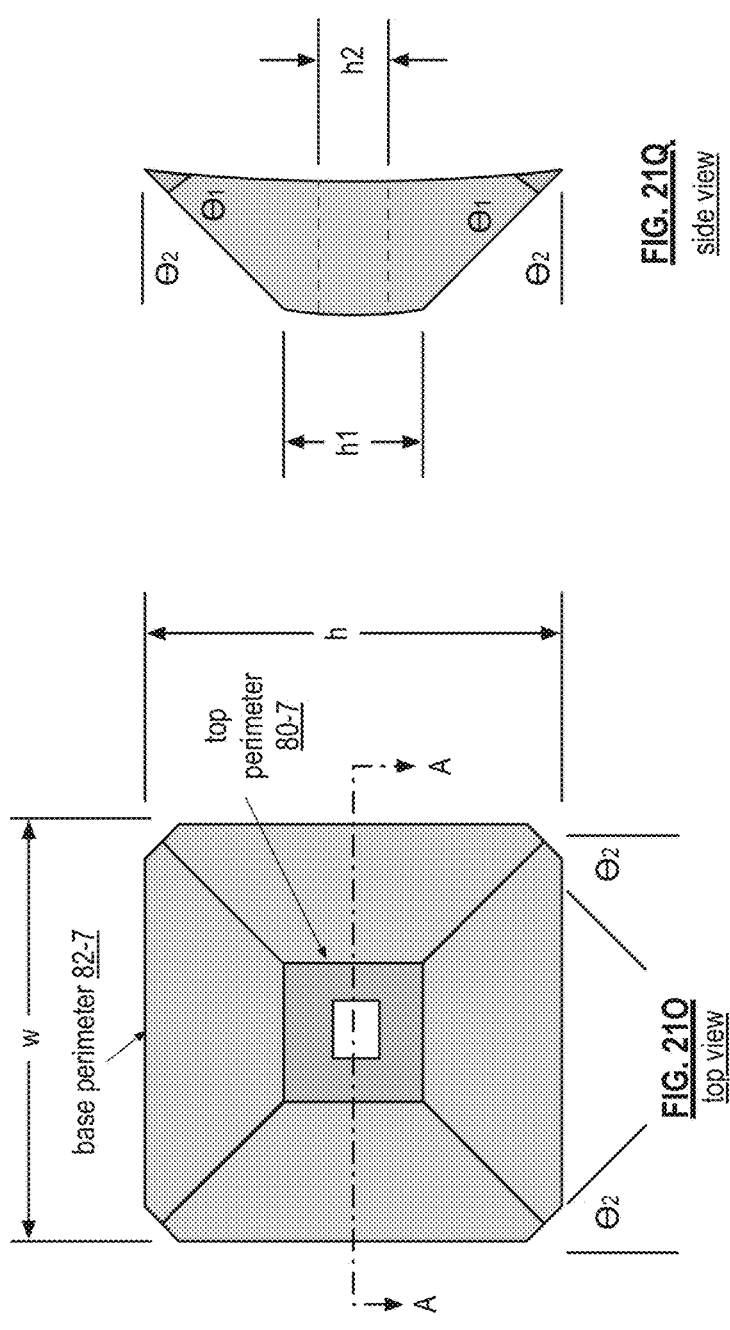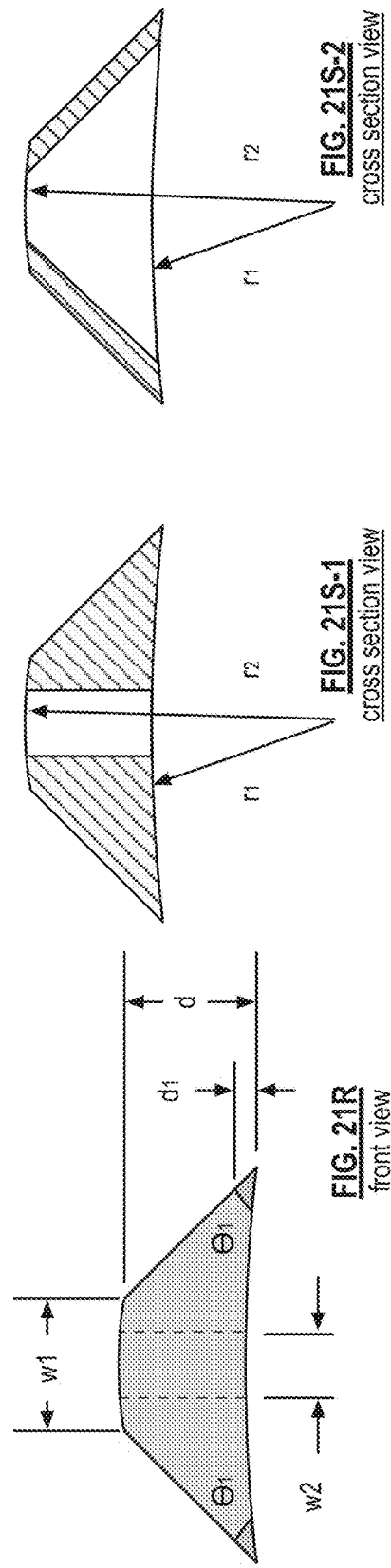

cross-section a-a top view front view bottom view

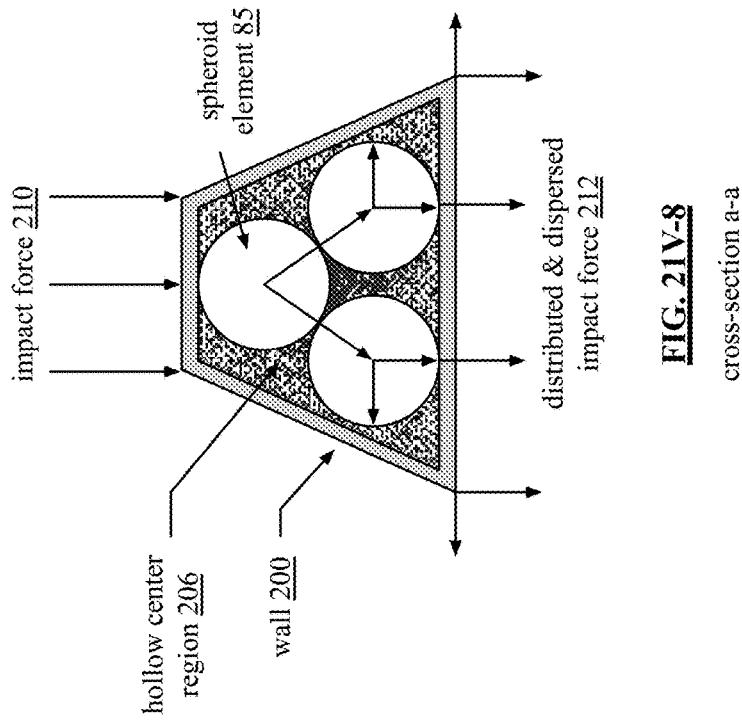
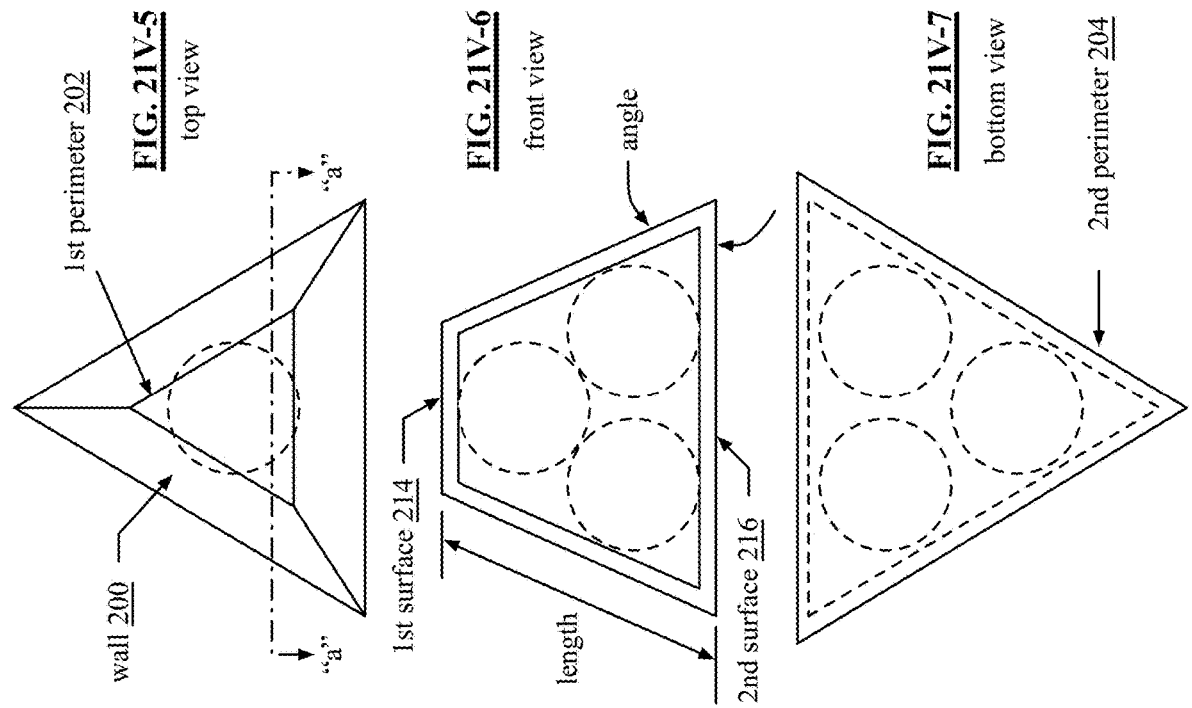

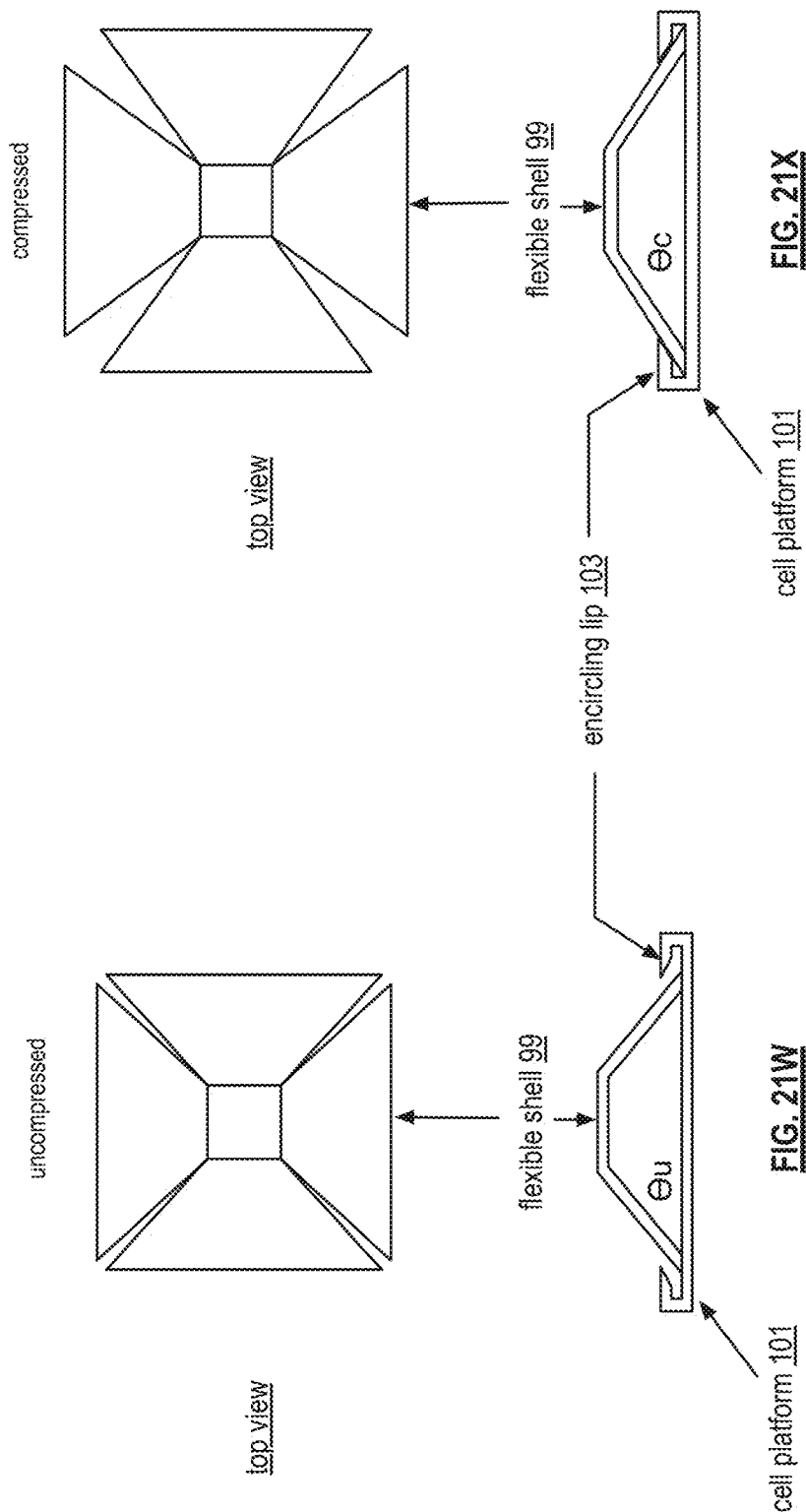

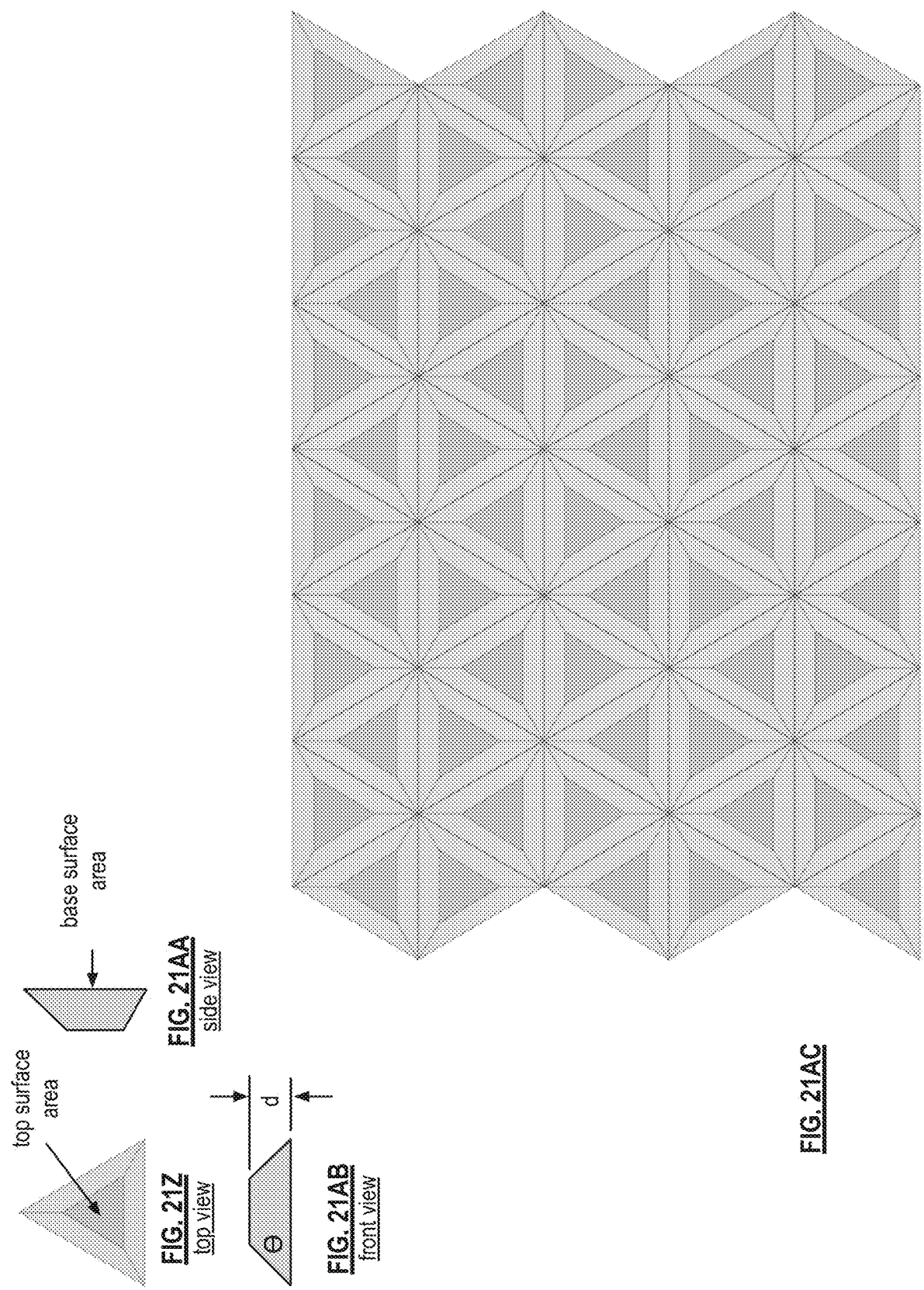

chest protector 135 chest protector 135

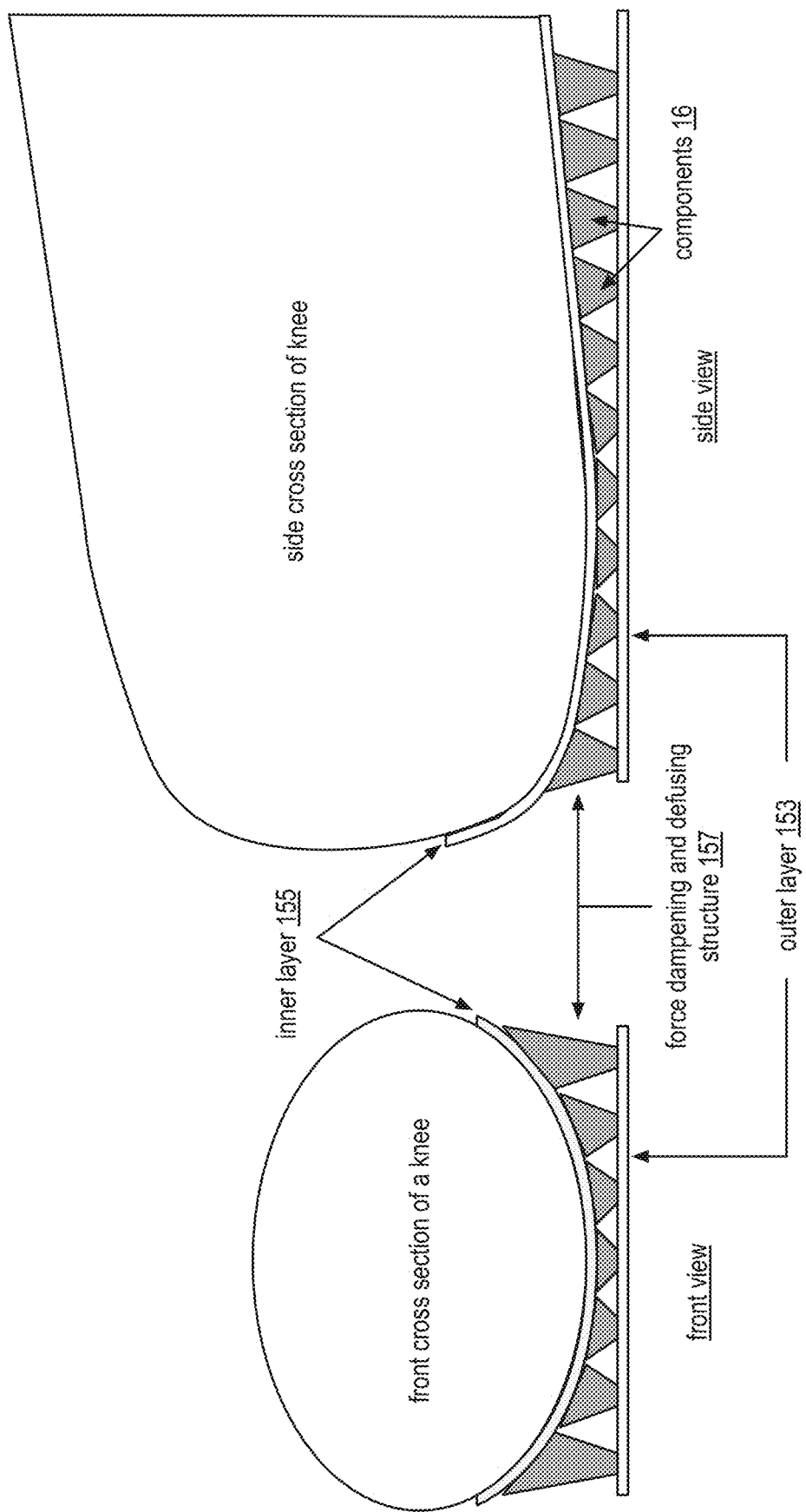

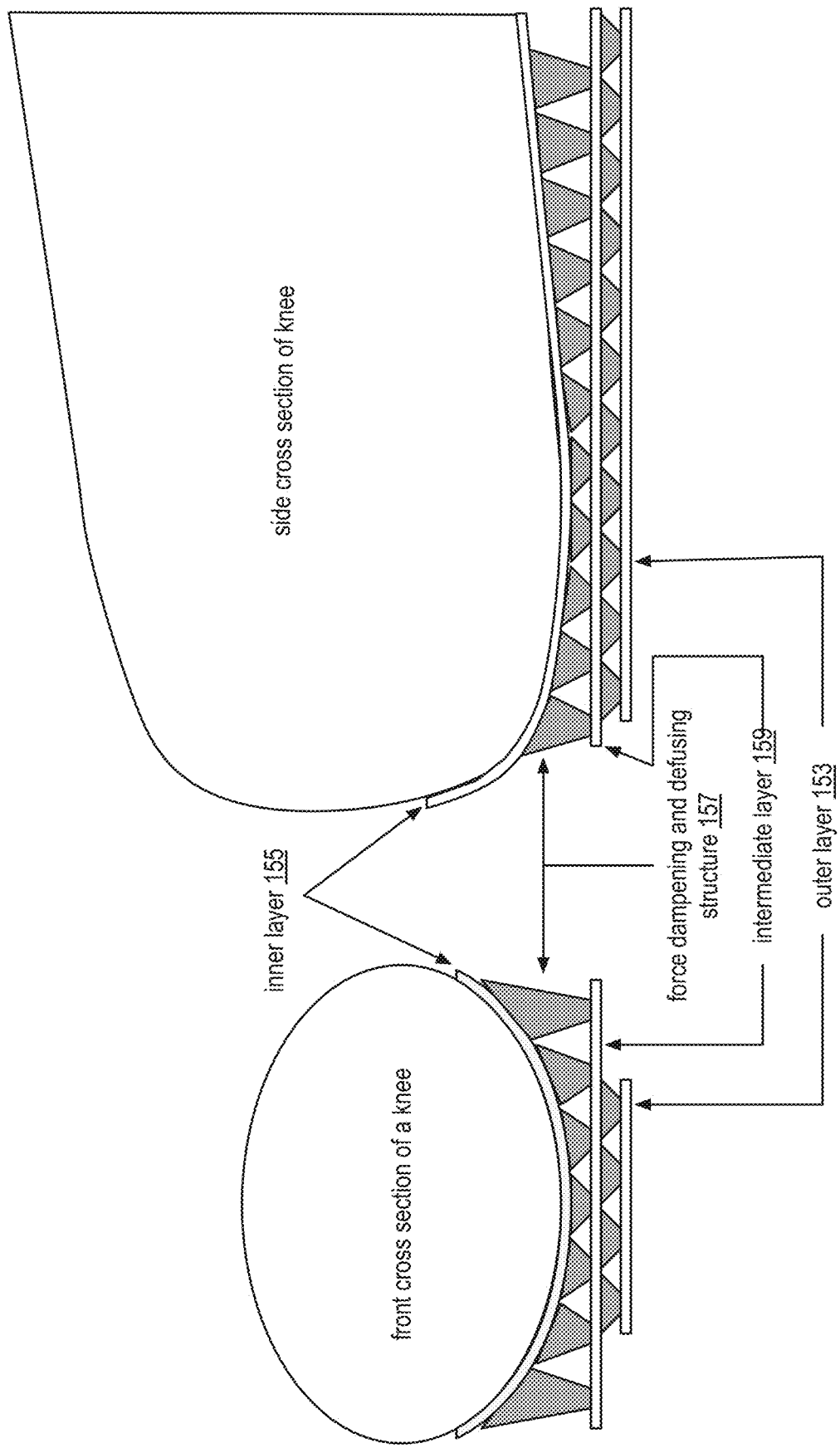

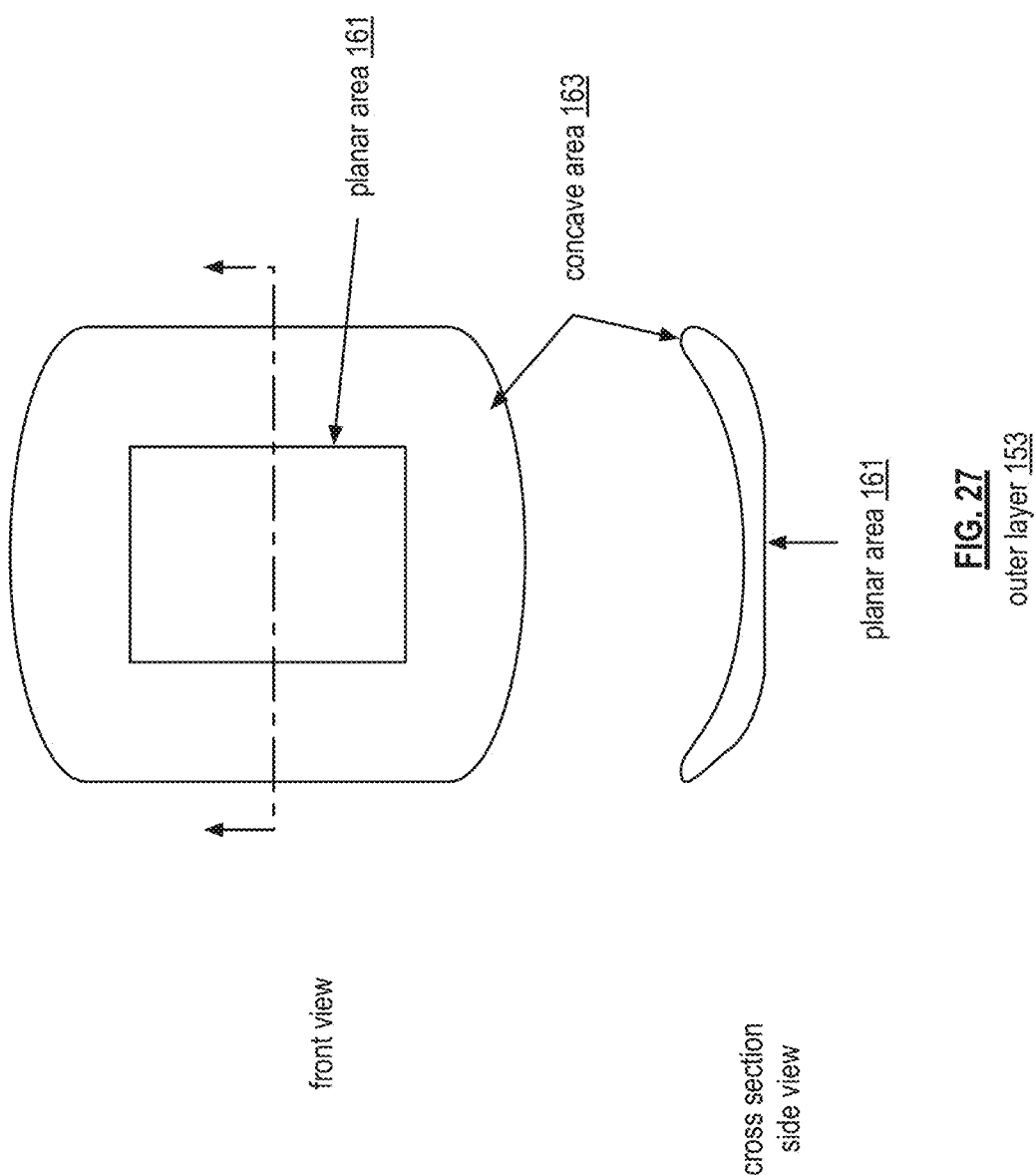

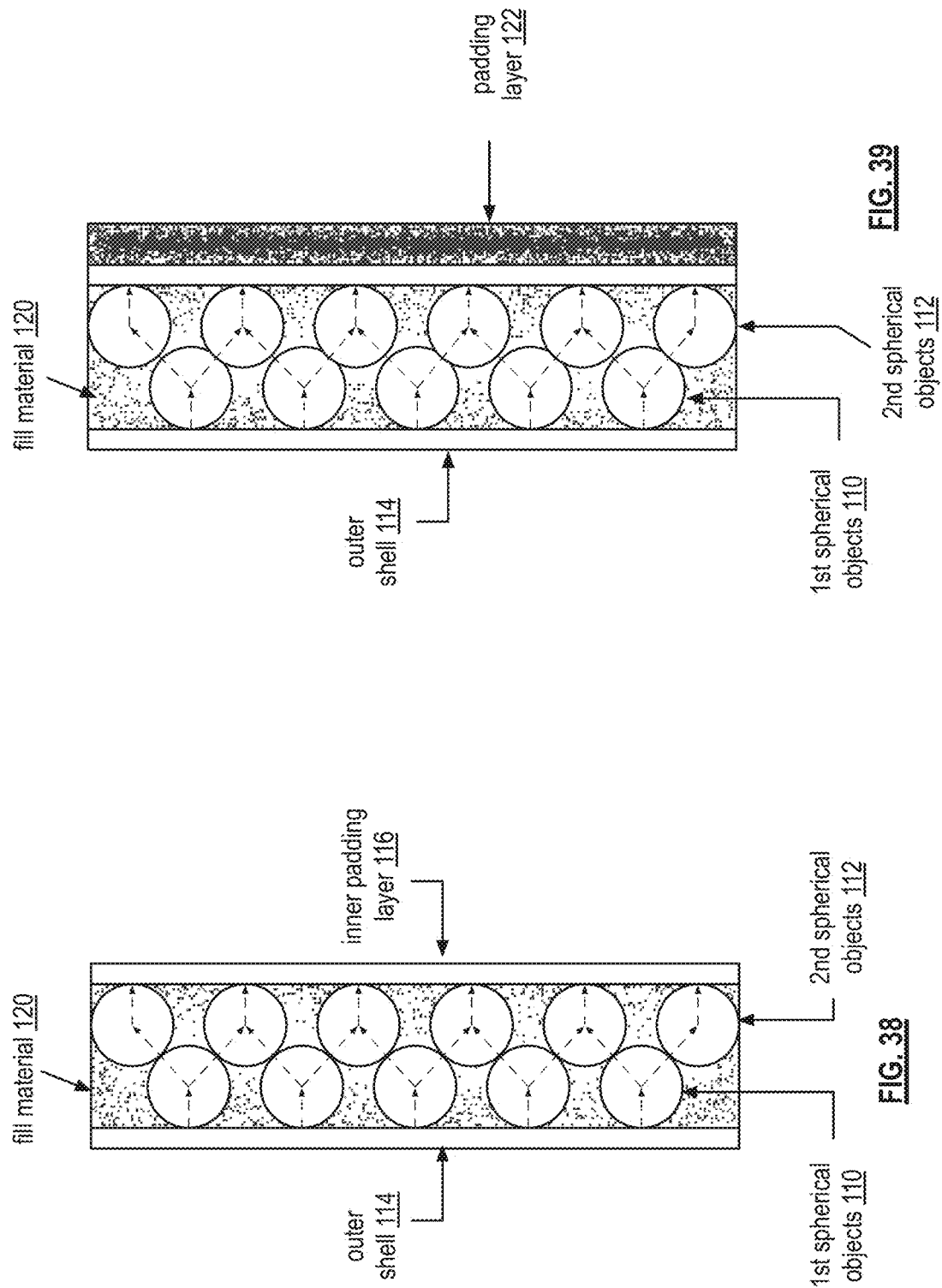

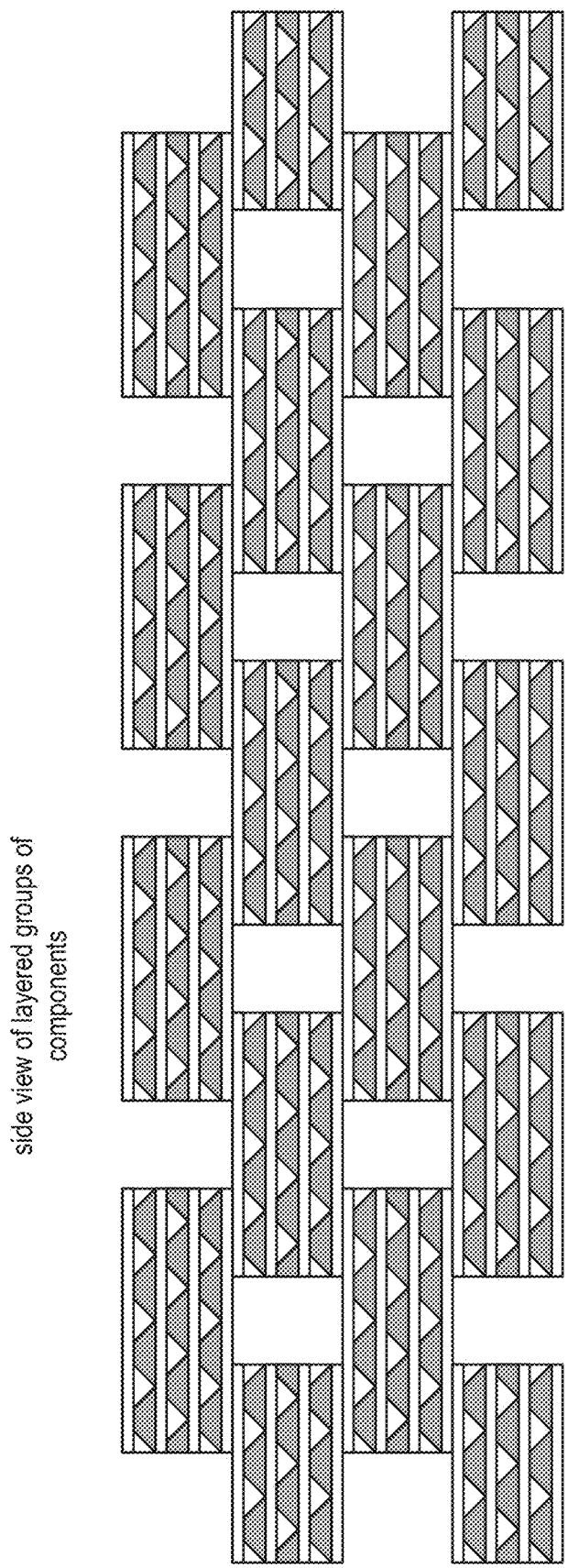

DEFUSING CELL FOR IMPACT FORCE DEFUSION

CROSS REFERENCE TO RELATED PATENTS

The present U.S. Utility patent application claims priority pursuant to 35 U.S.C. § 120 as a continuation-in-part of U.S. patent application Ser. No. 15/677,918, entitled "FORCE DEFUSING STRUCTURE," filed Aug. 15, 2017, which claims priority pursuant to 35 U.S.C. § 119(e) to U.S. Provisional Application No. 62/375,767, entitled "BODY IMPACT PROTECTION SYSTEM," filed Aug. 16, 2016; both of which are hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to impact protection and more particularly to a protection system that reduces impact pressure resulting from an impact force.

Description of Related Art

Impact protection devices are known to reduce injury to a body part as a result of an impact. Most impact protecting devices include an outer shell and padding to protect the body part, which may be a limb, a joint, a portion of a limb, the back, ribs, the chest, the abdomen, the neck, and/or the head. For example, the impact protecting device is a helmet when the body part is a head.

For most helmets, the outer shell is a rigid material such as plastic, polycarbonate, etc. and the padding includes foam, air bladders, or a combination thereof. Vicis™ makes a football helmet that includes a softer outer shell, a 1½ inch thick core layer, and a foam based form liner.

As is generally accepted in the medical community, a concussion results from a sudden acceleration or deceleration of the head. Such rapid acceleration and declaration of the head can result from a car cash or violent shaking. This medical premise forms the basis for which helmets are tested. The testing of football helmets and other helmets involves dropping a headform wearing the helmet from various heights on to a platform and measuring g-forces from the impact. Thus, helmets are designed to pass g-force based testing.

G-force, however, is not a measure of force. It is a measure of acceleration or deceleration with respect to earth's gravitational field. Thus, for an impact, G-force is a measure of how fast the object decelerations with respect to the earth's gravity. In equation for, G-Force=a/g, where "g" is gravitational force of 32.2 ft/s$^2$ and "a" is the deceleration of the object from impact, where a=v$^2$/2*d, where "v" is the velocity at impact and "d" is the impact distance. With G-force being the unit of measure for testing helmets, the only variable in reducing G-Force is impact distance "d". Thus, increasing impact distance is the only way to improve G-force based testing result of helmets. Accordingly, helmets are designed to increase impact distance.

BRIEF DESCRIPTION OF THE SEVERAL VIEWS OF THE DRAWING(S)

FIG. 5 is a schematic block diagram, in a side view, of an example of force dampening and diffusion by a defusing cell (i.e., component) of a layer of a body impact protection system in accordance with the present invention;

FIG. 15 is a schematic block diagram, in a side view, of another embodiment of a body impact protection system in accordance with the present invention;

FIG. 19 is a schematic block diagram, in a side view, of another embodiment of a defusing cell of a layer of a body impact protection system in accordance with the present invention;

FIG. 20 is a schematic block diagram, in a side view, of another embodiment of a defusing cell of a layer of a body impact protection system in accordance with the present invention;

FIGS. 21A-21F are a schematic block diagrams, in a top view, of other embodiments of a defusing cell of a layer of a body impact protection system in accordance with the present invention;

FIGS. 21G-21J-2 are diagrams of another defusing cell or component in accordance with the present invention;

FIGS. 21K-21N are diagrams of another defusing cell or component in accordance with the present invention;

FIGS. 21O and 21Q-21S-2 are diagrams of another defusing cell or component in accordance with the present invention;

FIGS. 21V-1 through 21V-4 are diagrams of an embodiment of a defusing cell or component in accordance with the present invention;

FIGS. 21V-5 through 21V-8 are diagrams of another embodiment of a defusing cell or component in accordance with the present invention;

FIGS. 21W-21X are diagrams of another defusing cell or component in accordance with the present invention;

Figure 21B:
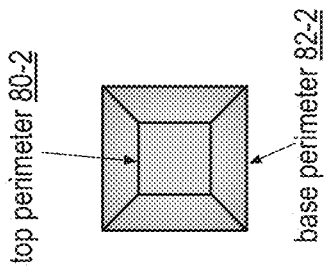
Figure 21B:
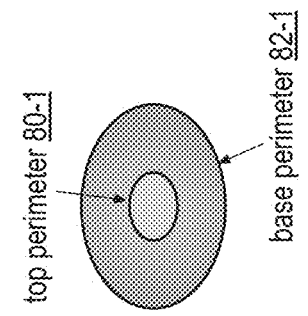
Figure 21A:
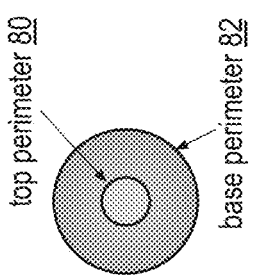
Figure 22:
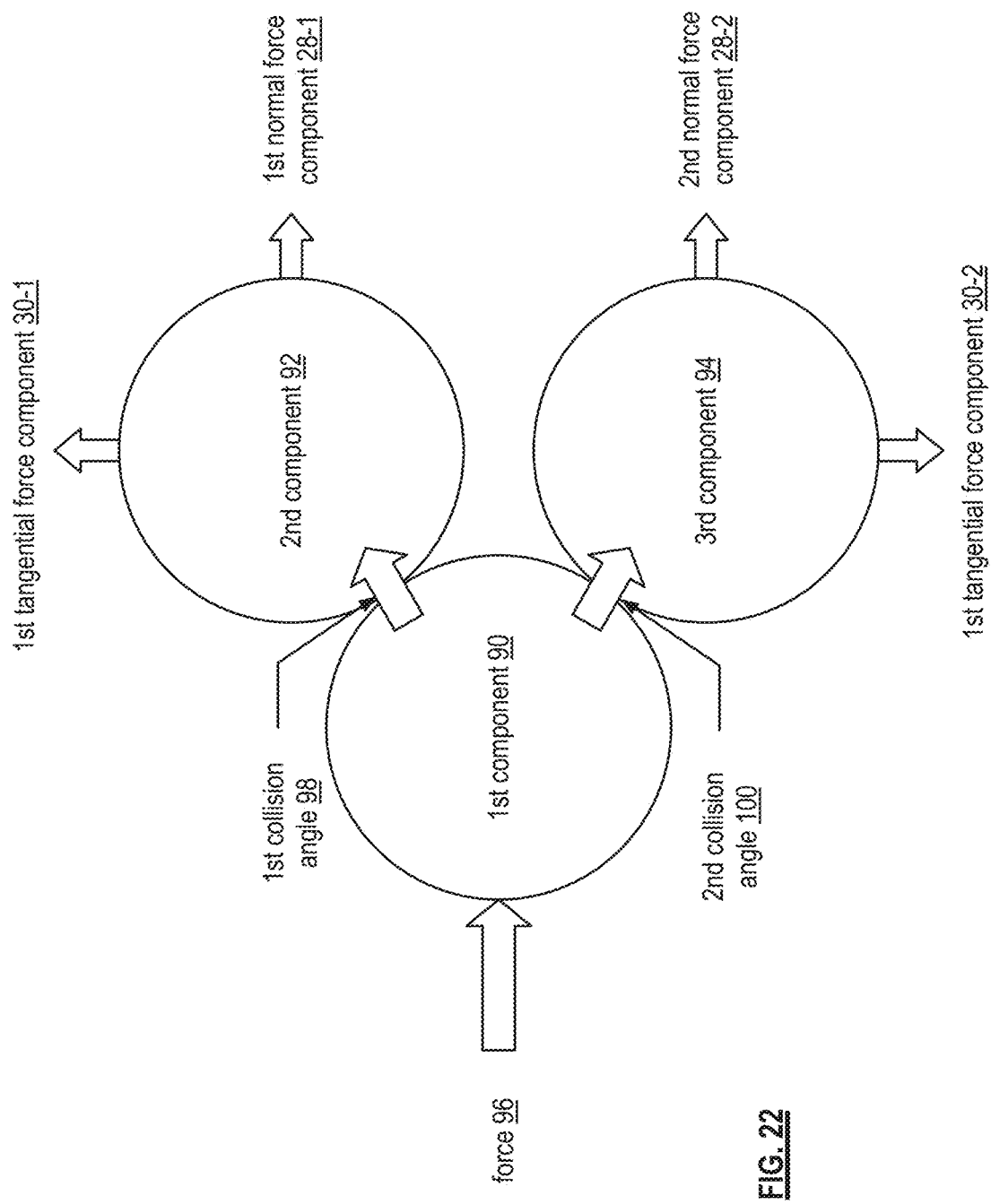
Figure 23B:
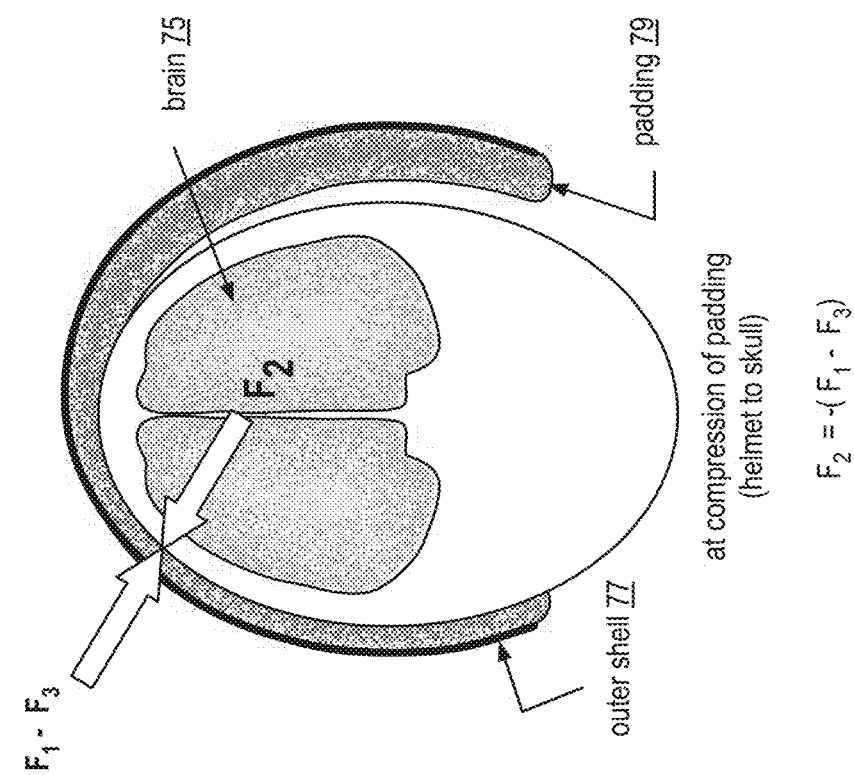
Figure 23A:
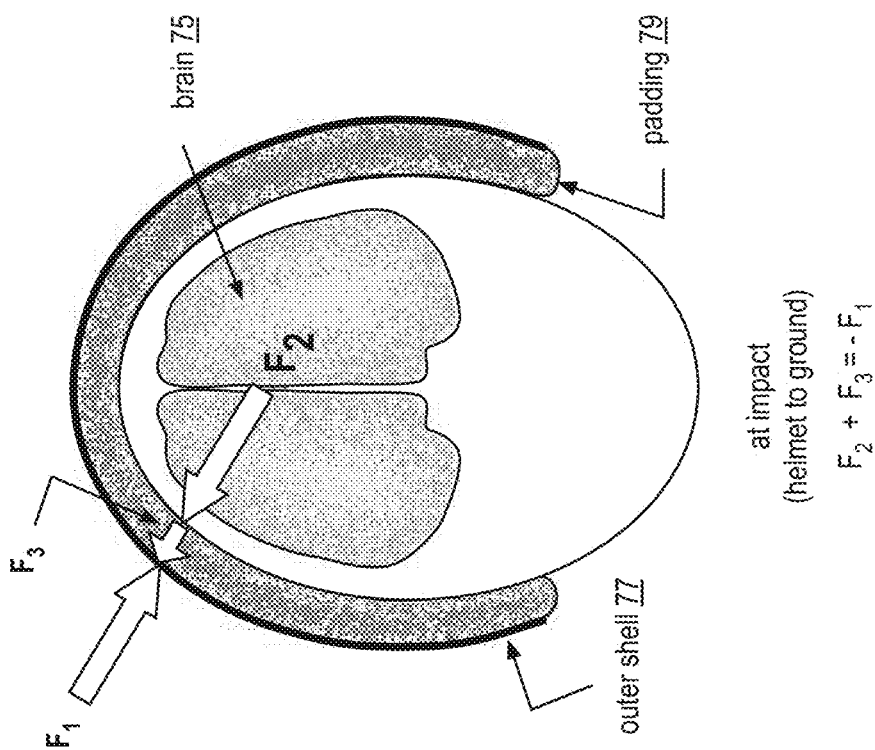

FIGS. 21Z-21AB are diagrams of another defusing cell or component in accordance with the present invention;

FIG. 21AC is a top view of a layer of components in accordance with the present invention;

FIG. 21AD is a top view of a layer of components in accordance with the present invention;

FIG. 21AE is a top view of a layer of components in accordance with the present invention;

FIG. 21AF is a top view of two overlapping layers of components in accordance with the present invention;

FIG. 22 is a schematic block diagram, in a side view, of another embodiment of a layer of a body impact protection system in accordance with the present invention;

FIG. 23A is a schematic block diagram, in a cross section front view, of an embodiment of a helmet at the instant of an impact.

FIG. 23B is a schematic block diagram, in a cross section front view, of an embodiment of a helmet at compression of the padding as result of an impact.

Figure 23C:
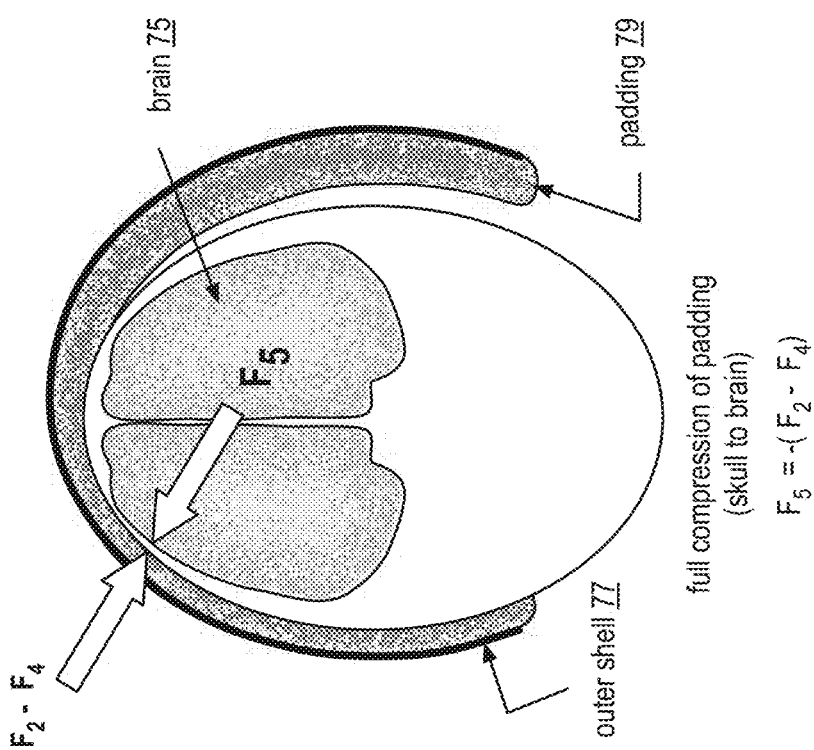

FIG. 23C is a schematic block diagram, in a cross section front view, of an embodiment of a helmet at movement of the brain within the skull as result of an impact.

Figure 23D:
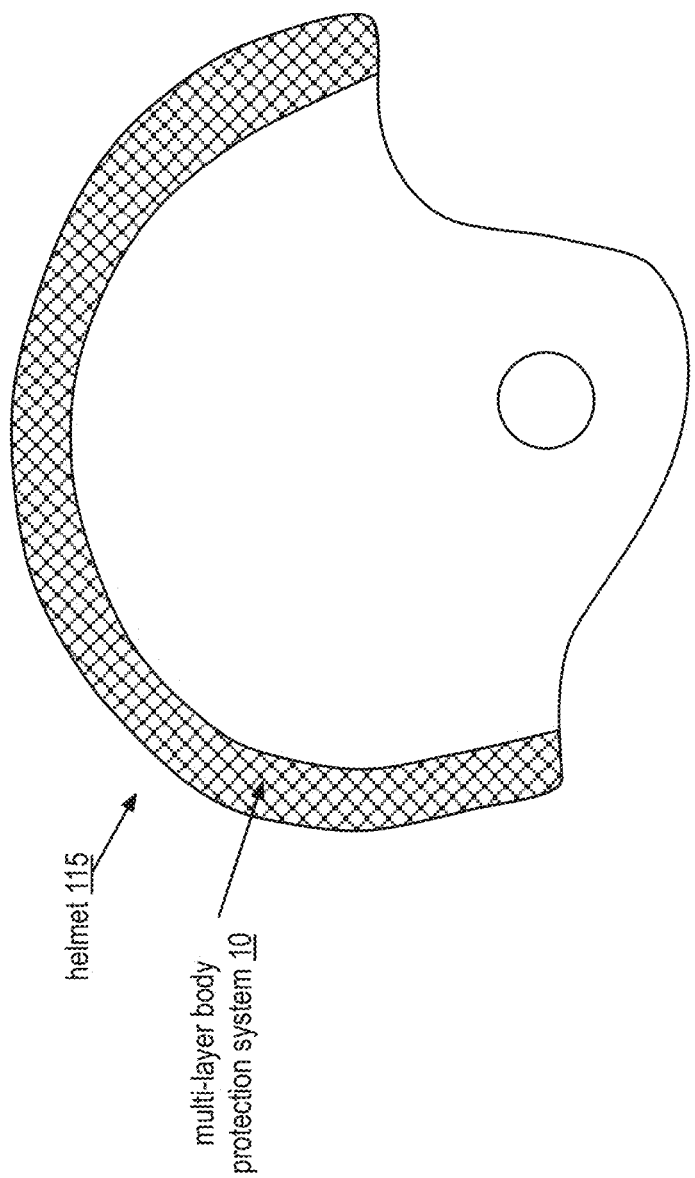
Figure 23E:
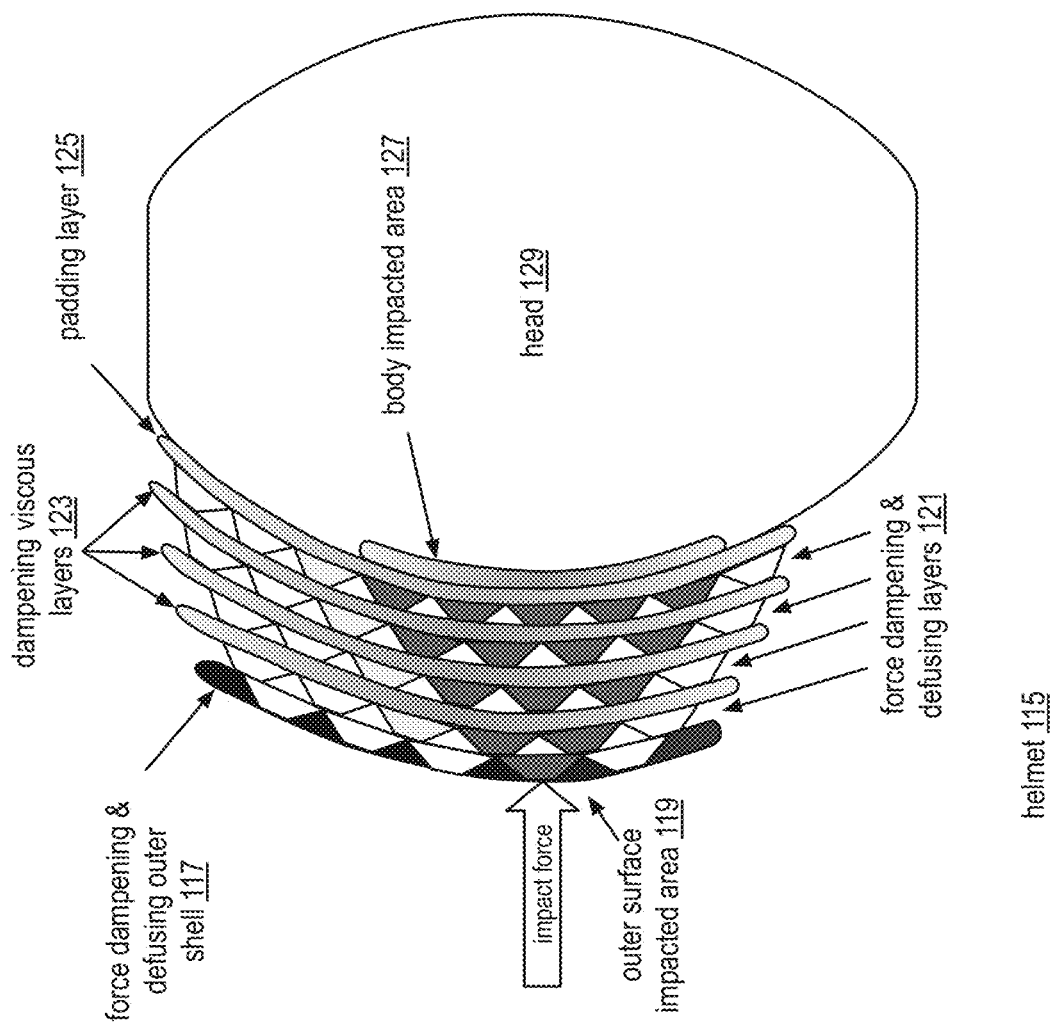
Figure 23G:
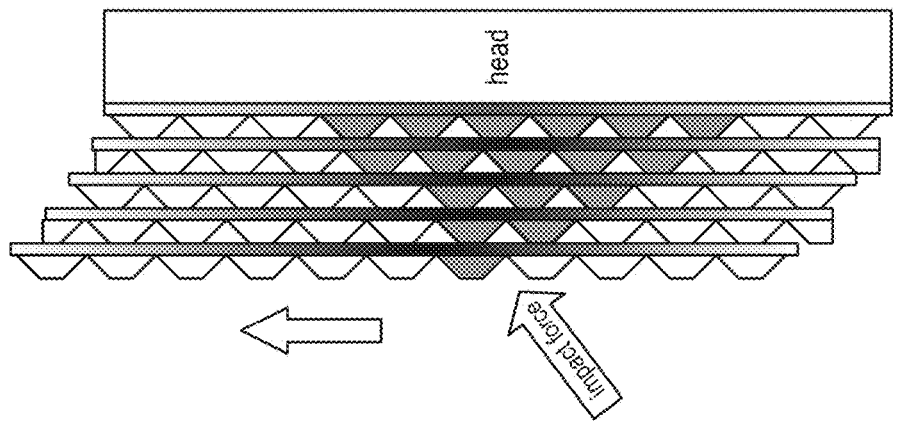
Figure 23F:
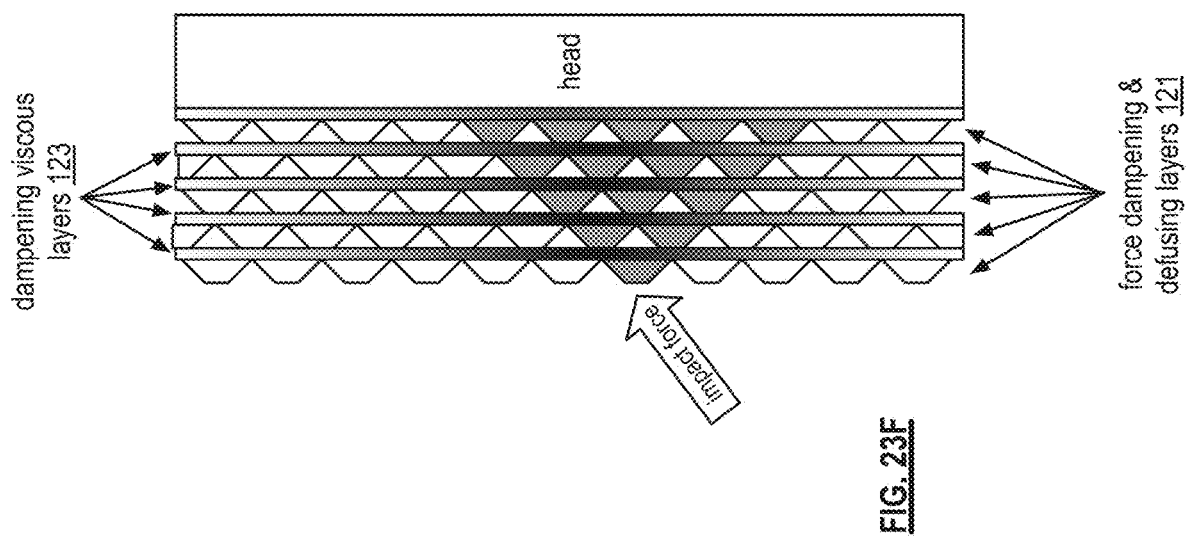
Figure 24B:
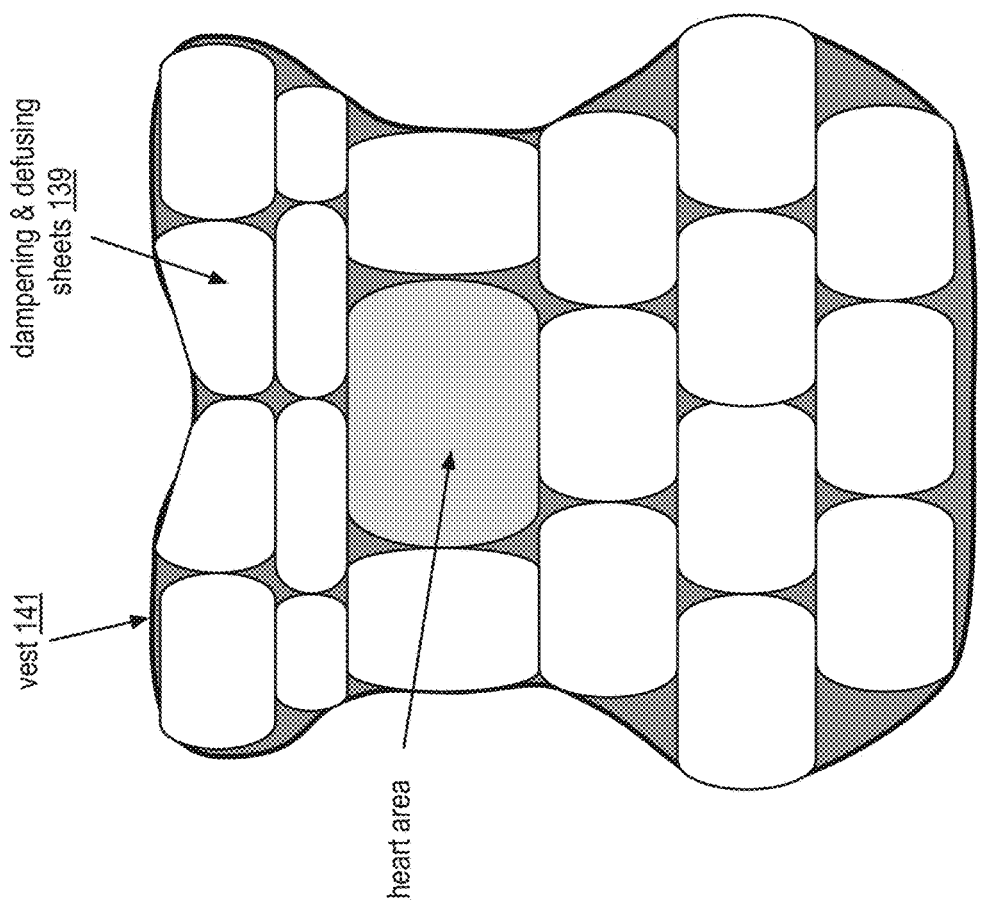
Figure 24A:
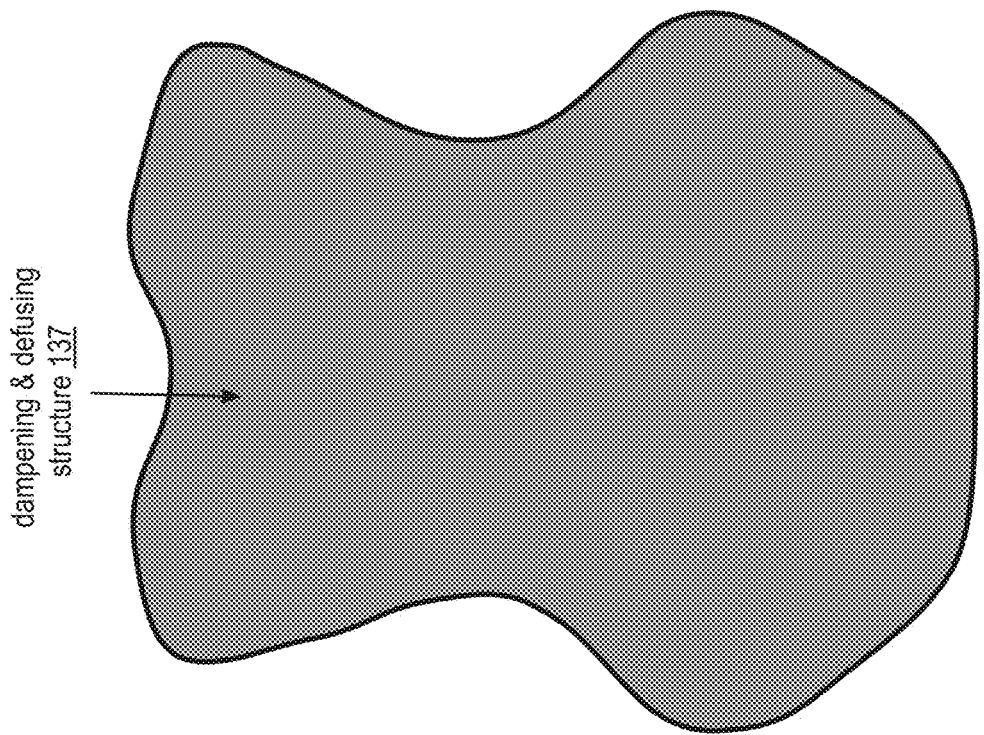
Figure 28:
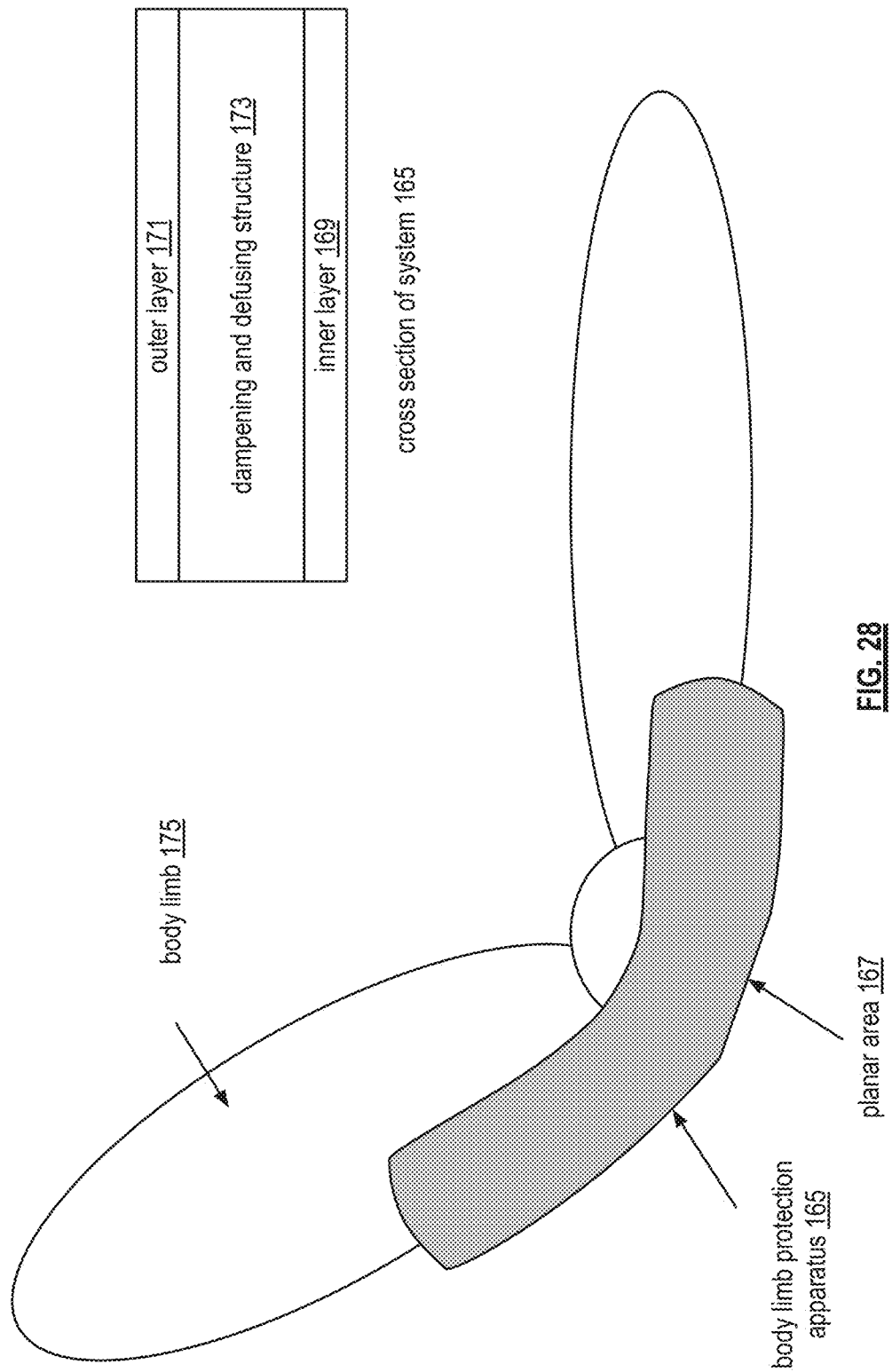
Figure 29:
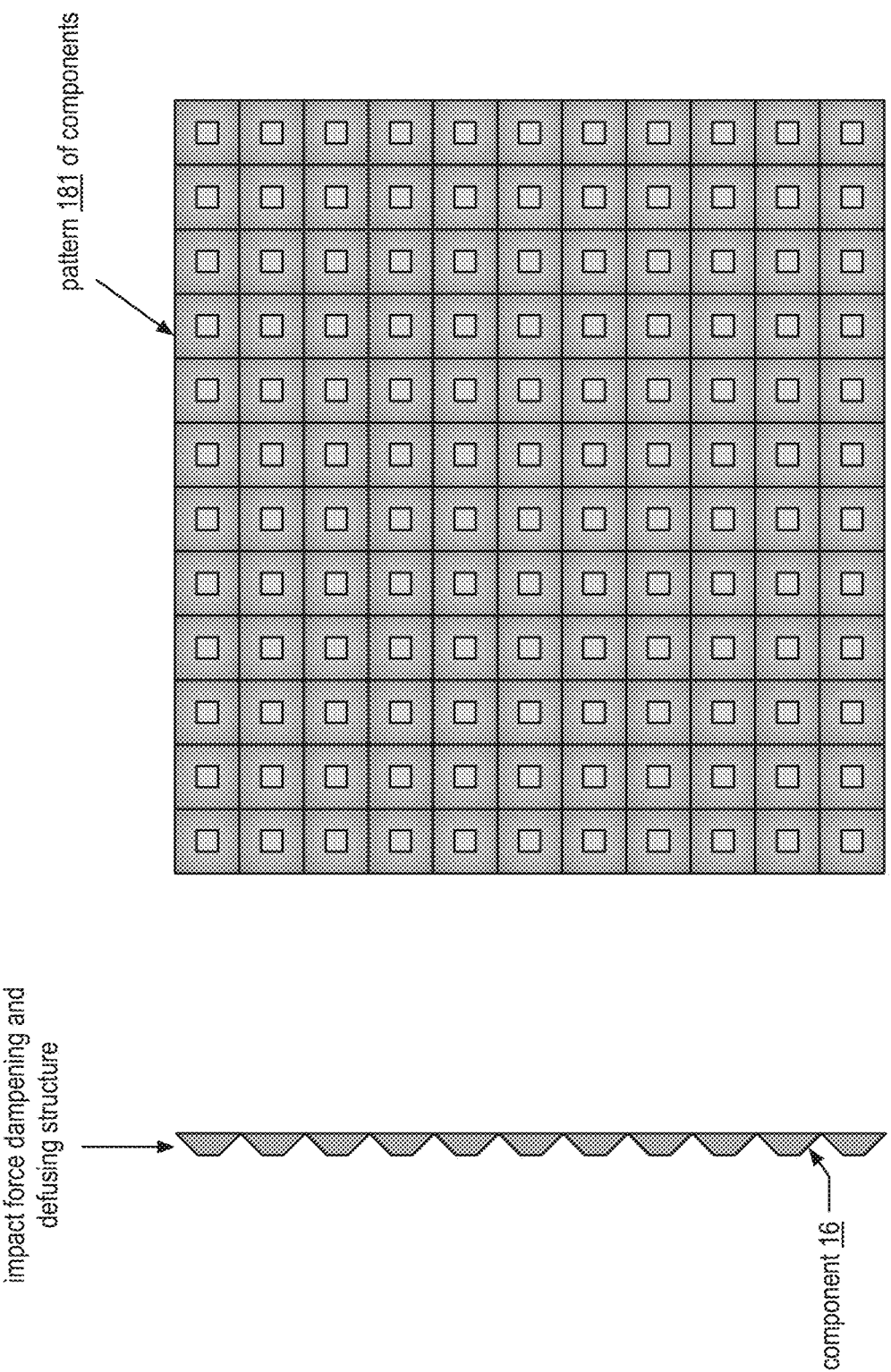
Figure 30:
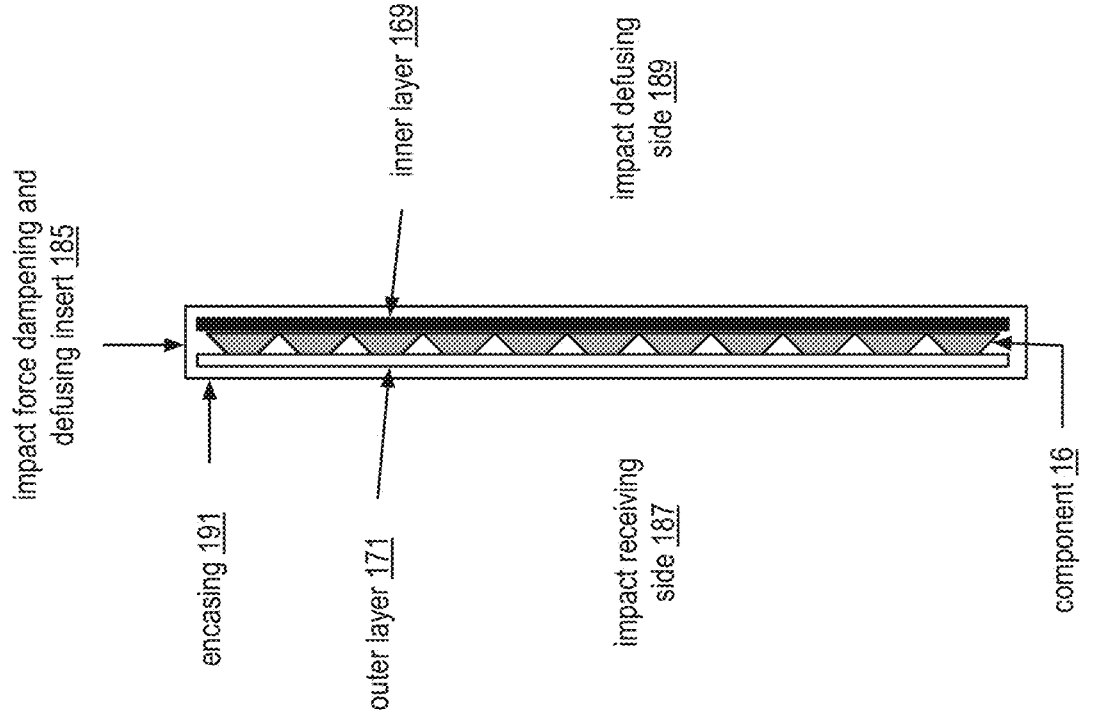
Figure 31:
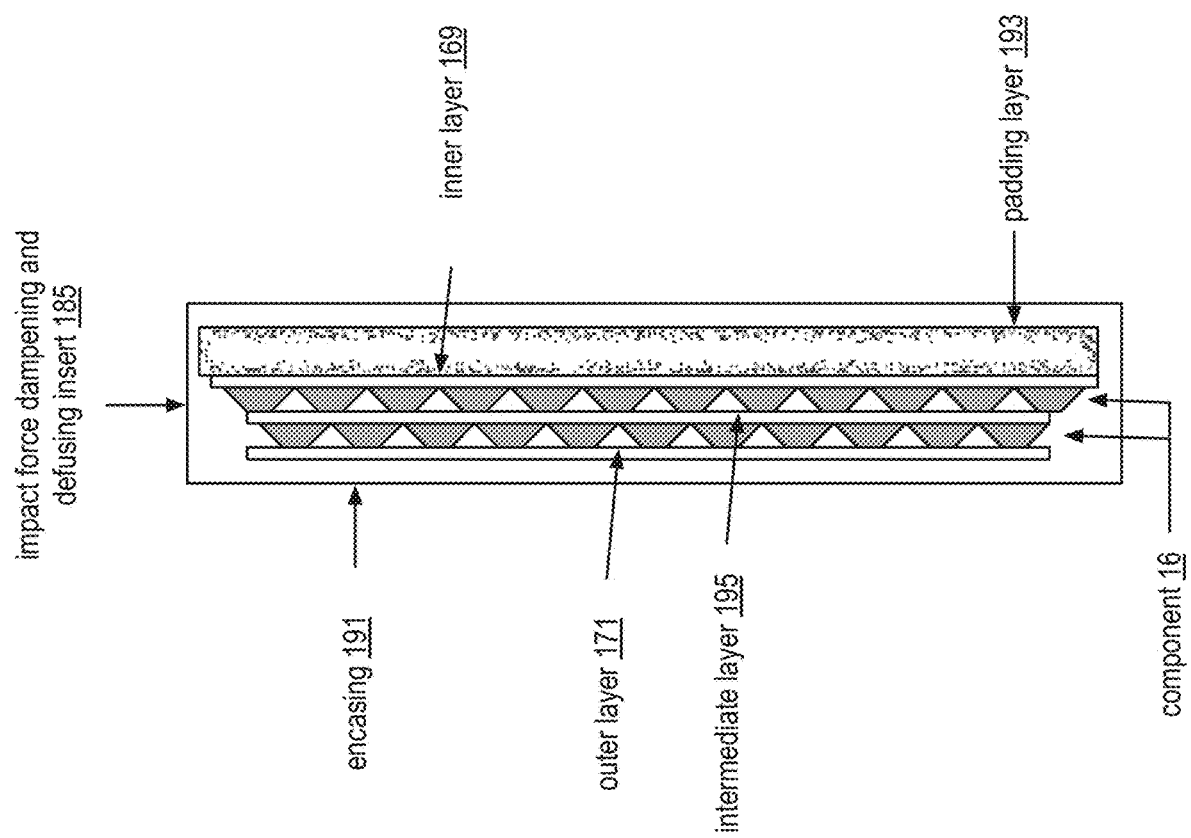
Figure 32:
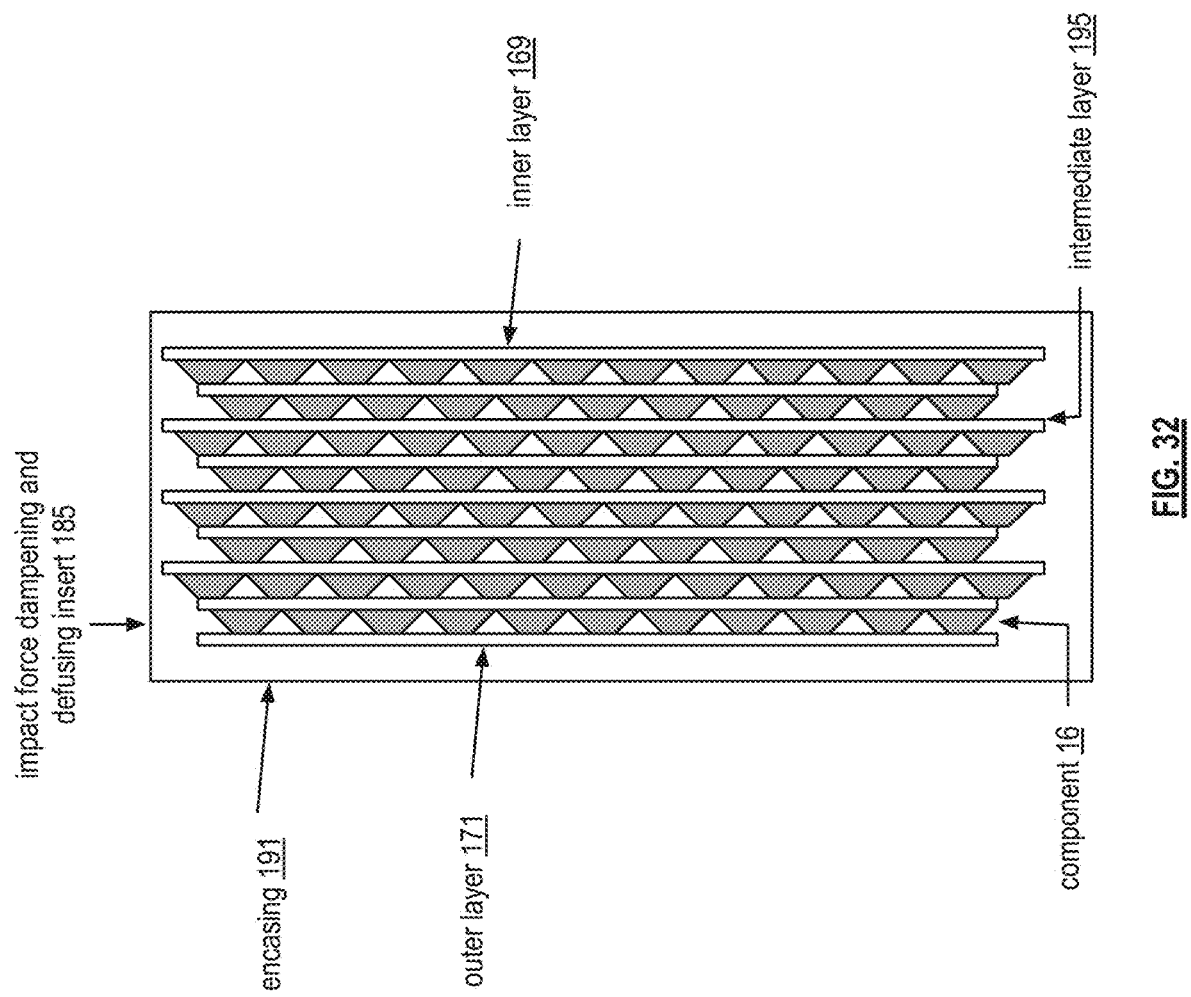
Figure 33:
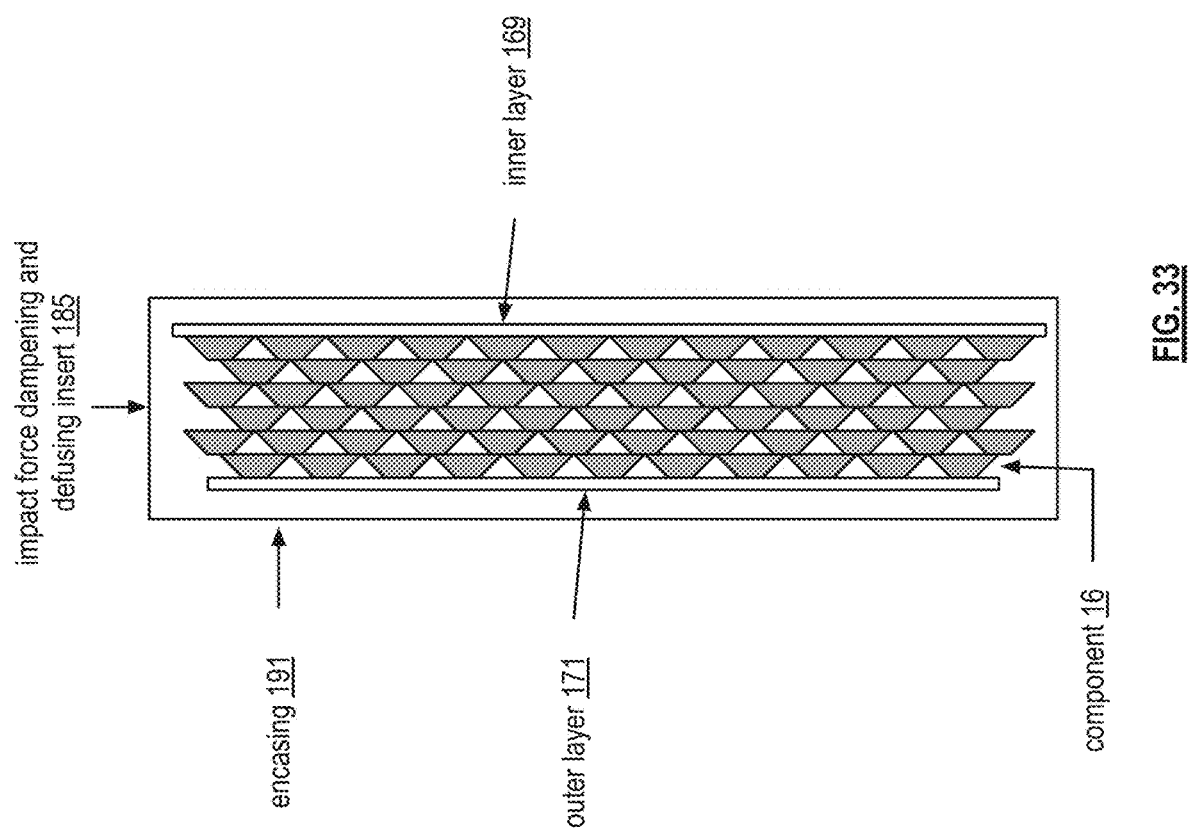
Figure 35:
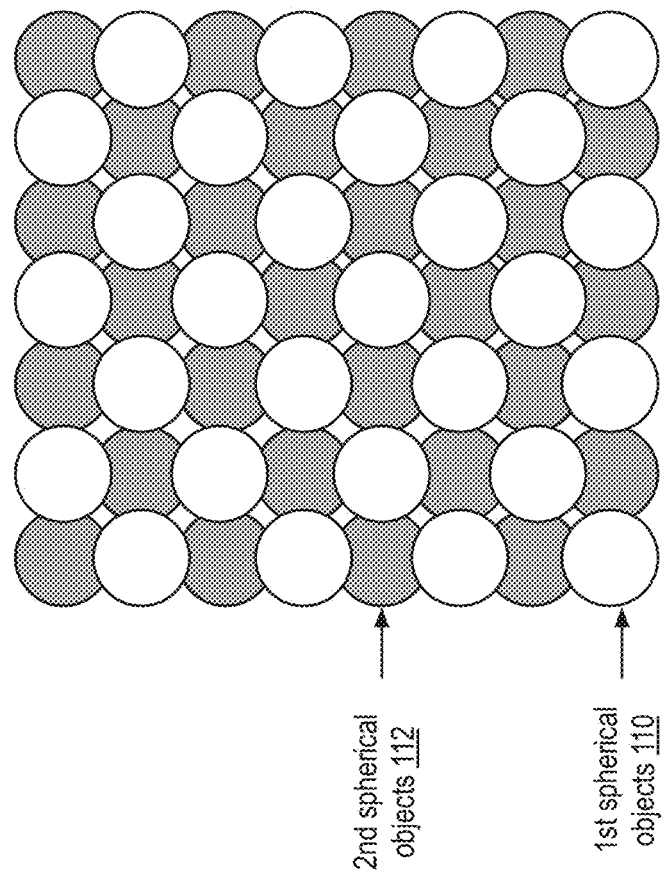
Figure 34:
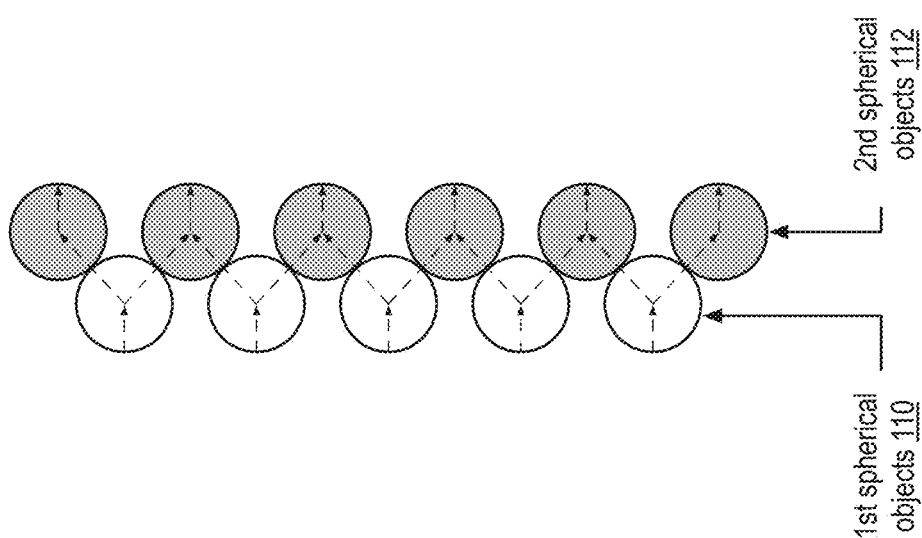
Figure 37:
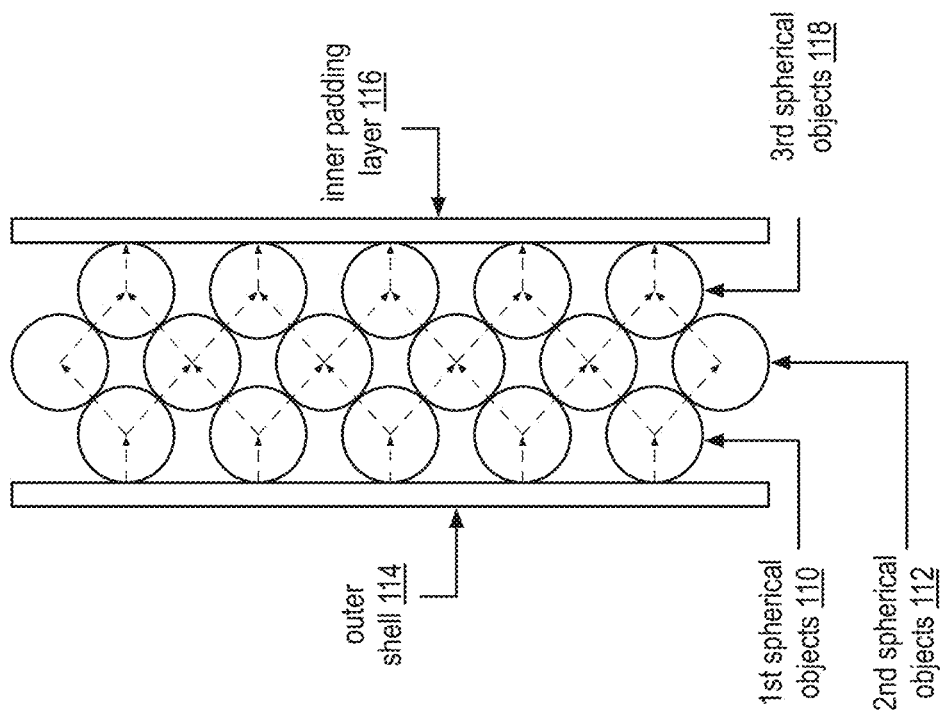
Figure 36:
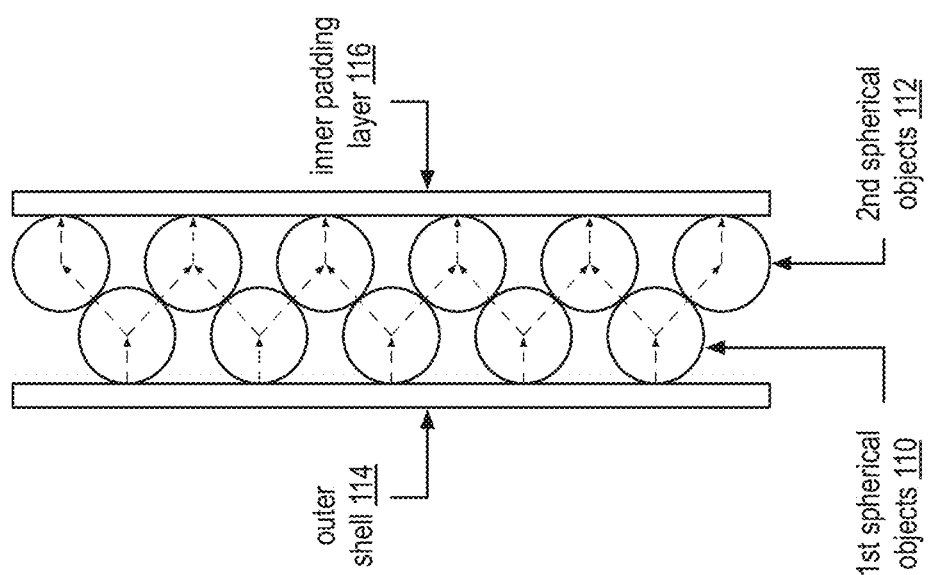
Figure 40:
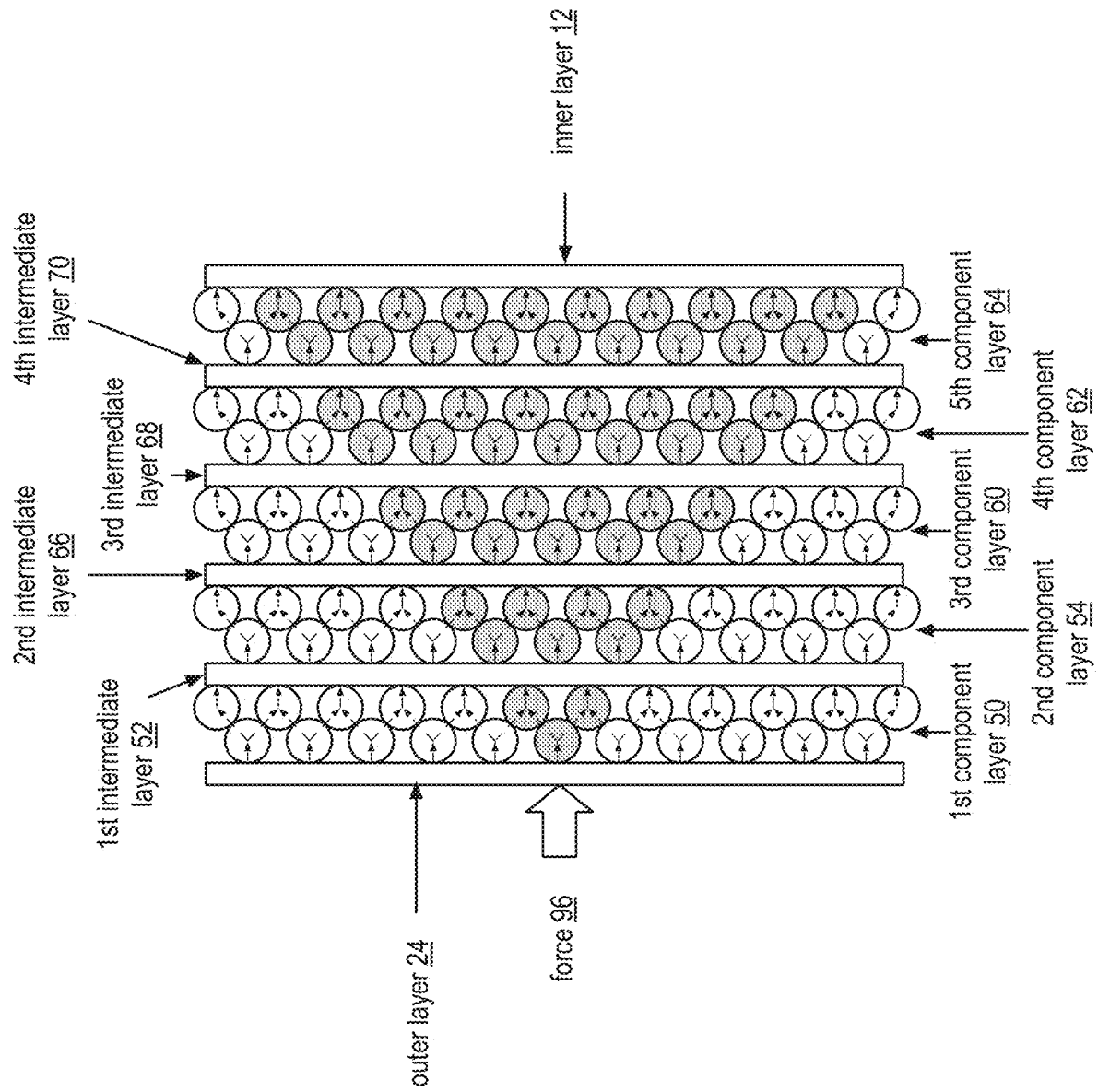
Figure 41:
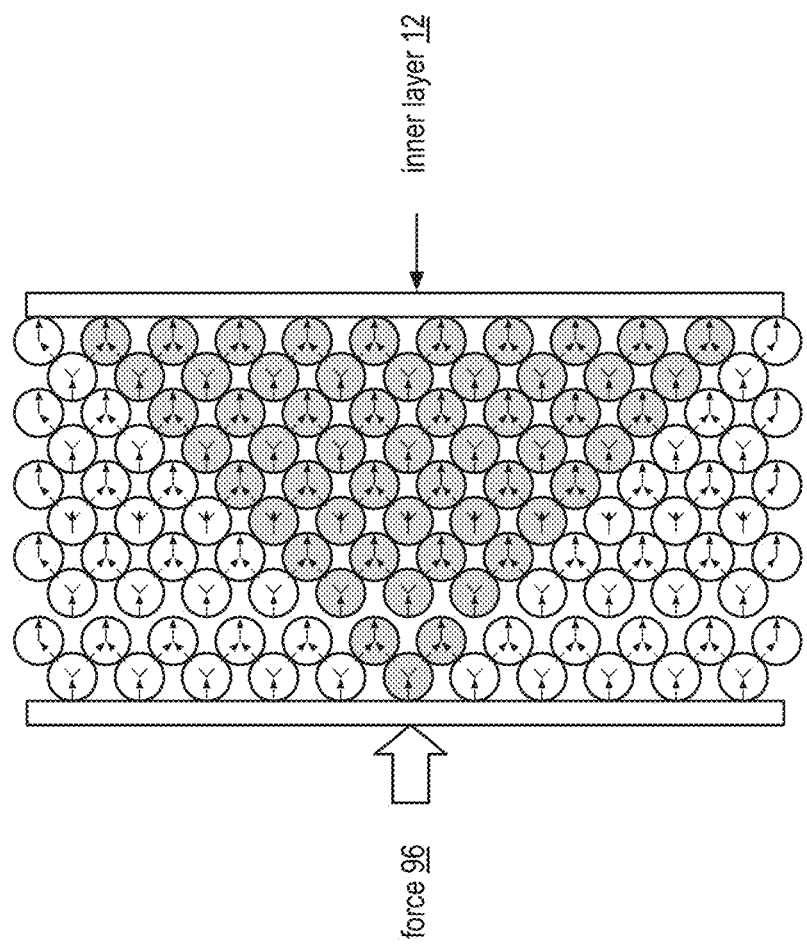
Figure 42:
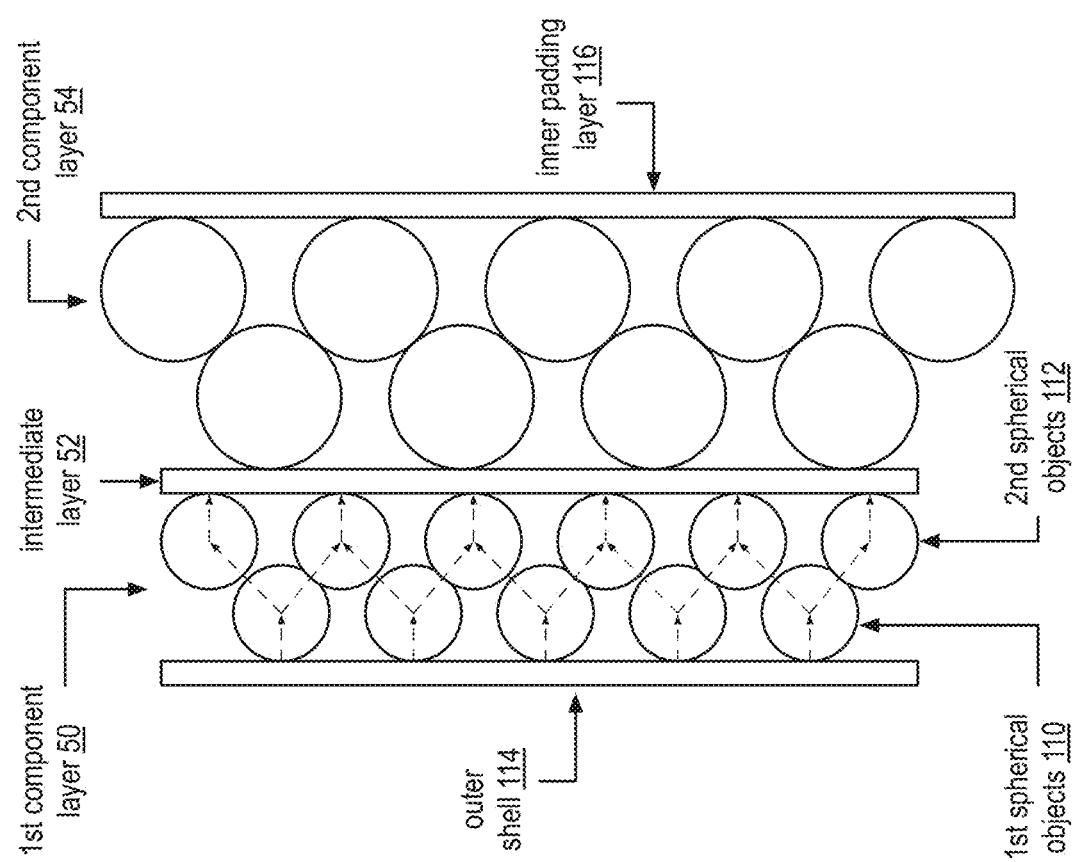
Figure 43:
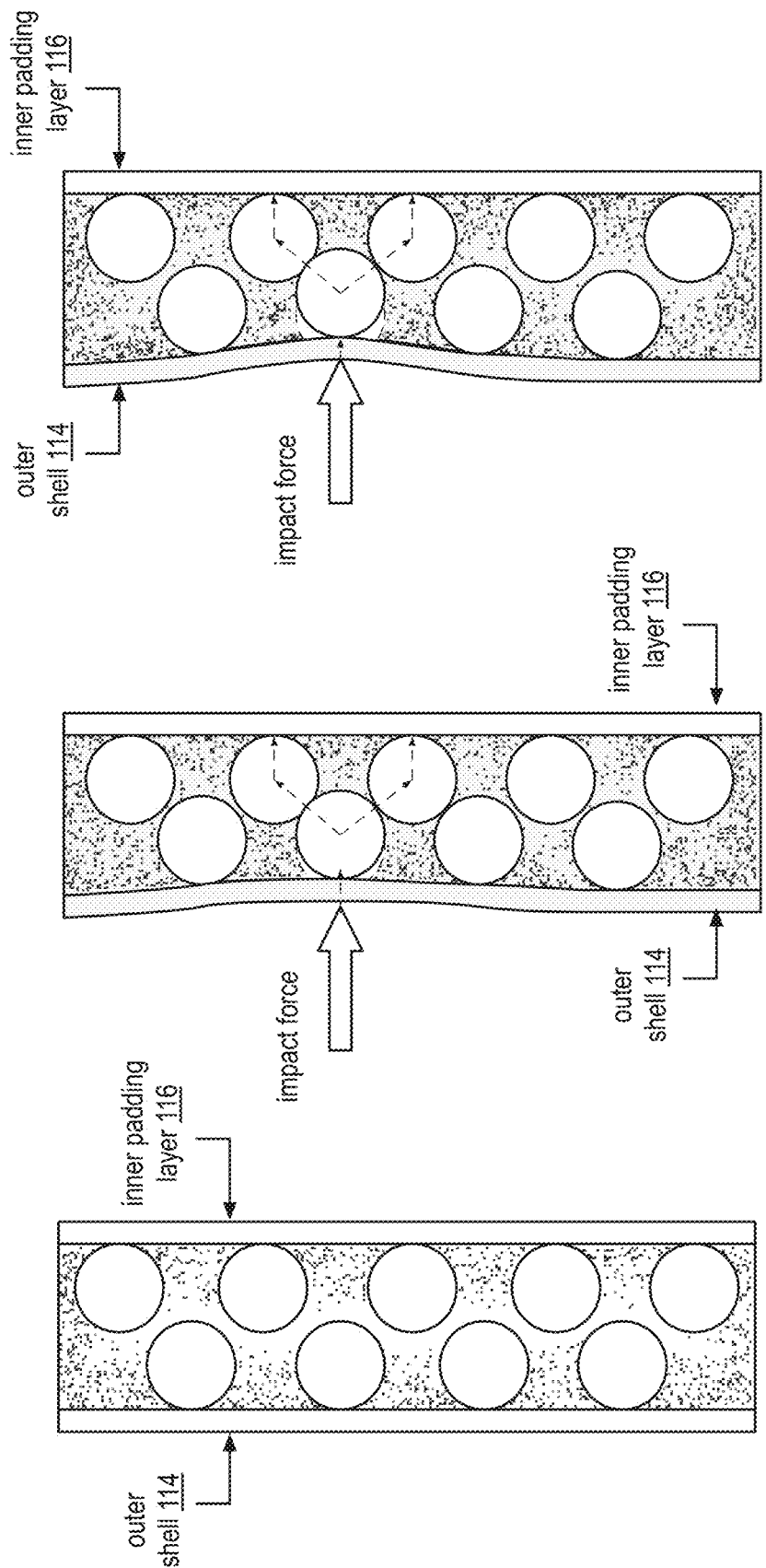
Figure 44:
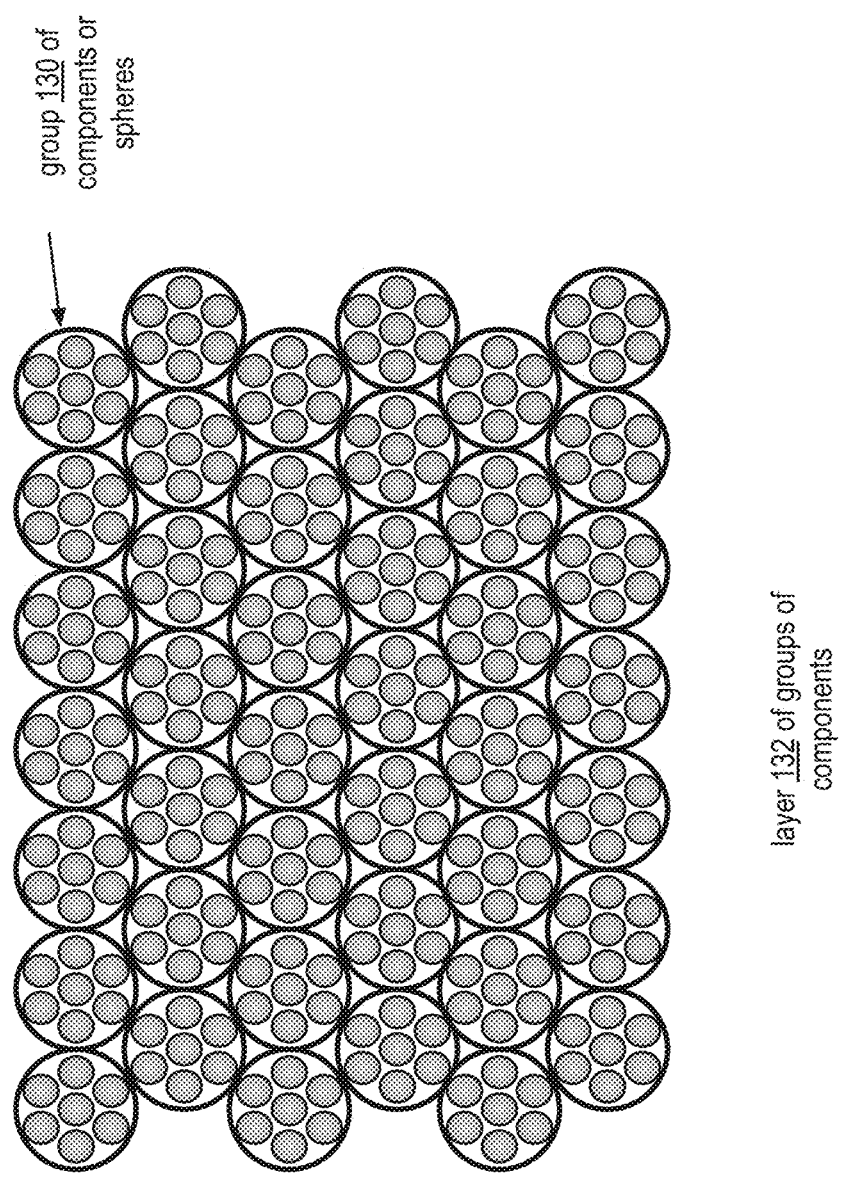

FIG. 23D is a schematic block diagram, in a side view, of an embodiment of a helmet that includes a body impact protection system in accordance with the present invention;

FIG. 23E is a schematic block diagram, in a side view, of a portion of an embodiment of a helmet that includes a body impact protection system in accordance with the present invention;

FIG. 23F is a schematic block diagram, in a side view, of a portion of an embodiment of a helmet that includes a body impact protection system receiving an angular impact force in accordance with the present invention;

FIG. 23G is a schematic block diagram, in a side view, of a portion of an embodiment of a helmet that includes a body impact protection system dampening and defusing an angular impact force in accordance with the present invention;

FIG. 24A is a schematic block diagram, in a side view, of an embodiment of a chest protector that includes a body impact protection system in accordance with the present invention;

FIG. 24B is a schematic block diagram, in a side view, of an embodiment of a chest protector that includes a body impact protection system in accordance with the present invention;

FIG. 25 is a schematic block diagram, in a side view, of an embodiment of a knee protection apparatus that includes a body impact protection system in accordance with the present invention;

FIG. 26 is a schematic block diagram, in a side view, of another embodiment of a knee protection apparatus that includes a body impact protection system in accordance with the present invention;

FIG. 27 is a schematic block diagram, in a side view, of an embodiment of a body impact protection system for use in a knee protection apparatus in accordance with the present invention;

FIG. 28 is a schematic block diagram, in a side view, of an embodiment of a body limb protection apparatus that includes a body impact protection system in accordance with the present invention;

FIG. 29A is a schematic block diagram, in a side view, of another embodiment of a body impact protection system in accordance with the present invention;

FIG. 29B is a schematic block diagram, in a top view, of another embodiment of a body impact protection system in accordance with the present invention;

FIG. 30 is a schematic block diagram, in a side view, of an embodiment of a force defusing inert for use in an impact protection system in accordance with the present invention;

FIG. 31 is a schematic block diagram, in a side view, of another embodiment of a force defusing inert for use in an impact protection system in accordance with the present invention;

FIG. 32 is a schematic block diagram, in a side view, of another embodiment of a force defusing inert for use in an impact protection system in accordance with the present invention;

FIG. 33 is a schematic block diagram, in a side view, of another embodiment of a force defusing inert for use in an impact protection system in accordance with the present invention;

FIG. 34 is a schematic block diagram, in a side view, of another embodiment of a force defusing layers for use in an impact protection system in accordance with the present invention;

FIG. 35 is a schematic block diagram, in a top view, of another embodiment of a force defusing layers for use in an impact protection system in accordance with the present invention;

FIG. 36 is a schematic block diagram, in a side view, of another embodiment of a force defusing layers for use in an impact protection system in accordance with the present invention;

FIG. 37 is a schematic block diagram, in a side view, of another embodiment of a force defusing layers for use in an impact protection system in accordance with the present invention;

FIG. 38 is a schematic block diagram, in a side view, of another embodiment of a force defusing layers for use in an impact protection system in accordance with the present invention;

FIG. 39 is a schematic block diagram, in a side view, of another embodiment of a force defusing layers for use in an impact protection system in accordance with the present invention;

FIG. 40 is a schematic block diagram, in a side view, of an example of force diffusion via force defusing layers for use in an impact protection system in accordance with the present invention;

FIG. 41 is a schematic block diagram, in a side view, of another example of force diffusion via force defusing layers for use in an impact protection system in accordance with the present invention;

FIG. 42 is a schematic block diagram, in a side view, of another embodiment of a force defusing layers for use in an impact protection system in accordance with the present invention;

FIGS. 43A-43C are schematic block diagrams, in a side view, of examples of impact force dampening and diffusion via force defusing layers of an impact protection system in accordance with the present invention;

FIG. 44 is a schematic block diagram, in a top view, of another embodiment of a force defusing layers for use in an impact protection system in accordance with the present invention; and FIG. 45 is a schematic block diagram, in a side view, of another embodiment of a force defusing layers for use in an impact protection system in accordance with the present invention.

DETAILED DESCRIPTION OF THE INVENTION

Figure 1:
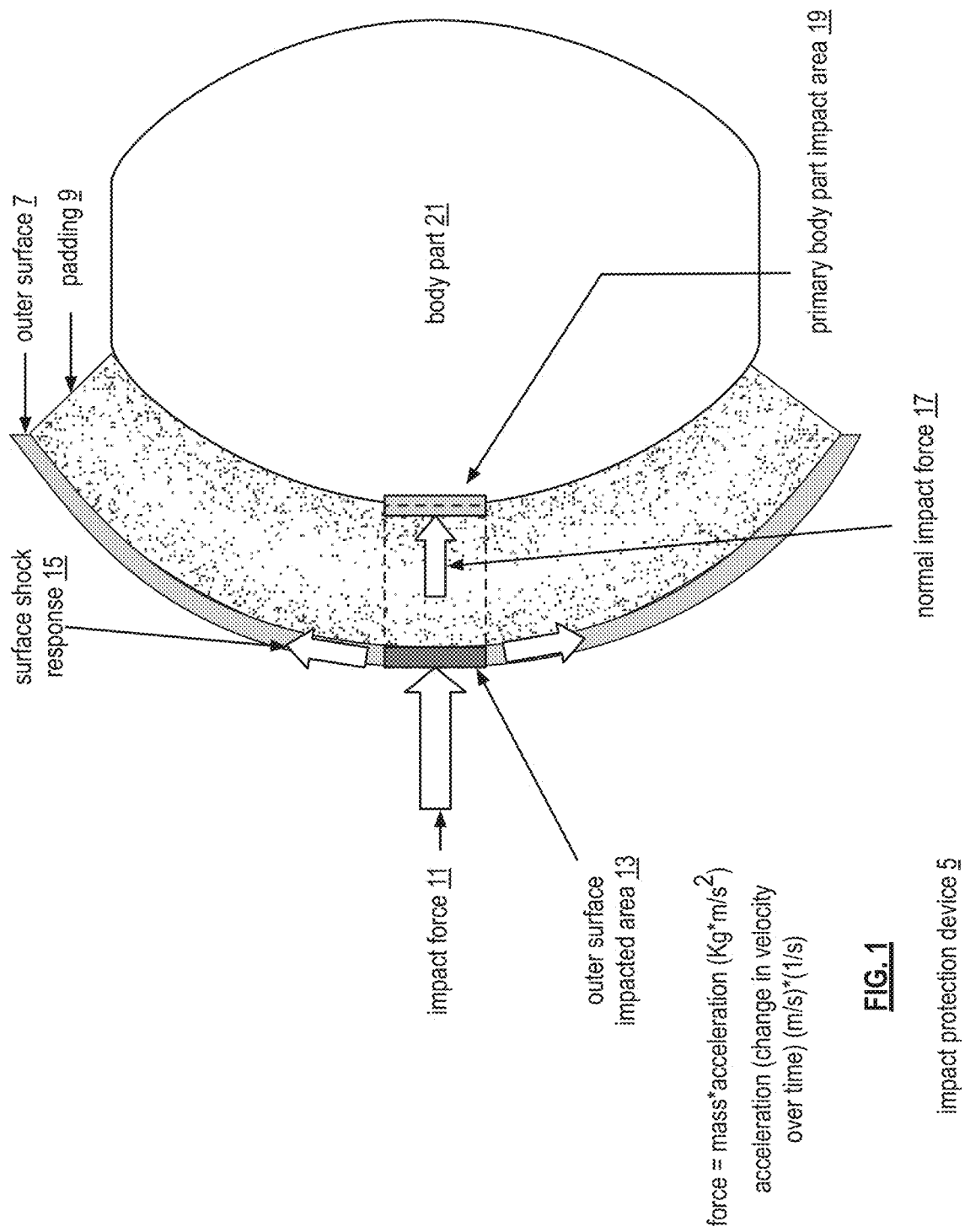
FIG. 1 is a schematic diagram of an example of a conventional impact protection device receiving an impact force.

FIG. 1 is a schematic diagram of an example of a conventional impact protection device 5, which may be a helmet, receiving an impact force 11. The impact protection device 5 includes an outer surface 7 (e.g., a hard-plastic shell) and padding 9 (e.g., a foam, air bladders, or a combination thereof). For this example, assume that the impact protection device 5 is a conventional football helmet and the impact force 11 is causes by a collision with another football helmet.

Given the spherical nature of football helmets, a helmet to helmet collision creates a small impact area (e.g., about the size of a dime). At impact, the impact force 11 creates a surface shock wave response 15 and a normal impact force component 17. The surface shock response 15 is a surface wave at the resonant frequency of the outer surface 7. As a practical example, the impact force 11 creates a wave pattern similar to waves created from a rock being dropped still water.

The normal impact force 17 has a magnitude that is similar to that of the impact force 11 and follows a path that corresponds to the outer surface impacted area 13 towards the head (i.e., body part 21). As the normal impact force 17 is traversing this path, it is dampened by the padding. A concentration of the dampened normal impact force is asserted against the head in a primary body part impact area 19. Through conventional padding, the primary body part impact area 19 is approximately the same size as the outer surface impacted area 13.

With conventional football helmets being tested on G-Force measurements, the effectiveness of the padding dictates the tested effectiveness of the helmet. G-force testing, however, is an incomplete testing metric for determining concussion safety of helmets. To illustrate the incompleteness of G-Force measurements, consider a nine-inch hunting knife with a five-inch blade dropped forty-two inches into modeling clay with the blade down and then with the handle down. The following table shows that the blade down has a G-Force that is about 5 times less than the G-Force with the handle down. Using the G-Force measurements of helmet testing protocols as an indication of injury prevention, the handle down presents significantly more risk and severity of injury than the blade down.

| Measurement | Blade Down | Handle Down |
| --- | --- | --- |
| weight | 0.3 lbs | 0.3 lbs |
| drop height | 42 inches | 42 inches |
| impact distance | 0.89 inches | 0.18 inches |
| velocity | 15.01 ft/sec | 15.01 ft/sec |
| deceleration | 1,519 ft/sec2 | 7,513 ft/sec2 |
| G-Force | 47 G's | 221 G's |
| average impact force (lbs) | 14 lbs | 66 lbs |
| average impact area | 0.032 in2 | 0.866 in2 |
| average impact pressure | 442.4 lbs/in2 | 76.6 lbs/in2 |

Yet, when mass, impact force, impact area, and impact pressure are taken into account, a much clearer picture of the risk and severity of injury is revealed. From the above table, the blade has a significantly smaller area than the handle. Even though the blade down has a smaller impact force, the blade down has a significantly greater impact pressure (almost 6 to 1)! Note that the impact area of the blade is an average and is significantly smaller at the tip; making the initial impact pressure of the blade even greater (e.g., over 1,000 pounds per square inch).

Due to the spherical nature of the head, protective headgear is also spherical. As such, in a helmet-to-helmet impact or helmet-to-ground impact, the helmet surface impact area 13 is about the size of dime to about the size of a silver dollar. Preliminary testing indicates that conventional football helmets do little to expand the impact area from the surface of the helmet to the head. Thus, even if a helmet dampens the impact force by about 97.5%, the impact pressure to the head may still be substantial.

For example, assume a 200-pound player traveling at 16 miles per hours collides head first and comes to a complete stop in 1.25 inches. This creates a G-force of 82 g's (which is at the low end of possible concussion range of 100 g's+/−30 g's). Continuing the analysis, this impact creates an external impact force 11 of about 16,400 force-pounds. Assume the padding reduces the impact force by 96% such that the normal impact force reaching the head is about 650 force-pounds. If the primary body impact area 19 is also about the size of a dime (e.g., 0.375 square inches), then the pressure (e.g., force/area) applied to the head is about 1,750 pounds per square inch (PSI)! This creates a very large localized force being applied to a small area of the head that is likely to cause a head injury.

Figure 2:
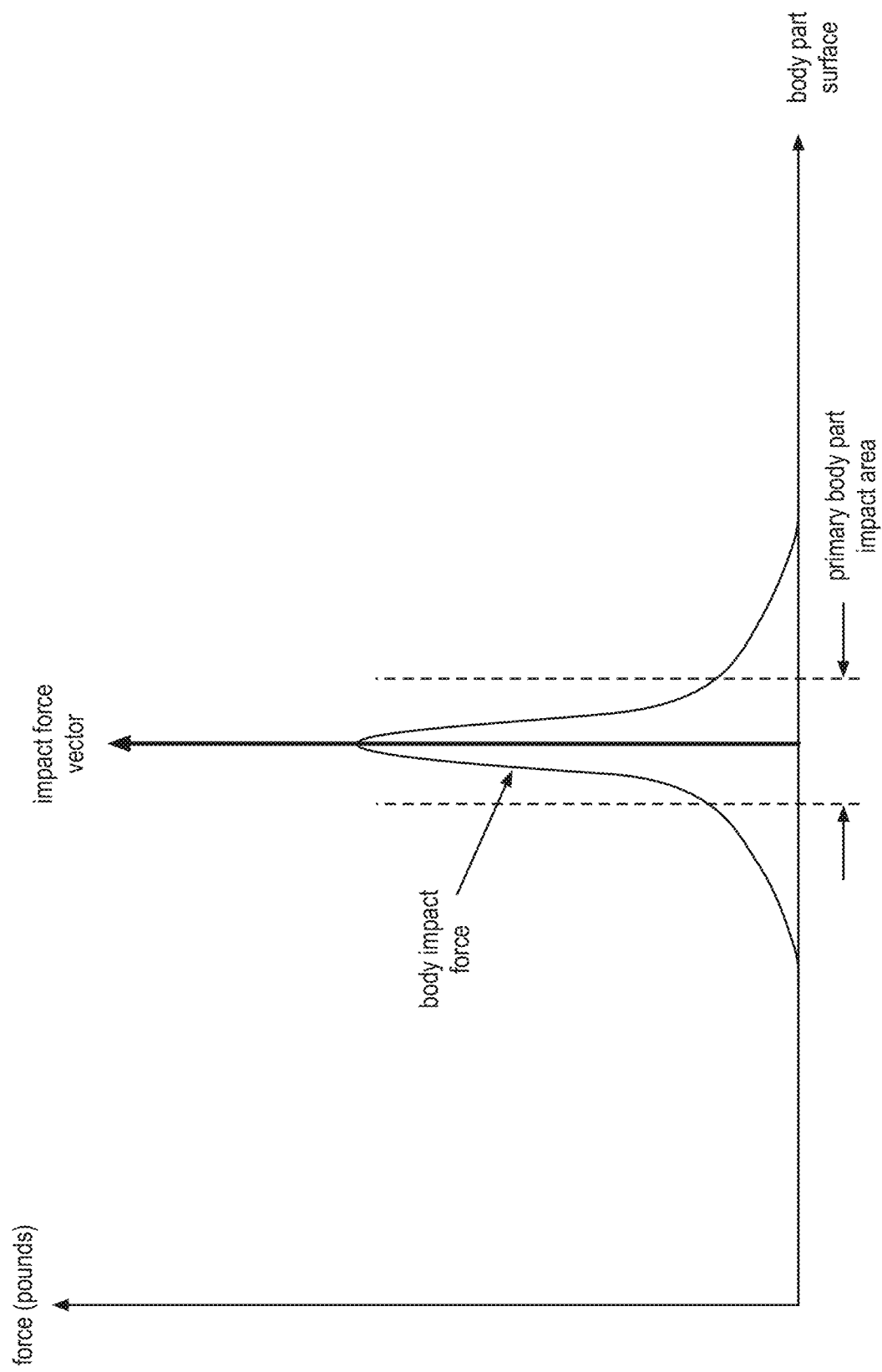
FIG. 2 is a diagram of an example graph of the impact protection device of FIG. 1 that plots impact force versus impact area.

FIG. 2 is a diagram of an example graph of the impact protection device of FIG. 1 that plots impact force versus primary body part impact area. In this example, the vertical axis corresponds to impact force that reaches the body part and the horizontal axis represents the surface area of a body part (e.g., head). The dampened normal impact force 17 that reaches the body includes a plurality of impact force components dispersed over an area of the body part creating a force gradient. The force components with the largest magnitudes are concentrated in the primary body part impact area. As the distance from the primary body part impact area increases, the magnitude of the force components rapidly decrease. From this illustration, the impact pressure (i.e., impact force/impacted area) is large.

To illustrate further illustrate that G-force is an incomplete measure of concussion safety and that impact pressure is a much more accurate measure, consider that a standing person turns at a velocity of 2.2 feet/second and bumps her head on an edge of a pipe. Assume that the impact distance is 1/16 inch, the impact area of 1/16 in$^2$, and a mass of her head of 11 pounds. From these values the following metrics are obtained: G-Force of 14.4 g's, an average impact force of 158 pounds, and an average impact pressure of 2,560 PSI. While the g-force was very low, the pressure was very large, which caused a severe concussion for which the person missed weeks of work. As such, when impact force components are in a small impact area, the pressure can be very significant, which can cause severe injury.

Figure 3:
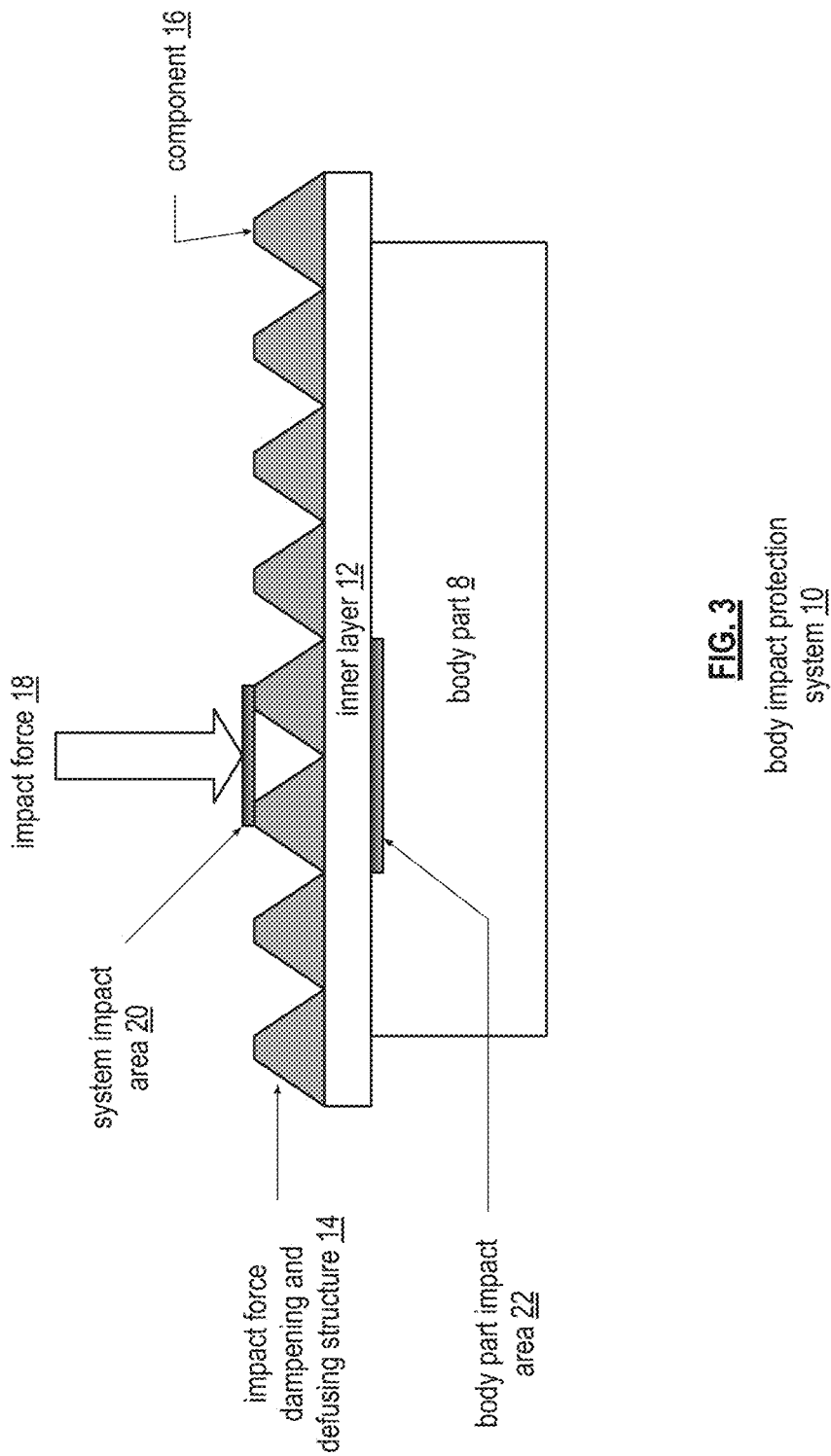
FIG. 3 is a schematic block diagram, in a side view, of an embodiment of a body impact protection system in accordance with the present invention.

FIG. 3 is a schematic block diagram, in a side view, of an embodiment of a body impact protection system 10 that includes an impact force dampening and defusing structure 14 and an inner layer 12. The inner layer 12 supports components 16 of the impact force dampening and defusing structure 14. The components 16 may be of any size (i.e., height, width, circumference, radius, diameter, perimeter, and/or depth), any shape, and/or any material composition provided the side walls of the components are angled and the outer surface area (i.e., away from the body part 8) is less than the inner surface area (towards the body part 8).

Figure 21C:
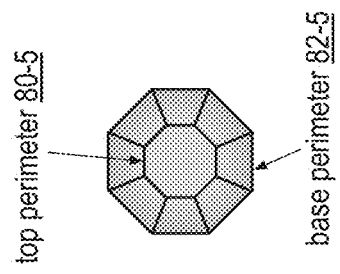
Figure 21E:
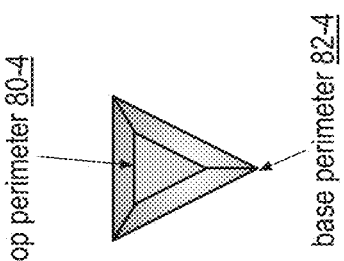
Figure 21D:
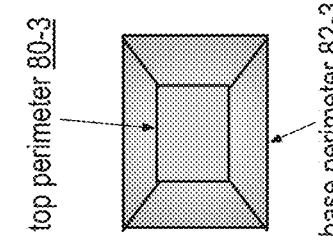
Figure 21T:
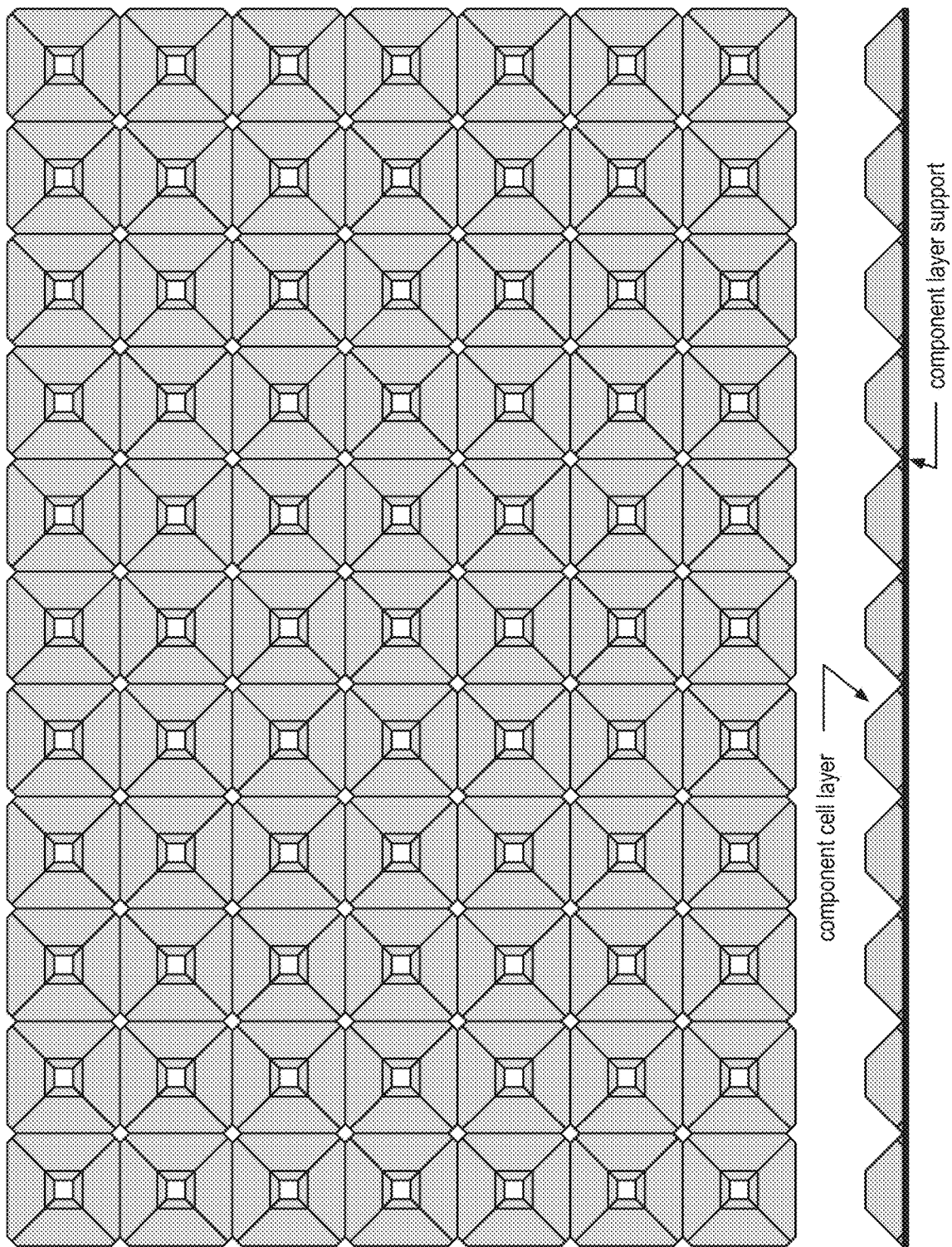
FIG. 21T is a top and side view of a layer of components in accordance with the present invention.
Figure 21U:
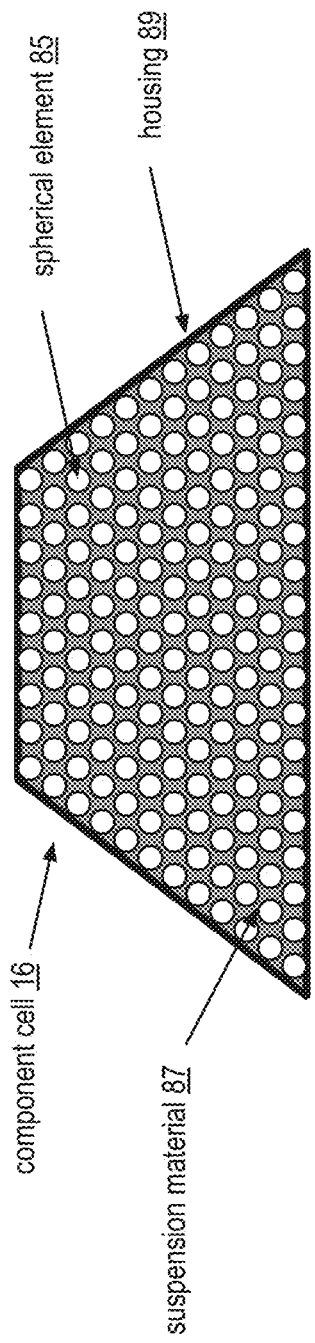
FIGS. 21U-21V are diagrams of another defusing cell or component in accordance with the present invention.
Figure 21V:
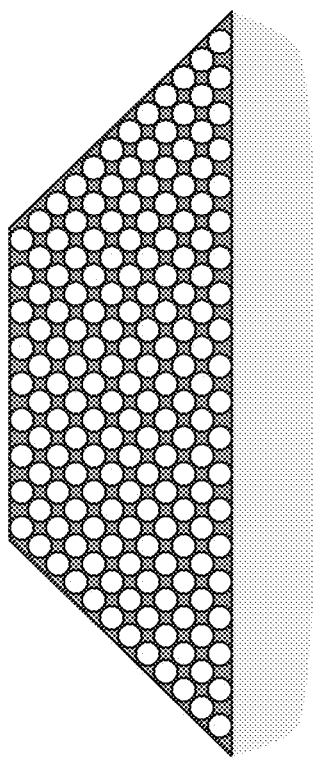
Figures 4, 21V:
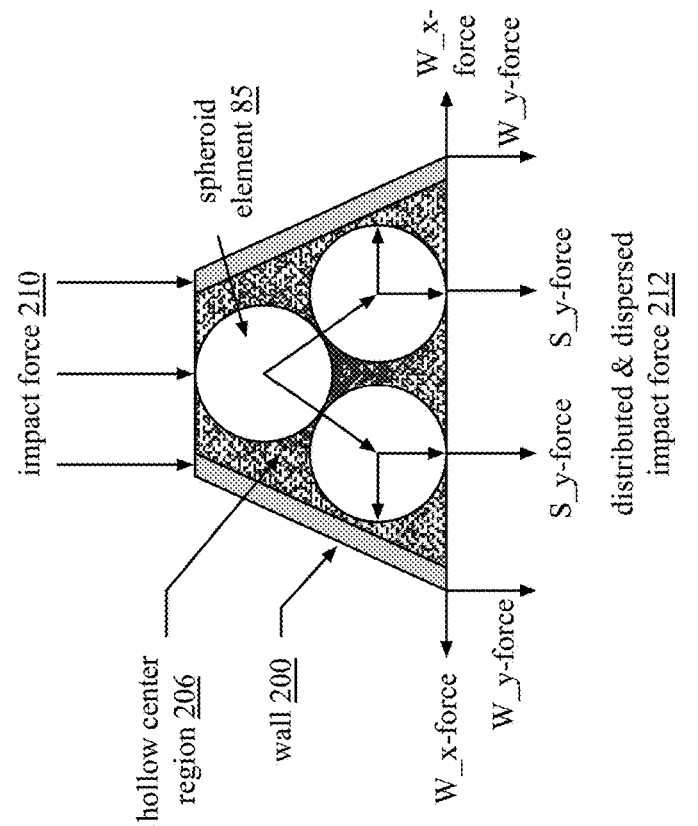
FIG. 4 is a schematic block diagram, in a side view, of an embodiment of a defusing cell (i.e., component) of a layer of a body impact protection system in accordance with the present invention.
Figures 1, 21V:
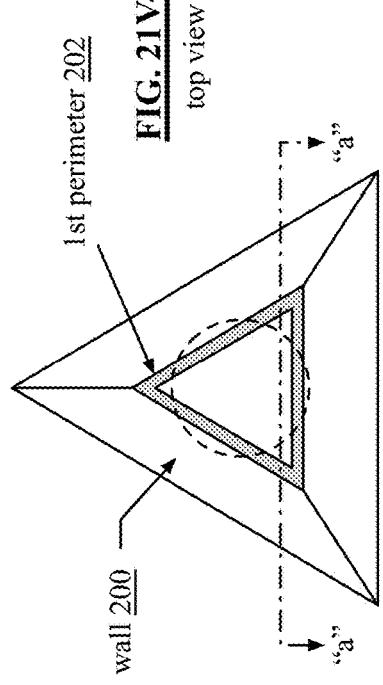
Figures 2, 21V:
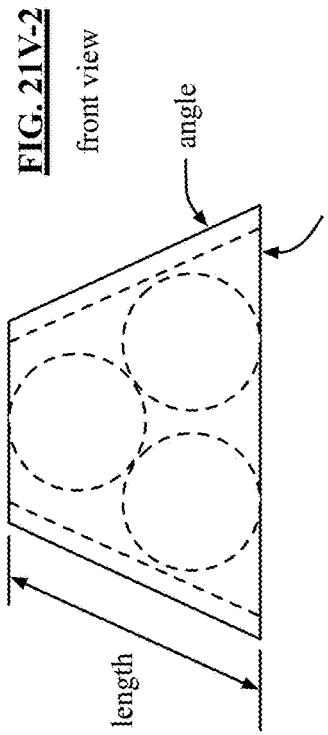
Figures 3, 21V:
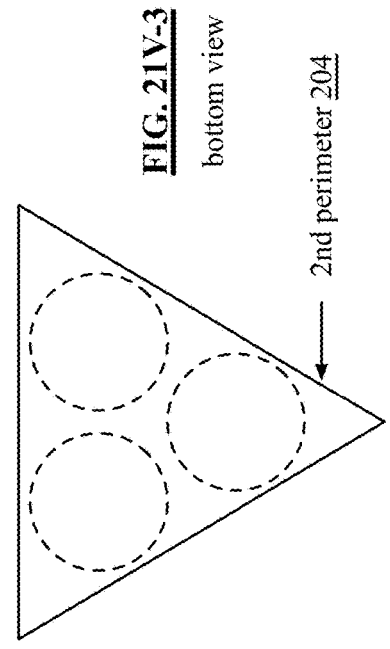

With reference to FIG. 4, a component 16, from a side view, includes an angled side wall(s) 71 (e.g., a side structure), an impact receiving surface area 70 (e.g., a top that is away from the body part), a body impact surface area 72 (e.g., a base that is towards the body part), and a distance "d" 74. The distance "d" 74 is the distance between the body impact surface area 72 and the impact receiving area 70 and ranges from 1/32 of an inch to multiple inches, depending on the application of the body impact protection system. The angled side wall(s) 71 that is/are at an angle of θ with respect to the horizontal axis, where the angle is in the range of 25 degrees to 89 degrees. Depending on the angle θ and the distance "d", the body impact surface area 72 is two or more times larger than the impact receiving surface area 70, where the impact receiving surface area is 1/256 square inches (e.g., 1/16 by 1/16) to tens of square inches depending on the application of the body impact protection system. Various embodiments and examples of the components 16 are described in one or more subsequent figures.

The component 16 is constructed (e.g., molded, press-formed, printed, etc.) of a material composition that includes one or more of a rubber material, a foam material, a padding material, a plastic material, a gel material, a carbon fiber material, a cloth material; a polyester material, a moisture absorbing material, a moisture wicking material and a silicon material. A characteristic of the material composition is that the component retains the angle θ within +/−33% and retains the ratio of Ai to Ao to within +/−33%. Distance "d" may decrease while the impact force is being applied, but substantially returns to its pre-impact force value when the impact force is removed.

Returning to the discussion of FIG. 3, the inner layer 12 provides a supporting structure for the components 16 and provides some dampening of the impact force 18. The inner layer 12 is comprised of rubber, foam, air bladder, corrugated fiberboard pads, a plastic material, a gel material, a carbon fiber material, a cloth material, a polyester material, a moisture absorbing material, a moisture wicking material, an expanding polystyrene, a polypropylene, a polyethylene, a polyurethane, a rubber, a silicon, and/or a gel. In one example embodiment, the components 16 are adhered to the inner layer 12 by an adhesive, by molding, by three-dimensional printing, and/or other means. In another example embodiment, the inner layer 12 includes receptacles in which the inner surface area of the components is placed with or without an adhesive. In both examples, the components 16 on the same layer move independently from each other as a result of an impact force 18.

In an example, the body impact protection system 10 is protecting a body part 8 (e.g., head, a limb, the core, etc.) from an impact force 18 created by an impacting object (e.g., another person's head, elbow, shoulder, etc., from the ground, from a ball, from a projectile, etc.). The impacting object strikes the outer surface area (or portion thereof) of one or more components creating an average impact force 18 over a system impact area 20. The average impact force 18 includes a plurality of impact force components distributed across the system impact area 20.

Based on the nature of impact, some of the impact force components will have a magnitude that is greater than the magnitude of the average impact force. For example, in a sphere to sphere impact, the impact force components in the middle of the impact area will have greater magnitudes than impact force components are at the perimeter of the impact area. As another example, in a flat surface to flat surface impact, the impact force components across impact area will have about the same magnitudes.

The component(s) 16 receiving the average impact force 18 dampens and defuses it. A component dampens the average impact force 18 based on the angle of the side walls and defuses it based on the difference between the outside surface area and the inside surface area. With reference to FIG. 5, the component dampens the average impact force 18 (F1) based on the sine of the angle θ. For example, of the angle θ is 45 degrees, then the impact force is dampened by sin θ=0.707. As such, the resulting average impact force (F2)=F1*sin θ, which, in the present example, is F2=0.707*F1.

Impact pressure is "impact force" divided by impact area. For the outer surface, the impact pressure is F1/Ao, where Ao is the outer surface area and, for the inner surface, the impact pressure is F2/Ai, where Ai is the inner surface area. Continuing with the example, if Ai is 9 times Ao, then the inner impact pressure is 0.707/9 (7.8%) of the outer impact pressure via just one cell or component.

Figure 6:
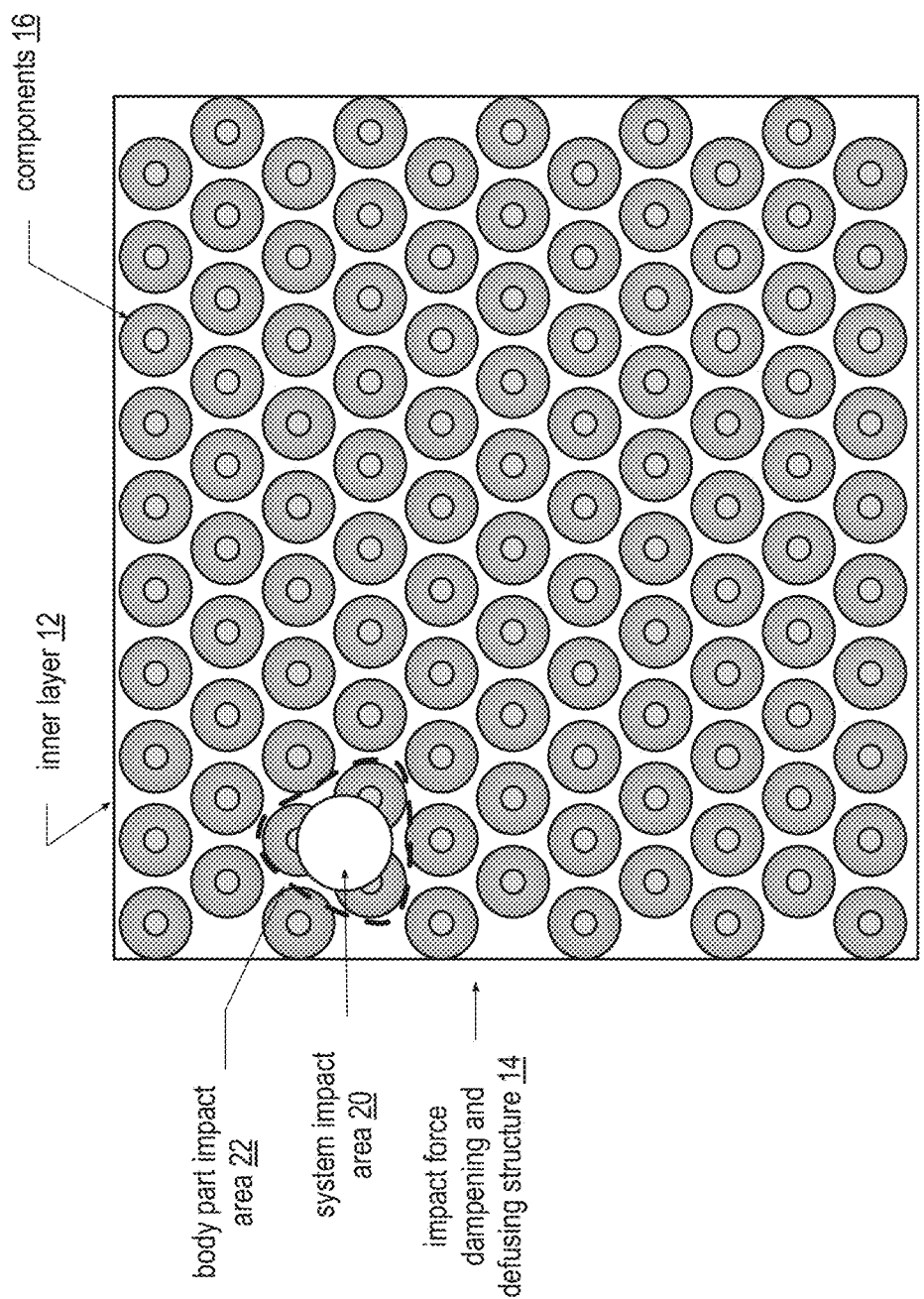
FIG. 6 is a schematic block diagram, in a top view, of an embodiment of a body impact protection system in accordance with the present invention.

FIG. 6 is a schematic block diagram, in a top view, of an embodiment of a body impact protection system 10 that includes the inner layer 12 supporting a plurality of components 16 forming an impact force dampening and defusing structure 14. The components 16 are shown to have a conical shape and are all of the same size and shape. In other embodiments, the components have a shape other than conical and/or are of different sized and/or of different shapes. In another embodiment, a fill material is injected, sprayed, placed, etc. between the components 16. The fill material is softer that the material of the component (i.e., the fill material will compress more from an impact force than the component), which includes one or more of a gel, foam, etc.

In an example, the impact force impacts three components 16 having a system impact area 20. Each of the three components dampens their respective portion based on the side wall angle θ, the material composition of the component, and/or the distance "d". Each component further diffuses the dampened impact by spreading it over a larger area. In this example, the body part impact area 22 is significantly larger than the system impact area 20. As such, the pressure applied to the body part is significantly less that the pressure exerted in the system impact area 20.

Figure 7:
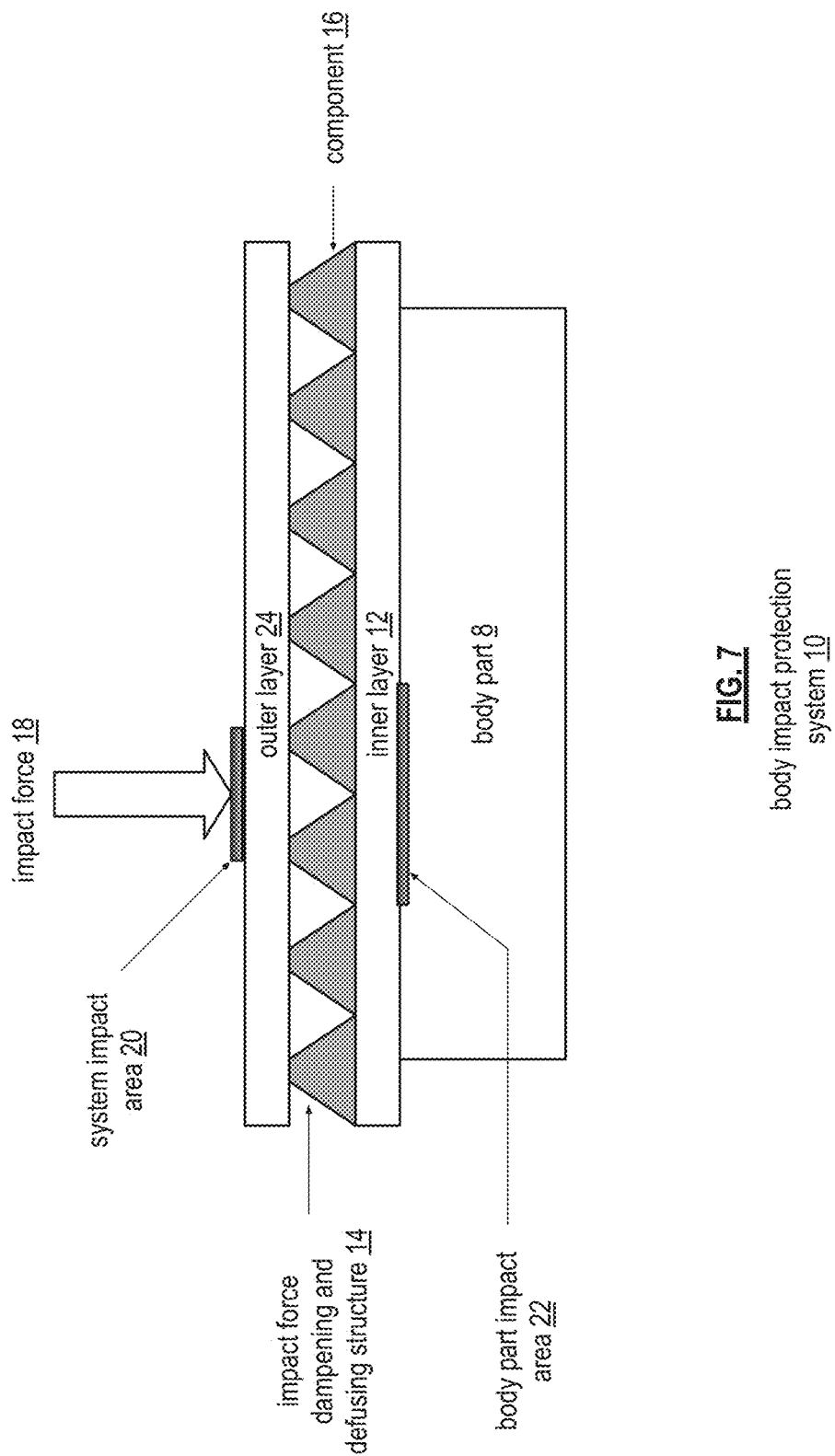
FIG. 7 is a schematic block diagram, in a side view, of another embodiment of a body impact protection system in accordance with the present invention.

FIG. 7 is a schematic block diagram, in a side view, of another embodiment of a body impact protection system 10 that is similar to the body impact protection system 10 of FIG. 3 with the addition of an outer layer 24. The outer layer 24 may be comprised on the same material as the inner layer 12 or a different material. Each of the inner and outer layers 12 and 24 are 1/16 inch to 3/4 inch thick depending on the application of the body impact protection system 10.

Figure 8:
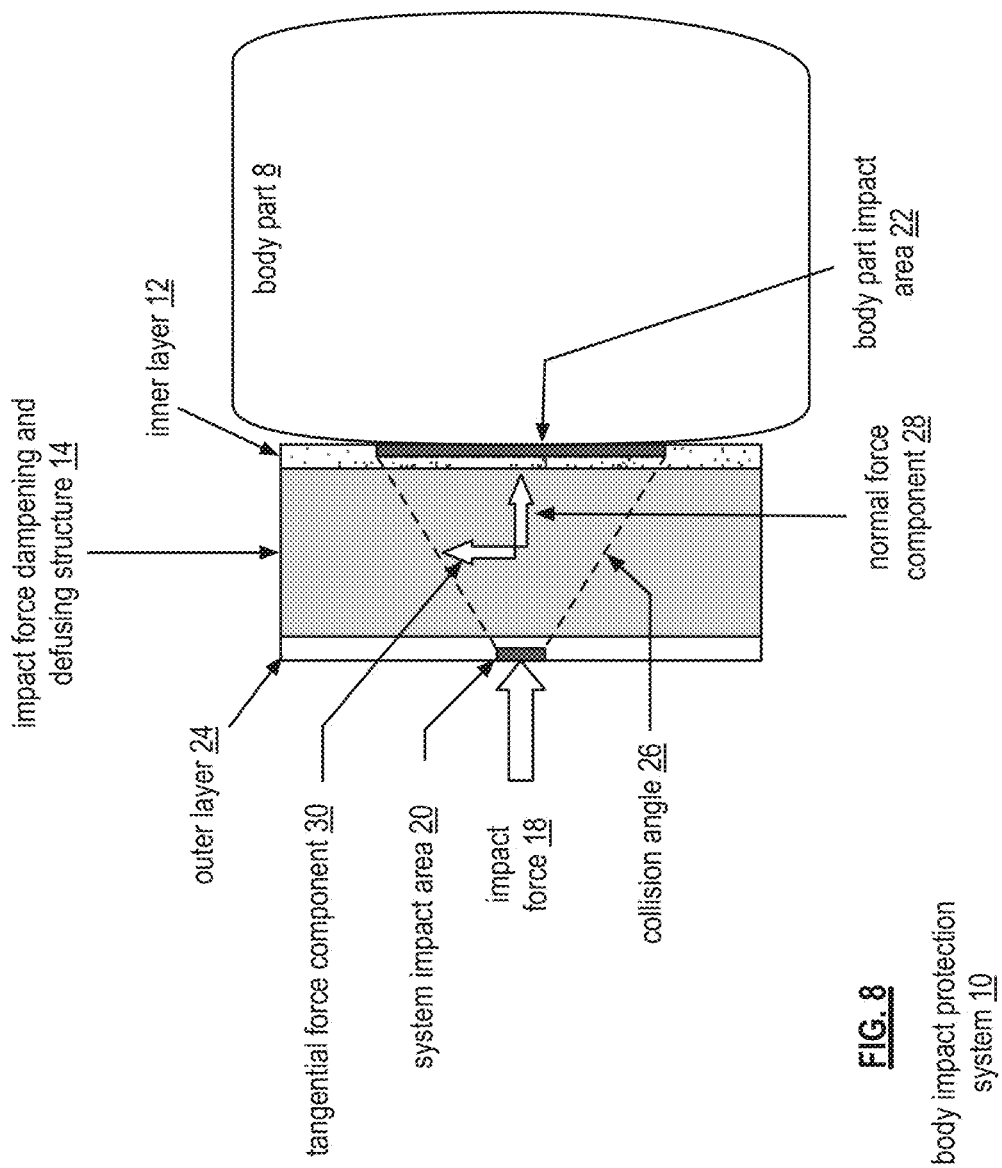
FIG. 8 is a schematic block diagram, in a side view, of an example of force components within a body impact protection system in accordance with the present invention.

FIG. 8 is a schematic block diagram, in a side view, of an example of force components within a body impact protection system 10. In this example, the body impact protection system 10 includes an inner layer 12, an impact force dampening and defusing structure 14, and an outer layer 24. The impact force dampening and defusing structure includes one or more layers of components 16 and the inner layer 12 is positioned proximal to a body part 8.

When on object (e.g., another person, a ball, the ground, etc.) collides with the body impact protection system 10, it creates an average impact force 18 over a system impact area 20. The average impact force 18 is calculated as F=KE/d, where KE is the kinetic energy at impact and d is the impact distance (i.e., the distance the object travels at the moment of the collision until it stops or the collision is over). The kinetic energy (KE) is calculated as $KE=0.5*m*v^2$, where m is the mass of the object and v is the velocity of the impact at the instant of collision. For a falling object, velocity (v) is calculated as $v=(2*g*h)^{1/2}$, where g is the gravitational field of earth and h is the height the object has fallen. Deceleration of the object is calculated as $a=v^2/2*d$ and the G-Force of the object is calculated as G=a/g.

The components of the impact force dampening and defusing structure 14 provide a collision angle 26 between the impact force 18 and the body part 8. The impact force 18 is divided into a normal force component 28 and a tangential force component 30 based on the collision angle 26 (e.g., θ). For example, and on a layer by layer basis, the normal force component 28 is equal to the impact force times the sine of the collision angle and the tangential force component 30 is equal to the impact force times the cosine of the collision angle.

In addition to dampening the impact force on a layer by layer basis, the collision angle 26 increases the impacted area. Thus, when the normal force component(s) 28 is applied to the body part 8 through the inner layer 12, its magnitude is substantially less than the magnitude of the impact force 18 and it is spread out over a much larger area (i.e., the body part impact area 22 is much larger than the system impact area 20). Since pressure is force over area, decreasing the force and increasing the area substantially reduces the impact pressure on the body. In an analogy, the body impact protection system 10 takes a hard punch and turns it into a mild slap. As another analogy and from the example of the knife being dropped into molding clay, the body impact protection system 10 takes the blade down scenario and converts it into the handle down scenario.

Figure 9:
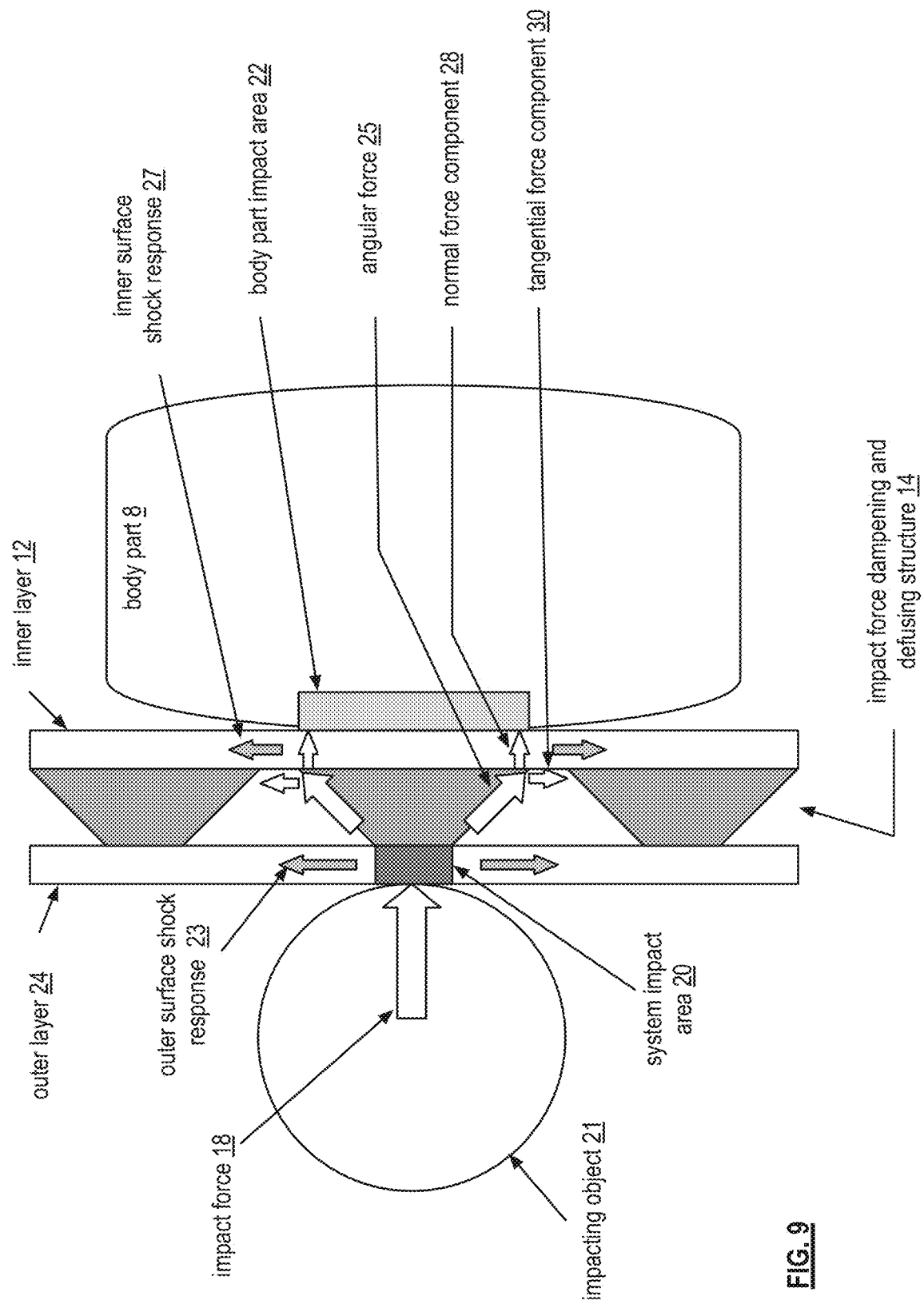
FIG. 9 is a schematic block diagram, in a side view, of another example of force components within a body impact protection system in accordance with the present invention.

FIG. 9 is a schematic block diagram, in a side view, of another example of force components within a body impact protection system 10. In this example, the body impact protection system 10 includes an inner layer 12, an impact force dampening and defusing structure 14, and an outer layer 24. The impact force dampening and defusing structure includes one layer of components 16 and the inner layer 12 is positioned proximal to a body part 8.

When on object 21 (e.g., a ball) collides with the body impact protection system 10, it creates an average impact force 18 over a system impact area 20. As a result of the impact force 18, an outer surface shock response or wave 23 is created within the outer layer 24. The magnitude and energy of the outer surface shock response is dependent on the material of the outer layer 24 and the impact force 18. A majority of the energy of the impact force 18, however, will be concentrated in the system impact area 20 and directed toward the body part. As an analogy, consider a rock dropped into a still pond. The rock creates a rippling wave on the surface of the pond (i.e., an impact shock response or wave), but the rock continues to fall to the bottom of the pond. In this analogy, the rock is the impact force and the surface of the pond is the outer layer.

In this example, the system impact area 20 corresponds to the outer or top area of a component or cell of the impact force dampening and defusing structure 14. As such, a majority of the impact force 18 is applied to one cell. The cell functions to convert the impact force 18 into an angular force 25. When the angular force 25 reaches the inner layer 12, it creates a normal force component 28 and a tangential force component 30. Depending on the material of the inner layer 12, the angular force 25 may also create a shock wave 27 in the inner layer 12. For example, if the inner layer includes a combination of padding and a non-malleable to semi-malleable plastic or the like, then a surface wave would be created in the plastic portion.

In addition, the cell creates a body part impact area 22 that is larger (e.g., 2X or more) than the system impact area 20 via the angular force 25. Note that the body part impact area 22 would be even larger if the impacting object 21 impacted the system 10 between cells. In this instance, two or more cells would share the impact force 18 and respective create angular forces and collectively form a larger body part impact area 22.

Figure 10:
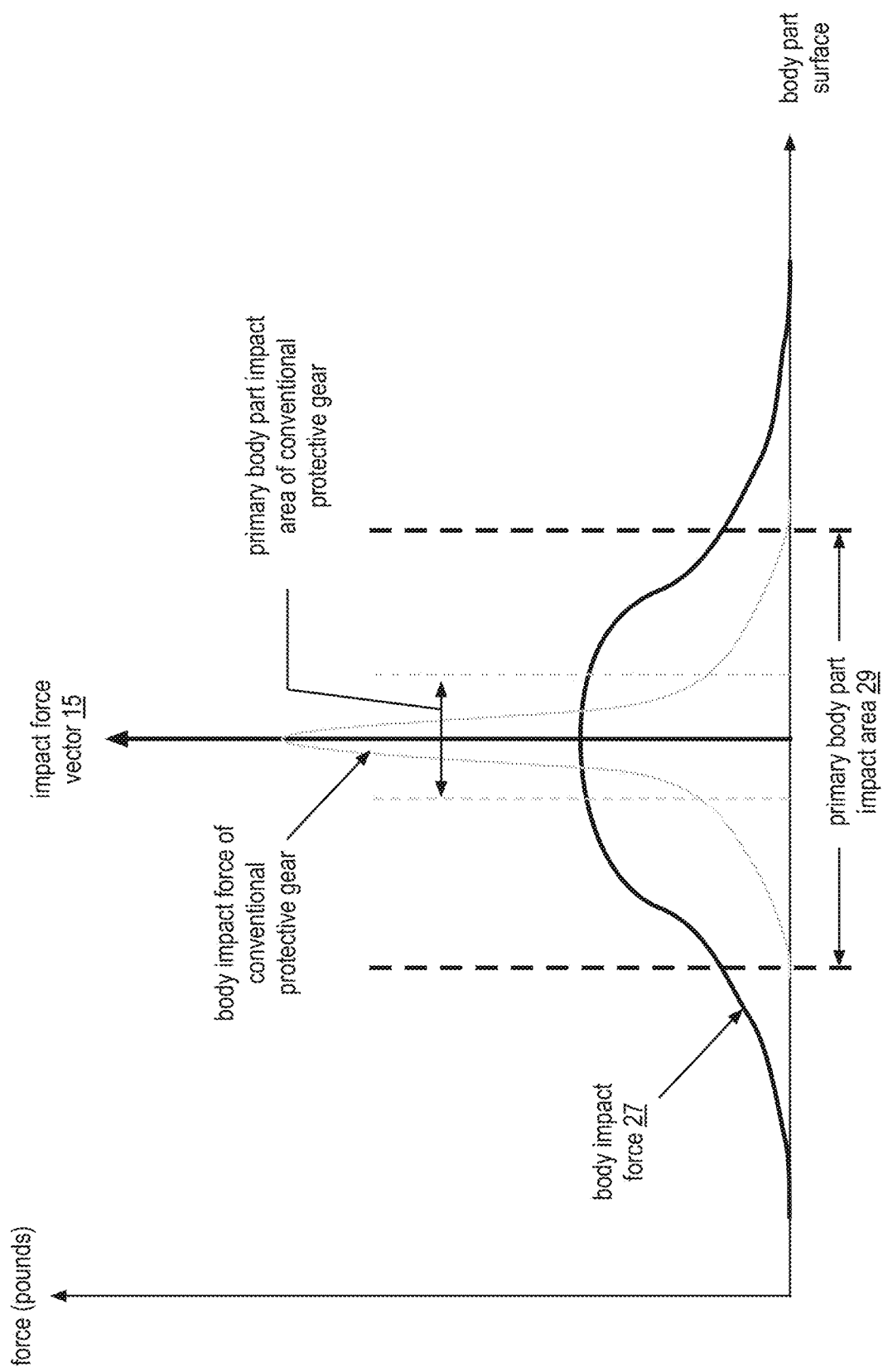
FIG. 10 is a graph of an example of impact force components v. body impact area of a body impact protection system in accordance with the present invention.

FIG. 10 is a graph of an example of impact force components v. body impact area of a body impact protection system. In this example, the vertical axis corresponds to force in force-pounds and the horizontal axis corresponds to a body part surface area. The thicker darker lines correspond to the body impact protection system 10 and the thinner lighter lines corresponds to conventional protective gear.

For the body impact protection system 10, the impact force reaching the body is spread out over a larger area of the body and has lower magnitudes in comparison to the conventional protective gear. As such, the pressure applied to the body is less with the body impact protection system 10 than conventional protective gear.

Figure 12:
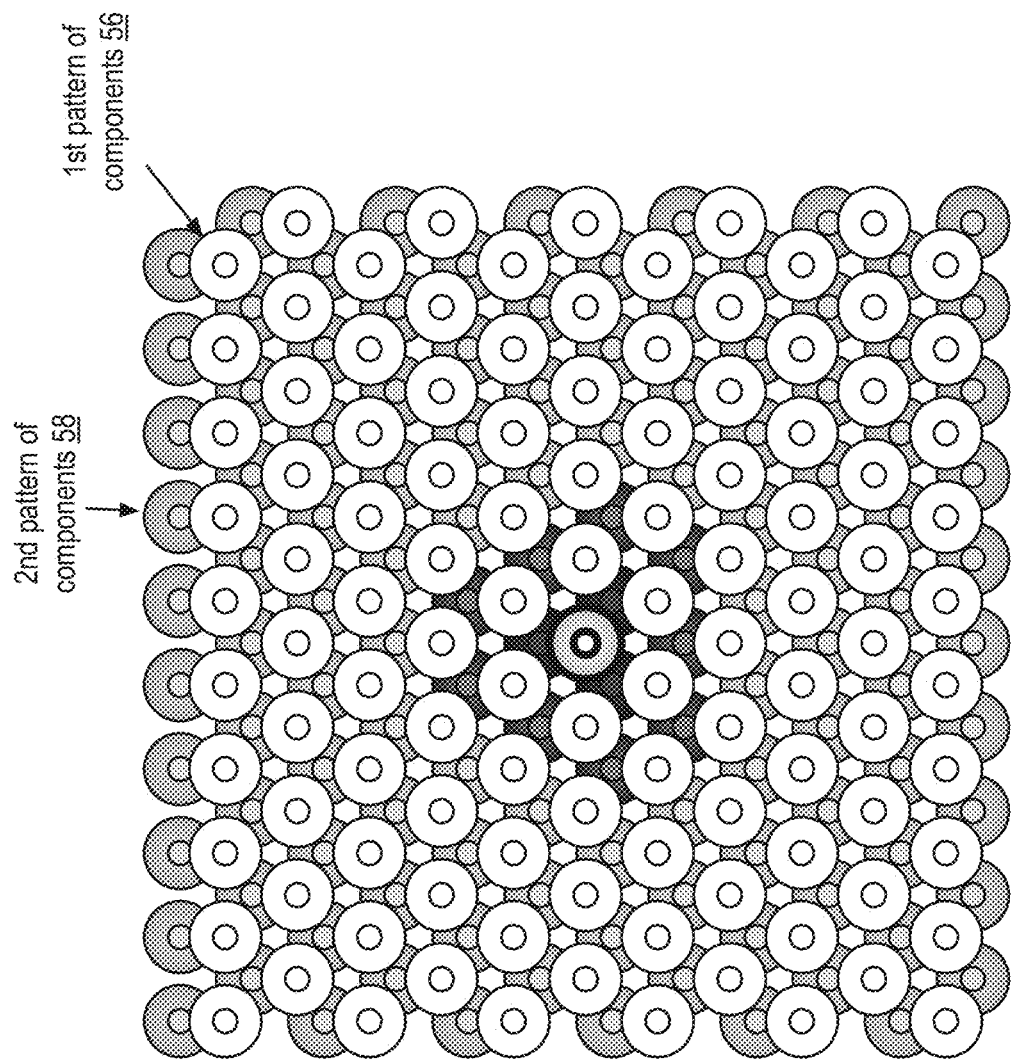
FIG. 12 is a schematic block diagram, in a top view, of another embodiment of a body impact protection system in accordance with the present invention.
Figure 11:
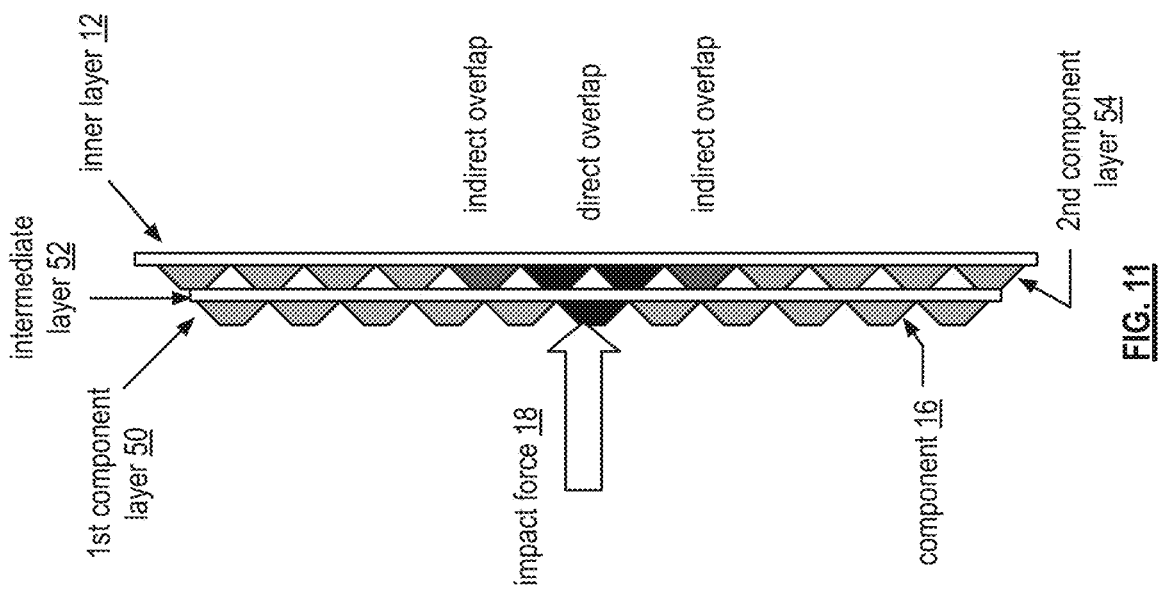
FIG. 11 is a schematic block diagram, in a side view, of another embodiment of a body impact protection system in accordance with the present invention.

FIGS. 11 and 12 are schematic block diagrams, in a side view and a top view, of another embodiment of a body impact protection system 10 that includes two component layers 50 and 54, an intermediate layer 52, and an inner layer 12. The components of the first layer 50 are positioned to overlap (from the top view) two or more components of the second layer 54. The components 16 of both layers 50 and 54 may be of the same size, shape, and material composition, of different size, of different shape, and/or of different material composition, or a combination thereof. The intermediate layer 52 and the inner layer 12 may be of the same size, shape, and material composition, of different size, of different shape, and/or of different material composition, or a combination thereof.

For example, the first component layer 50 will be subjected to a greater impact force than the second component layer 54. As such, the components 16 of the first layer have a more rigid material composition (i.e., able to withstand a large impact force) than the components of the second layer. As an optional addition, the components of the first layer have a larger side wall angle θ (i.e., larger sine value) than the components of the second layer such that the components of the second layer provide more dampening of the impact force than the components of the first layer.

When an impact force 18 is applied to the first component layer 50, one or more components 16 are impacted. The component(s) 16 of the first layer (e.g., the darker component of the first layer) dampen and defuse the impact force 18, which is then applied to the intermediate layer 52. Depending on the material composition of the intermediate layer 52, the dampened and defused impact force is applied to a group of components of the second layer 54.

As an example, the intermediate layer 52 is composed of a foam material that has a high dampening ratio and a low rigidity factor (i.e., the intermediate layer further dampens the impact force but does little to distribute it over a larger area than the receiving area). In this example, the group of components of the second layer 54 would be the ones having a direct overlap with the impacted component(s) of the first layer 50, which are shown as darkened cells.

As another example, the intermediate layer 52 is composed of a rigid material (e.g., plastic, carbon fiber, etc.) that has a low dampening ratio and a high rigidity factor (i.e., the intermediate layer does little to further dampen the impact force but does distribute it over a larger area than the receiving area). In this example, the group of components of the second layer 54 would be the ones having a direct overlap with the impacted component(s) of the first layer 50 and another circle of components surrounding them having indirect overlap, which are shown as darker cells. In another example, the intermediate layer 52 includes a combination of foam material and rigid material.

In another example, each component layer includes components arranged in a grid array (e.g., arranged in rows and columns, arranged in a repeating pattern, randomly arranged, etc. provide that, from layer to layer, the components of an outer layer overlap multiple components of an inner layer). Each of the components has a three-dimensional geometric shape that includes an impact receiving surface area and an impact defusing surface area that are separated by a distance "d". Each of the components further includes a material composition that is the same or different from component to component or layer to layer. This example or other examples, further include an impact surface layer (e.g., an outer layer) juxtaposed to the impact receiving surface area of the components and an impact defusing surface layer (e.g., an intermediate and/or inner layer) juxtaposed to the impact defusing surface area of the components.

Figure 13:
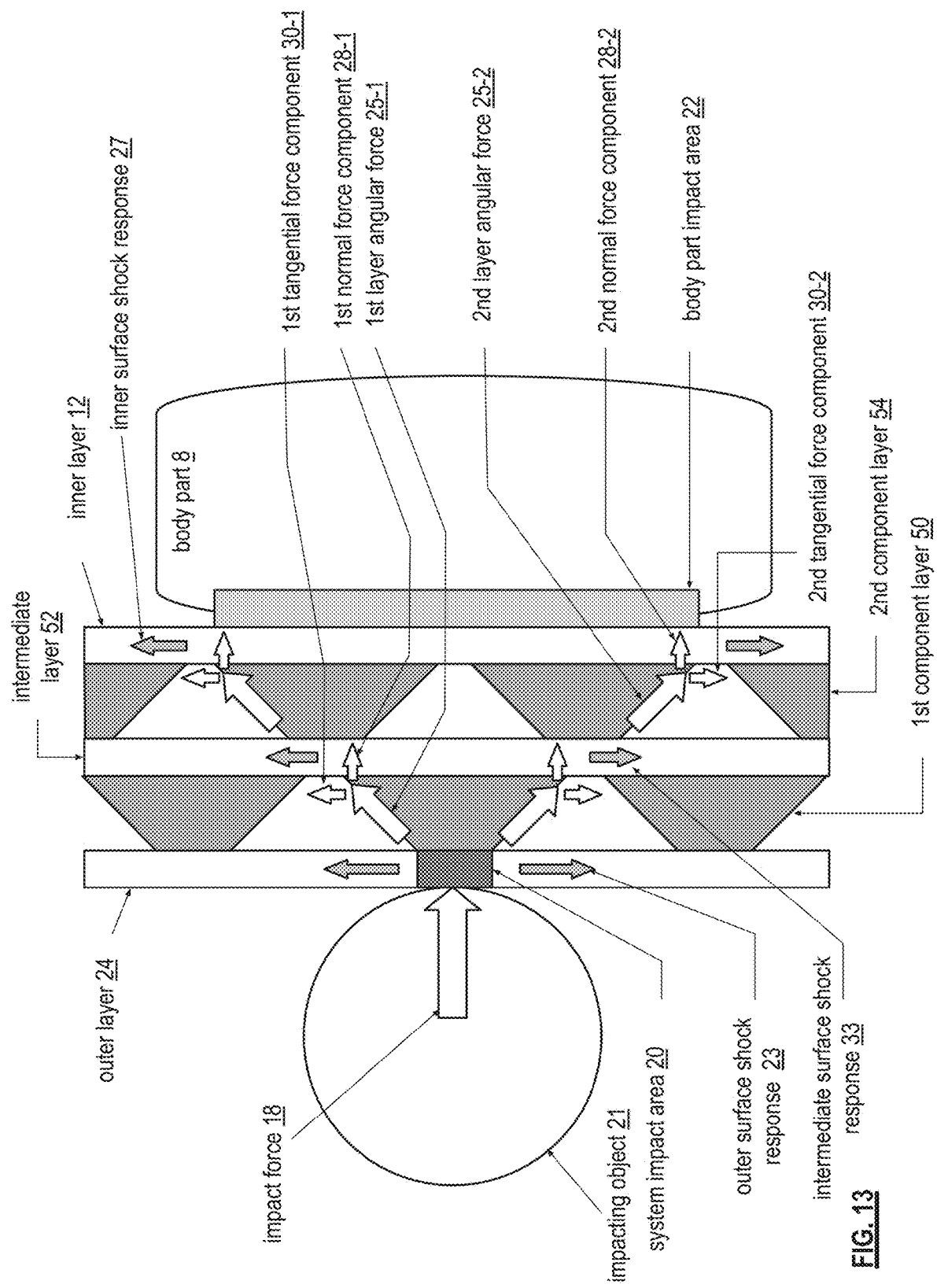
FIG. 13 is a schematic block diagram, in a side view, of another example of force components within a body impact protection system in accordance with the present invention.

FIG. 13 is a schematic block diagram, in a side view, of another example of force components within a body impact protection system 10 that is similar to FIG. 9 but with the addition of the intermediate layer 52 and the first component layer 50. In this example, when on object 21 (e.g., a ball) collides with the body impact protection system 10, it creates an average impact force 18 over a system impact area 20. As a result of the impact force 18, an outer surface shock response or wave 23 is created within the outer layer 24. The magnitude and energy of the outer surface shock response is dependent on the material of the outer layer 24 and the impact force 18. A majority of the energy of the impact force 18, however, will be concentrated in the system impact area 20 and directed toward the body part.

In this example, the impact force is applied the outer or top area of a component or cell of the first layer 50. As such, a majority of the impact force 18 is applied to one cell. The cell functions to convert the impact force 18 into an angular force 25-1. When the angular force 25-1 reaches the intermediate layer 52, it creates a normal force component 28-1 and a tangential force component 30-1. Depending on the material of the intermediate layer 52, the angular force 25-1 may also create a shock wave (or response) 33 in the intermediate layer 52.

The normal force components 28-1 are applied to two cells of the second layer 54. As such, each cell receives about one-half of the normal impact force component produced by the first layer 50. Each of the cell functions to convert the normal impact force component 28-1 into a second angular force 25-2. When the second angular force 25-2 reaches the inner layer 12, it creates second normal force components 28-2 and second tangential force components 30-2. Depending on the material of the inner layer 12, the second angular force 25-2 may also create a second shock wave (or response) 27 in the inner layer 12.

In addition, the cells of the second layer 54 creates a body part impact area 22 that is significantly larger (e.g., 10X or more) than the system impact area 20 via the angular forces 25-1 and 25-2. Note that the body part impact area 22 would be even larger if the impacting object 21 impacted the system 10 between cells. In this instance, two or more cells of the first layer 50 would share the impact force 18 and respective create angular forces and collectively form a larger impact area being exerted on the intermediate layer 52 and engage more components of the second layer 54.

Figure 14B:
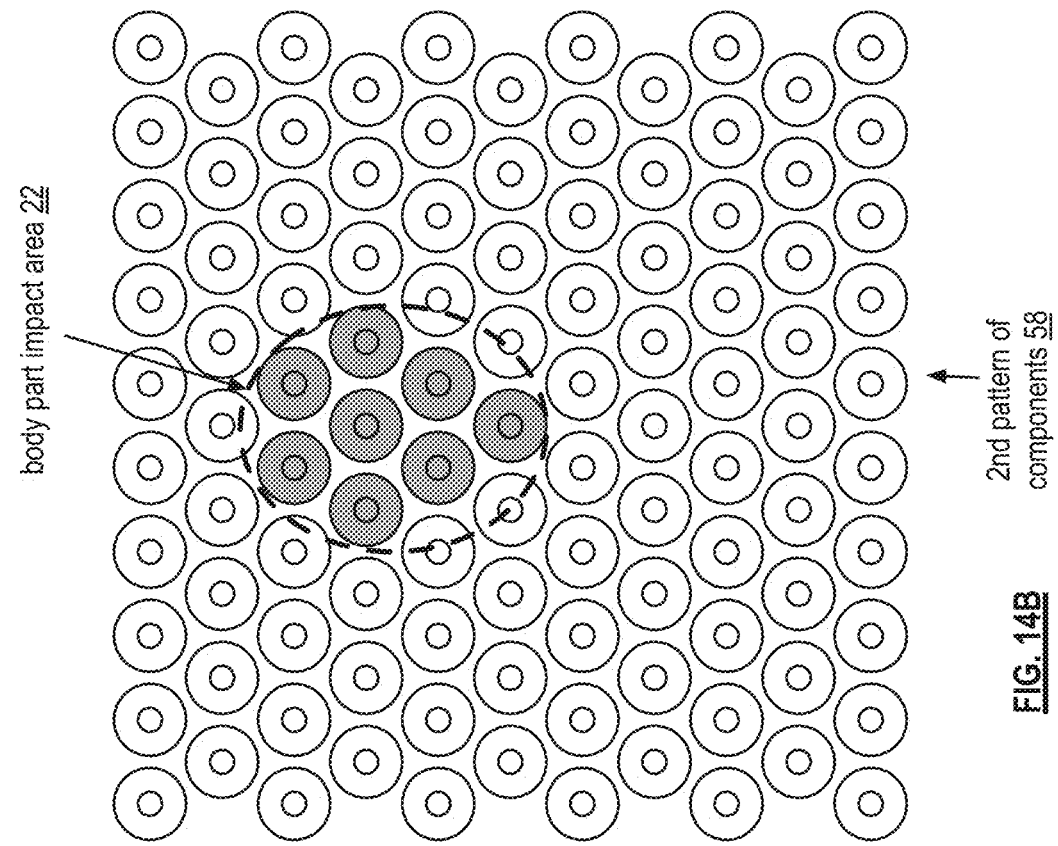
FIGS. 14A-14B are a schematic block diagram of an example of force defusing and distribution layer by layer within a body impact protection system in accordance with the present invention.
Figure 14A:
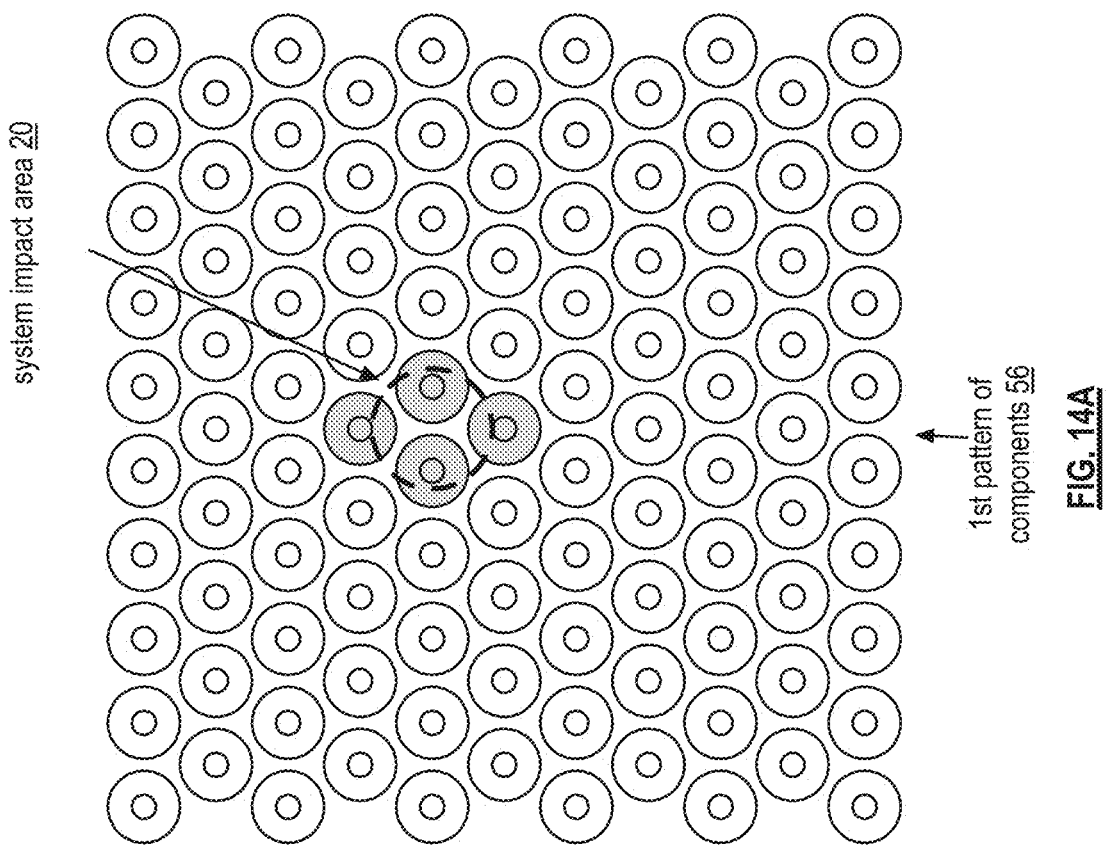

FIGS. 14A-14B are a schematic block diagram of an example of an impact force being defused and distributed layer by layer within a body impact protection system 10. From a top view perspective and as shown in FIG. 14A, the outer (or top) surfaces of four components 16 of the first layer 50 receive the impact force in the system impact area 20. The components of the first layer are arranged in a pattern 56.

The second layer 54 of components includes a second pattern of components 58 that is complimentary to the first pattern of components 56. In particular, a component of the first layer overlaps multiple components of the second layer such that, from layer to layer, more and more components are dampening and defusing the impact force. In FIG. 14B, eight components or cells of the second layer are receiving a portion of the normalized impact force created by the four components or cells of the first layer. The base of the eight cells of the second layer form the body part impact area 22, which is significantly larger than the system impact area 20.

FIG. 15 is a schematic block diagram, in a side view, of another embodiment of a body impact protection system 10 that includes an inner layer 12, an outer layer 24, a plurality of component layers 50, 54, 60-64 (five in this example, but could be more or less than five); and a plurality of intermediate layers 52, 66-70 (four in this example, but could be more or less). The first component layer 50 includes a plurality of components arranged in a first pattern; the second component layer 54 includes a plurality of components arranged in a second pattern; the third component layer 60 includes a plurality of components arranged in a third pattern; the fourth component layer 62 includes a plurality of components arranged in a fourth pattern; and the fifth component layer 64 includes a plurality of components arranged in a fifth pattern. From layer to layer, the pattern of components is at least partially complimentary such that one component of an outer layer overlaps, or overlays, multiple components of an inner layer.

From layer to layer, the size, shape, side wall angle θ, and/or material composition of the components may be different. For example, first layer 50, which is the outer most layer of components, has components that are comprised of a material that can withstand impact force pulses up to 50,000 force-pounds of force for 20-100 milliseconds (mSec). Continuing with the example, the side wall angle of the components of the first layer is 45 degrees, such that the normal force produced by the first layer of components is 0.0707 of the external impact force. As such, the impact force being exerted by the first layer of components on the first intermediate layer 52 will be 0.707*50,000 pounds, which equals 35,350 force-pounds.

Continuing with the example, the first intermediate layer 52 has a low dampening ratio and a high rigidity factor such that a majority of the impact force received from the first layer of components is provided to components of the second layer. In this example, the side wall angle of the components of the second layer is 42.5 degrees, such that the normal force produced by the second layer of components is 0.676 of the impact force it receives. As such, the impact being exerted by the second layer of components in the second intermediate layer 66 is 0.676*35,350, which equals 23,880 force-pounds.

Continuing with the example, the second intermediate layer 66 has a low dampening ratio and a high rigidity factor such that a majority of the impact force received from the second layer of components is provided to components of the third layer. In this example, the side wall angle of the components of the third layer is 40 degrees, such that the normal force produced by the third layer of components is 0.643 of the impact force it receives. As such, the impact being exerted by the third layer of components in the third intermediate layer 68 is 0.643*23,880, which equals 15,350 force-pounds.

Continuing with the example, the third intermediate layer 68 has a low dampening ratio and a high rigidity factor such that a majority of the impact force received from the third layer of components is provided to components of the fourth layer. In this example, the side wall angle of the components of the fourth layer is 35 degrees, such that the normal force produced by the third layer of components is 0.536 of the impact force it receives. As such, the impact being exerted by the fourth layer of components in the fourth intermediate layer 68 is 0.574*15,350, which equals 8,804 force-pounds.

Continuing with the example, the third intermediate layer 68 has a low dampening ratio and a high rigidity factor such that a majority of the impact force received from the third layer of components is provided to components of the fourth layer. In this example, the side wall angle of the components of the fourth layer is 35 degrees, such that the normal force produced by the fourth layer of components is 0.536 of the impact force it receives. As such, the impact being exerted by the fourth layer of components in the fourth intermediate layer 68 is 0.574*15,350, which equals 8,804 force-pounds.

Continuing with the example, the fourth intermediate layer 68 has a low dampening ratio and a high rigidity factor such that a majority of the impact force received from the fourth layer of components is provided to components of the fifth layer. In this example, the side wall angle of the components of the fifth layer is 30 degrees, such that the normal force produced by the fifth layer of components is 0.500 of the impact force it receives. As such, the impact being exerted by the fifth layer of components in the inner layer 12 is 0.500*8,804, which equals 4,402 force-pounds.

Continuing with the example, the inner layer 12 has a high dampening ratio (e.g., 0.55) and a low rigidity factor. As such, 0.55 of the impact force exerted on the inner layer is passed to the body part. In this example, the body part would receive an average impact force of 0.55*4,402, which equals 2,421 force pounds. The resulting impact force is spread out over the body impact area to produce an impact pressure. For instance, a body impact area of 5.5 square inches yields a pressure of 440 PSI (pounds per square inch).

In this example, the components of the first layer will need to withstand impact forces of up to 50,000 force pounds; the components of the second layer will need to withstand an impact force of 35,350 force-pounds; the components of the third layer will need to withstand an impact force of 23,880 force-pounds; the components of the fourth layer will need to withstand an impact force of 15,350 force-pounds; and the components of the fifth layer will need to withstand an impact force of 8,804 force-pounds.

To reduce the impact force and impact pressure being exerted on the body of the above example, additional layers can be added. For example, by adding three more layers, each having components with side wall angles of 30 degrees, then the body impact force is further reduced by $0.5^3$, which equals 0.125. With the additional three layers, the resulting impact force being applied to the inner layer 12 is 0.125*4,402, which equals 550 force pounds. With the inner layer 12 having a dampening factor of 0.55, the body impact force is 302.5 force-pounds. With a body impact area of 5.5 square inches, the resulting body impact pressure is 55 PSI.

Another way to reduce the impact force and impact pressure being exerted on the body of the above example is to have the intermediate layers have a high dampening ratio (e.g., 0.67). With four intermediate layers, the cumulative dampening is $0.67^4$, which equals 0.2. Thus, the impact force being applied to the inner layer is 0.2*4,402, which equals 887 force-pounds. With the inner layer 12 having a dampening factor of 0.55, the body impact force is 487 force-pounds. With a body impact area of 5.5 square inches, the resulting body impact pressure is 89 PSI.

Figure 16A:
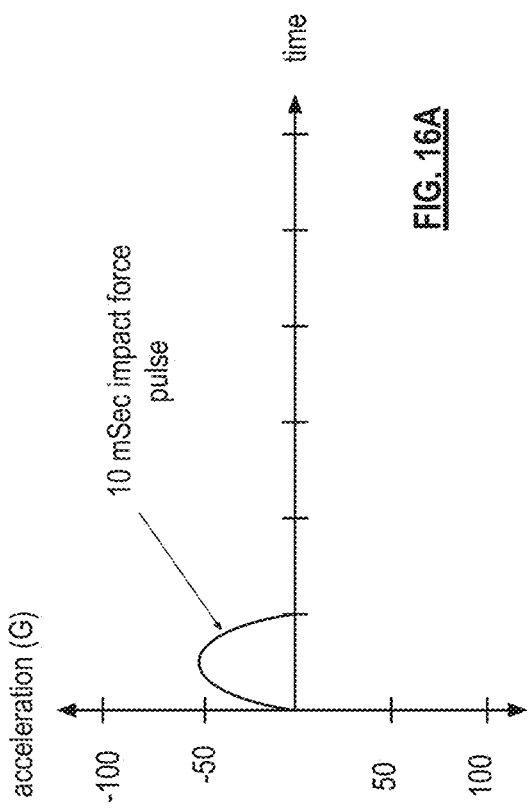
FIG. 16A is a graph of an example of an impact force pulse v. time.

FIG. 16A is a graph of an example of an impact force pulse v. time. In this example, the vertical axis is acceleration in G-forces (G), where G-Force is a measure of acceleration with respect to earth's gravitational field. For instance, G=a/g, where a is acceleration and g is the earth's gravitational field. The horizontal axis is time scaled in mSec. The example further includes an impact pulse that has a magnitude of about −50 G and has a pulse duration of about 10 mSec.

Figure 16B:
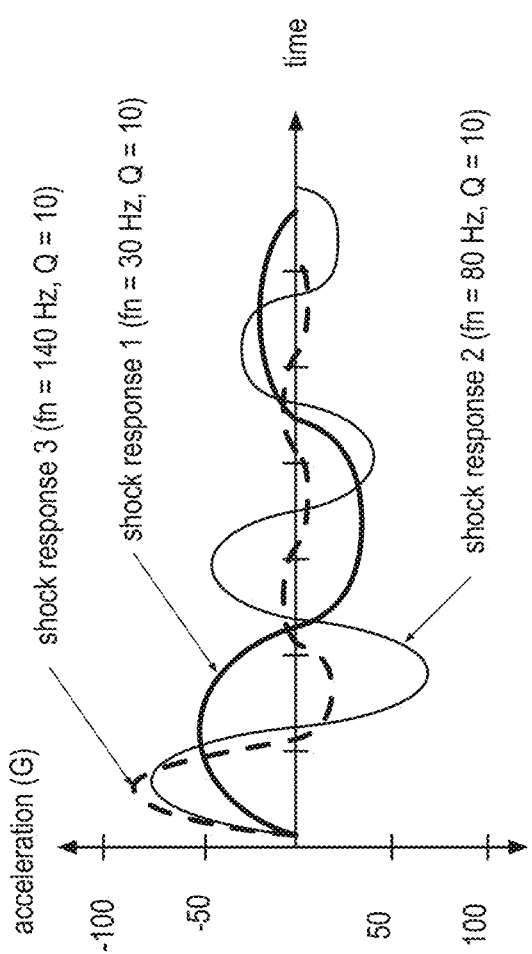
FIG. 16B is a graph of an examples of frequency responses of different layers of a body impact protection system having different resonant frequencies in accordance with the present invention.

FIG. 16B is a graph of an examples of frequency responses of different layers (e.g., layers of components, the intermediate layers, the outer layer, and/or the inner layer) of a body impact protection system having different resonant frequencies. In this example, the vertical axis is acceleration in G-forces (G) and the horizontal axis is time scaled in mSec.

By varying the material composition of the layers, various resonant frequencies are obtained. With different resonant frequencies, different shock responses are produced. With proper selection of the resonant (or natural) frequencies, the resulting different shock responses destructively interfere with each other to further reduce the impact force being exerted on the body. In this example, a first layer has a first shock response, a second layer has a second shock response, and a third layer has a third shock response.

In addition to selecting the resonant or natural frequency of the various layers, the quality factor (Q) can be selected. With a higher quality factor, side bands dampen faster, but the main frequency passes substantially unattenuated. With a low-quality factor, the side bands dampen slower, but the main frequency is somewhat attenuated (e.g., reduced by 10% or more).

Figure 17B:
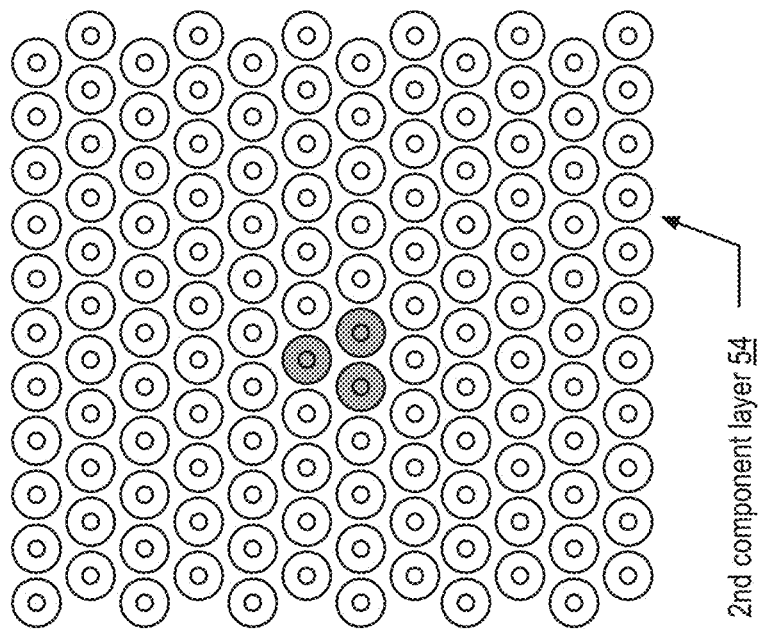
FIGS. 17A-17E are a schematic block diagram of an example of force defusing and distribution layer by layer within a body impact protection system in accordance with the present invention.
Figure 17A:
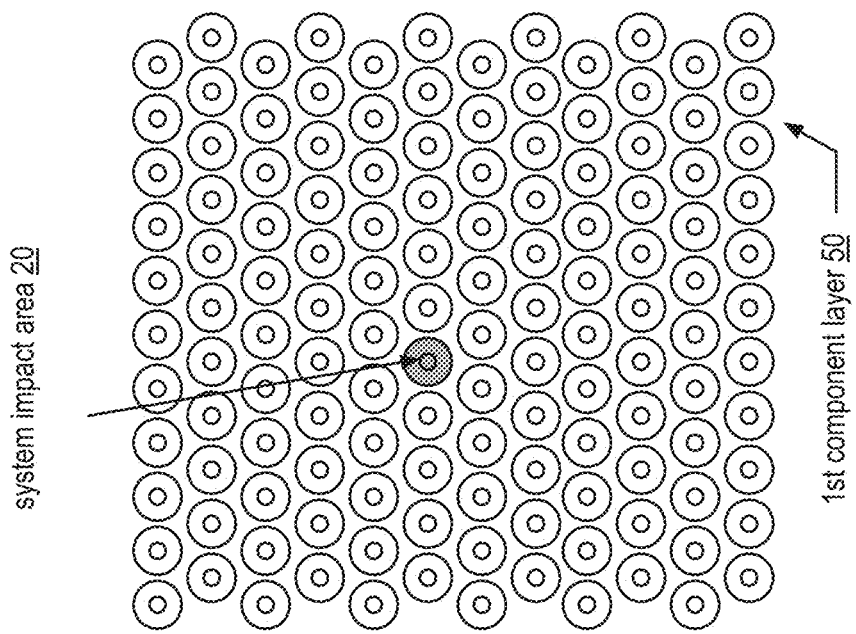

FIGS. 17A-17E are a schematic block diagram of an example of force defusing and distribution layer by layer within a body impact protection system 10 of FIG. 15. With reference to FIG. 17A, the 1$^{st}$ component layer 50 receives the impact force via one component or cell. As such, the system impact area 20 corresponds to the area of the top or outer surface area of the component. The component functions to dampen and defuse the received impact force based on the side wall angle θ and the distance "d" of the component (e.g., the distance between the top surface area and the bottom surface area of the component).

With the patterns between the layers being complimentary, the impacted component on the first layer 50 overlaps three components of the second layer as shown in FIG. 17B. Ideally, the force exerted by the component of the first layer 50 is equally distributed among the three components of the second layer 54. Each of the components of the second layer function to dampen and defuse the received impact force based on the side wall angle θ and the distance "d" of the component.

Figure 17D:
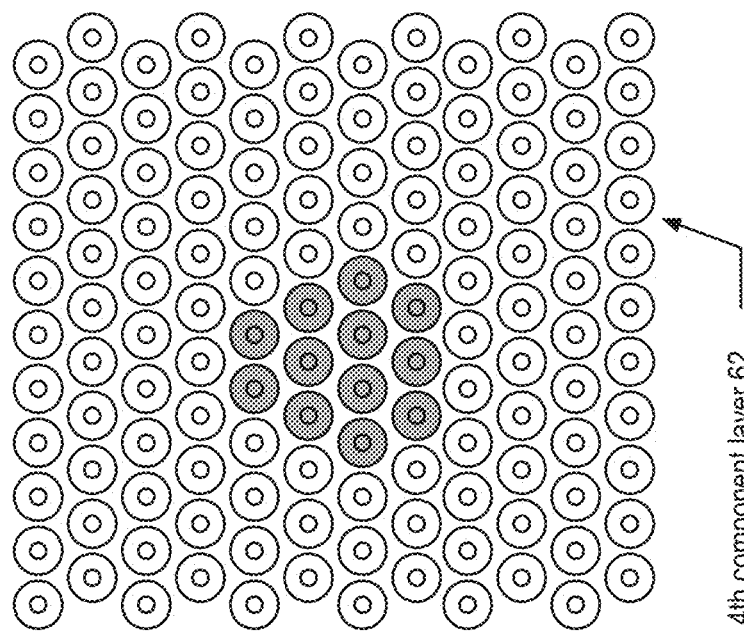
Figure 17C:
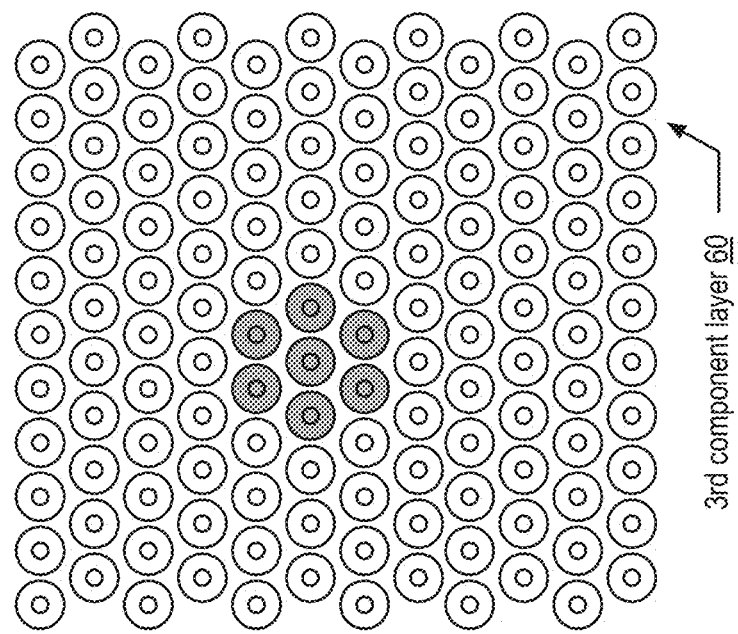

FIG. 17C illustrates seven components of the third layer 60 receiving an impact force component from the three components of the second layer 54. Each of the seven components of the third layer function to dampen and defuse the received impact force based on the side wall angle θ and the distance "d" of the component.

FIG. 17D illustrates twelve components of the fourth layer 62 receiving an impact force component from the seven components of the third layer 60. Each of the twelve components of the fourth layer function to dampen and defuse the received impact force based on the side wall angle θ and the distance "d" of the component.

Figure 17E:
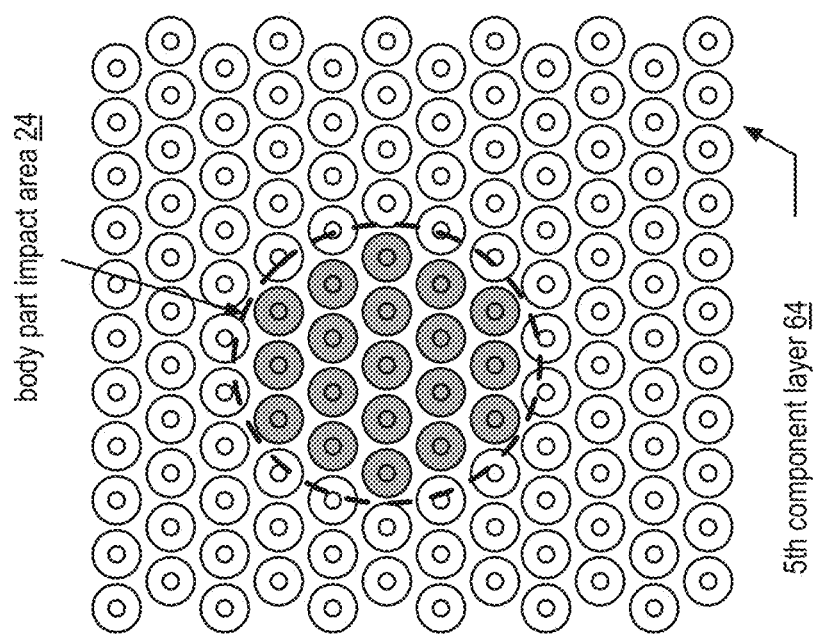

FIG. 17E illustrates nineteen components of the fifth layer 64 receiving an impact force component from the twelve components of the fourth layer 62. Each of the nineteen components of the fifth layer function to dampen and defuse the received impact force based on the side wall angle θ and the distance "d" of the component. The body impact area 24 is the sum of the area of the base of the nineteen components. As an example, the base of a component has an area that is nine times the area of the top of the component. For this example, the body part impact area 24 is 9*19 times larger than the system impact area 20 (as shown in FIG. 17A), which is 171 times larger. As such, the resulting impact pressure applied to the body is up to 171 times less than in conventional protection gear, assuming comparable force dampening ratios.

Figure 18:
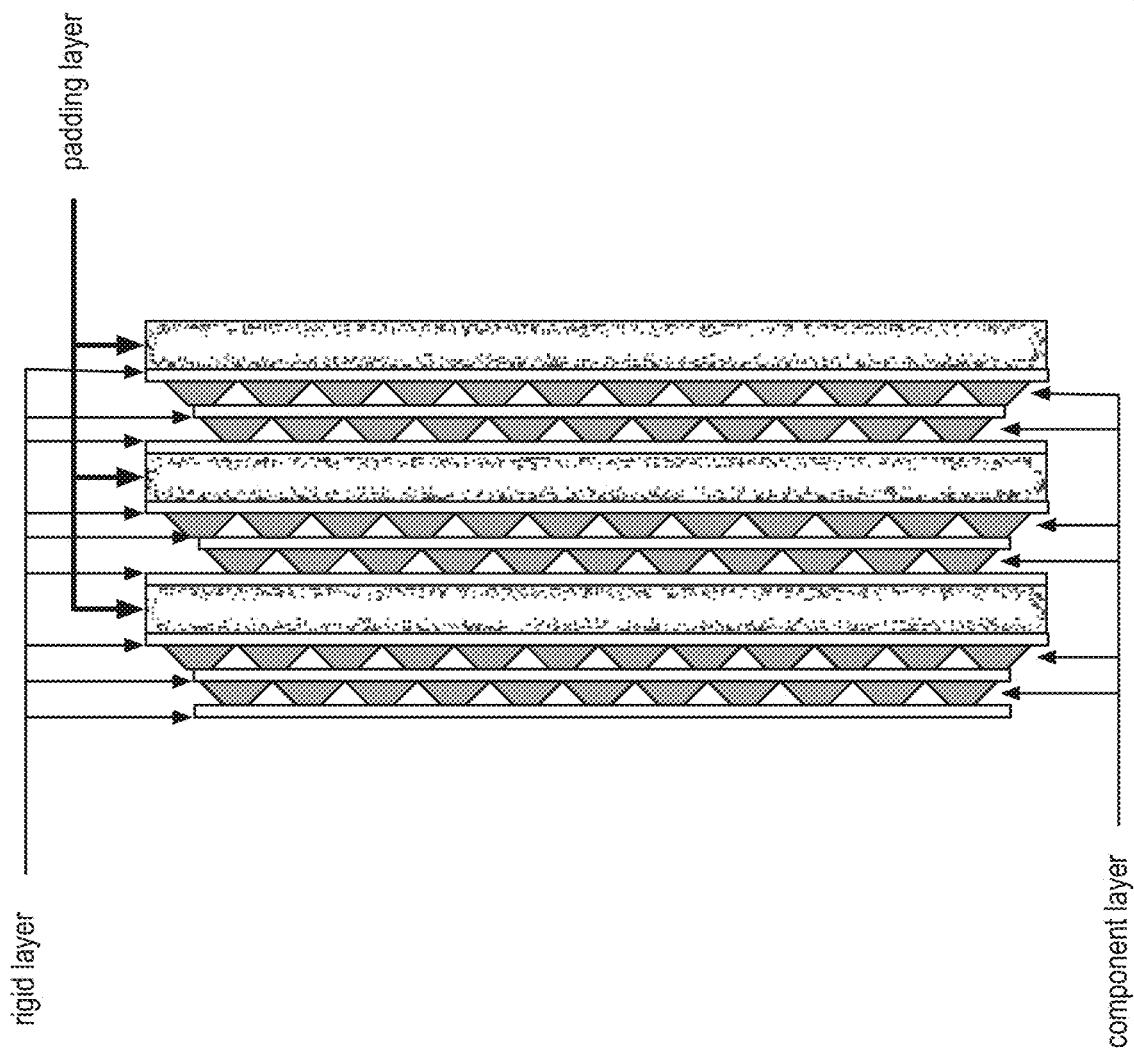
FIG. 18 is a schematic block diagram, in a side view, of another embodiment of a body impact protection system in accordance with the present invention.

FIG. 18 is a schematic block diagram, in a side view, of another embodiment of a body impact protection system that includes a plurality of component layers, a plurality of rigid layers, and a plurality of padding layers. This example includes three groupings of two component layers, three rigid layers, and one padding layers. In a grouping, the two component layers are sandwiched between the three rigid layers. The padding layer is on the dampening and defusing side of the component layers.

The number of each layer type can vary from the numbers shown in this example and may be in different layering configurations. For example, the body impact protection system could include two or four groupings. In another example, the body impact protection system includes three component layers and four rigid layers in a grouping. In yet another example, the body impact protection system includes three component layers and two rigid layers in a grouping, where one rigid layer is on the impact receiving side of the three component layers and the other rigid layer is on the dampening and defusing side of the component layers. In yet a further example, the body impact protection system does not include rigid layers, it only includes component layers and padding layers. In a still further example, the body impact protection system includes only component layers and rigid layers. These are but a few examples of the almost endless combination of component layers, rigid layers, and/or padding layers.

FIG. 19 is a schematic block diagram, in a cross-section side view, of another embodiment of a defusing cell or component of a layer of a body impact protection system. The cell includes a top surface 70-1, a base surface 72-1, a side structure 76, and a distance "d" 74 that is the distance between the top surface and the base surface. In this embodiment, the center of the cell is hollow and the top and base are open. The side structure 76 is angled from the base surface to the top surface at the side wall angle θ and has a thickness such that the component, or cell, includes an outer shell and an interior volume. The interior volume can be filled with air, a gel, an oil, rubber, silicon, and/or foam. The component or cell is comprised of a material composition (as previously described) that, when an impact force is applied, retains the angle θ within +/−33% and retains the ratio of Ai to Ao to within +/−33%.

FIG. 20 is a schematic block diagram, in a side view, of another embodiment of a defusing cell or component of a layer of a body impact protection system. The cell includes a top surface 70-1, a base surface 72-1, a side structure 76, and a distance "d" 74 that is the distance between the top surface and the base surface. In this embodiment, the center of the cell is hollow. The side structure 76 is angled from the base surface to the top surface at the side wall angle θ. Each of the top surface 70-1, the base surface 72-1, and the side structure 76 has a thickness such that the component, or cell, includes an outer shell and an interior volume. The interior volume can be filled with air, a gel, an oil, rubber, silicon, and/or foam. The component or cell is comprised of a material composition (as previously described) that, when an impact force is applied, retains the angle θ within +/−33% and retains the ratio of Ai to Ao to within +/−33%.

FIGS. 21A-21F are a schematic block diagrams, in a top view, of other embodiments of a defusing cell of a layer of a body impact protection system. Each of the defusing cells or components includes a top perimeter that outlines the top surface area and a base perimeter that outlines the base surface area. The top surface area is the impact force receiving surface and the base surface area is the dampening and defusing side.

FIG. 21A illustrates the defusing cell or component having a circular shape from a top perspective. As such, the top perimeter 80 and the bottom perimeter 82 each have a circular shape. The radius of the bottom perimeter 82 is at least 1.414 times the radius of the top perimeter 80 such that the base surface area is at least 2 times the surface area of the top surface area. With a circular shape for the top and base perimeters, the cell or component has a conical shape.

FIG. 21B illustrates the defusing cell or component having an elliptical or oval shape from a top perspective. As such, the top perimeter 80-1 and the bottom perimeter 82-1 each have an elliptical or oval shape. The dimensions of the bottom perimeter 82-1 and of the top perimeter 80-1 are selected such that the base surface area is at least 2 times the surface area of the top surface area. With an elliptical or oval shape for the top and base perimeters, the cell or component has an elliptical or oval conical shape.

FIG. 21C illustrates the defusing cell or component having a square shape from a top perspective. As such, the top perimeter 80-2 and the bottom perimeter 82-2 each have a square shape. The dimensions of the bottom perimeter 82-2 and of the top perimeter 80-2 are selected such that the base surface area is at least twice the surface area of the top surface area. With a square shape for the top and base perimeters, the cell or component has a pyramid shape.

FIG. 21D illustrates the defusing cell or component having a rectangular shape from a top perspective. As such, the top perimeter 80-3 and the bottom perimeter 82-3 each have a rectangular shape. The dimensions of the bottom perimeter 82-3 and of the top perimeter 80-3 are selected such that the base surface area is at least twice the surface area of the top surface area. With a rectangular shape for the top and base perimeters, the cell or component has an elongated pyramid shape.

FIG. 21E illustrates the defusing cell or component having a triangular shape from a top perspective. As such, the top perimeter 80-4 and the bottom perimeter 82-4 each have a triangular shape. The dimensions of the bottom perimeter 82-4 and of the top perimeter 80-4 are selected such that the base surface area is at least twice the surface area of the top surface area. With a triangular shape for the top and base perimeters, the cell or component has a three-dimensional triangular shape.

FIG. 21F illustrates the defusing cell or component having an octagon shape from a top perspective. As such, the top perimeter 80-5 and the bottom perimeter 82-5 each have an octagon shape. The dimensions of the bottom perimeter 82-5 and of the top perimeter 80-5 are selected such that the base surface area is at least twice the surface area of the top surface area. With an octagon shape for the top and base perimeters, the cell or component has a three-dimensional octagon shape.

FIGS. 21A-21F are a few examples of the possible shapes of the components or defusing cell. Other examples include a pentagon shape, a hexagon shape, and/or other polygon shape. As another example, the top perimeter could be one shape and the base perimeter could be another shape.

FIGS. 21G-21J-2 are diagrams of another defusing cell or component. The defusing cell or component has a substantially square or rectangular shaped top perimeter 80-6 and base perimeter 82-6 with a hole running the distance "d" through the middle. The base perimeter 82-6 has angular cut corners (e.g., at $\theta_2$), has a width of "w", and a height of "h". The top perimeter 80-6 has a width of "w1" and a height of "h1". The top surface area outlined by the top perimeter 80-6 is the distance "d" from the base surface area outlined by the base perimeter 82-6. The side walls of the cell are angled at the side wall angle of $\theta_1$, where $\theta_1$ is readily calculable from w, h, w1, h1, and d, or d is readily calculable from w, h, w1, h1, and $\theta_1$.

The hole at the top surface has a width of "w2" and a height of "h2". In an example, the hole runs straight through the cell as shown in the cross-sectional side view of FIG. 21J-1. In another example, the hole increases in sizes as it traverses from the top surface to the base surface of the cell as shown in the cross-sectional side view of FIG. 21J-2. The combination of the hole and the angled corners of the base surface allow air flow from layer to layer.

FIGS. 21K-21N are diagrams of another defusing cell or component that is similar to the cell of FIGS. 21G-21J-2 with the addition of perforation holes or vents to improve air flow and/or reduce weight of the cell. The perforation holes or vents may be circular, rectangular, square, or other polygon shape and pass through the cell from the top surface to the bottom surface. Alternatively, some or all of the perforation holes do not pass fully from the top surface to the base surface. These holes may only pass 50%-90% of the way through the cell to reduce weight.

FIGS. 21O and 21Q-21S-2 are diagrams of another defusing cell or component. The defusing cell or component has, from a top perspective, a substantially square or rectangular shaped top perimeter 80-6 and base perimeter 82-6 with a hole running the distance "d" through the middle. From the side view and/or the front view, the defusing cell or component has an arch shape, which allows for a layer of such cells to be fitted to a curved and/or spherical shaped body part. Note that the cell may only have on arched perspective from the side or front view.

The base perimeter 82-7 has angular cut corners (e.g., at $\theta_2$), has a width of "w", and a height of "h". The top perimeter 80-7 has a width of "w1" and a height of "h1". The top surface area outlined by the top perimeter 80-7 is the distance "d" from the base surface area outlined by the base perimeter 82-7. The side walls of the cell are angled at the side wall angle of $\theta_1$, where $\theta_1$ is readily calculable from w, h, w1, h1, and d, or d is readily calculable from w, h, w1, h1, and $\theta_1$.

The hole at the top surface has a width of "w2" and a height of "h2". In an example, the hole runs straight through the cell as shown in the cross-sectional side view of FIG. 21S-1. In another example, the hole increases in sizes as it traverses from the top surface to the base surface of the cell as shown in the cross-sectional side view of FIG. 21S-2. The combination of the hole and the angled corners of the base surface allow air flow from layer to layer.

As shown in FIGS. 21S-1 and 21S-2, the arced perspective includes an inner radius $r_1$ and an outer radius $r_2$. The inner radius $r_1$ is dependent on the radius of the body part it is protecting, the inner layer thickness, the layer in which the cell lies, the distance "d" between the top and base surface areas, and the thickness of any intermediate layers. The outer radius $r_2$ is dependent on the inner radius $r_1$ and the distance "d" between the top and base surface areas. For example, assume that the body part being protected is the head with a radius of 3 inches, the inner layer is 0.25 inches thick, the cell is in the second layer, the intermediate layer is 0.125 inches thick, and "d" is 0.125 inches. Based on these parameters, the inner radius $r_1$ is (3+0.25+0.125+0.125)=3.5 inches and the outer radius $r_2$ is 3.625 inches.

FIG. 21T is a top and side view of a layer of components or cells as shown in FIGS. 21G-21J-2. The layer includes a plurality of components and a component layer support. The component layer support functions to align the components and may further function to provide some dampening of the impact force. For example, the component layer support is comprised of a rubber material that includes locating holes, slots, and/or other aligning mechanisms for positioning the cells, or components. With the use of a rubber material, the component layer support has a degree of flexibility to allow for custom fitting of the layers and further provides dampening of the impact force. In an embodiment, the component layer support is an intermediate layer as previously described.

FIGS. 21U-21V are diagrams of another defusing cell or component 16 that includes a plurality of spherical, and/or spheroid, elements 85, a suspension material 87, and a housing 89. The housing 89 has an overall size and shape corresponding to one of the components previously described and includes a hollow center region. The spherical elements 85 are positioned within the hollow center region and are comprised of a material composition (e.g., plastic, metal, fiberglass, rubber, wood, carbon-fiber, etc.) that will substantially maintain a spheroid shape (e.g., prolate spheroid, sphere, ovoid, cylinder, cone, arc, etc.) when an impact force is exerted on the cell. The spherical elements 85 may be solid or hollow. Note that the spherical elements may be of different sizes, shapes, and/or material composition within the plurality of spherical elements.

The suspension material 87 may be a liquid and/or a solid (e.g., foam, gel, rubber, paper, cork, cardboard, water, oil, etc.) that, when no force is applied to the cell, keeps the spherical elements 85 in a distributed pattern. When a force is applied to the cell, the spherical elements 85 propagate the impact force through collision of higher level spheroids (e.g., close to the impact force) with lower level spheroids (e.g., further from the impact force). As a result, the spheroids elements defuse (e.g., distribute) and dampen the impact force across the base surface area of the cell. Whether force is applied or not, the suspension material 87 helps hold the spherical elements 85 in the desired pattern. One or more examples of defusing and dampening impact force through layers of spherical elements are discussed with reference to FIGS. 34-44.

FIGS. 21V-1 through 21V-4 are top view, front view, bottom view, and cross-section view diagrams of an embodiment of a defusing cell or component that includes a plurality of walls 200, which form a housing, and a plurality of spheroid elements 208 within the housing. In this embodiment, the top and bottom have a triangle shape. The top, which receives an impact force, is delineated by the first perimeter 202 and the bottom is delineated by the second perimeter 204.

To form the housing, the walls are physically connected together via molding, casting, adhesive, welding, and/or other form of bonding. Each wall has a truncated triangular shape as shown in the front view of FIG. 21V-2. The base angle of a wall ranges from 30 degrees to 85 degrees. The distance between the first perimeter and second perimeter is based on the length of a wall and the base angle of the wall, which is with respect to the first to second perimeters. For example, the distance is based on the length times the cosine of the base angle.

The spheroid elements 85 are positioned within the hollow center region 206 in a pattern to distribute and disperse an impact force impacting the defusing cell from the second perimeter with respect to the first perimeter. In an embodiment, the spheroid elements 85 are held in position by a suspension material 87.

In an example, when an impact force 210 impacts the first perimeter 202 of the cell, the impact force is propagated along the walls producing an x-force component (W_x-force) and a y-force component (W_y-force). During the impact, the cell holds it shape (e.g., height, width, angle, etc., deviate less than 25% as a result of the impact force) such that the x-force component corresponds to the impact force times the sine of the base angle of the walls and the y-force component corresponds to the impact force times the cosine of the base angle of the walls.

In addition, the spheroid on the first layer (e.g., closest to the first perimeter 202) receives a portion of the impact force and collides at an angle (e.g., the base angle of the walls) with the three spheroids of the second layer (e.g., closest to the second perimeter 204). The angular impact with the spheroid elements of the second layer create x and y force components within each spheroid of the second layer. The y force component (S_y-force) is a function of the impact force from the spheroid of the first layer times the angle of impact.

The resulting impact force on the bottom of the cell is distributed (e.g., defused) and dispersed. The distributed and dispersed impact force 212 has a lower magnitude than the impact force 210 based on the cosine of the angle of impact and the base angle of the walls. The reduced impact force is distributed over a larger area (which is bounded by the second perimeter) than the impact area (which is bounded by the first perimeter). As such, the impact pressure (e.g., force times area) is reduced based on both reducing the magnitude of the impact force and spreading it out over a larger area.

FIGS. 21V-5 through 21V-8 are diagrams of another embodiment of a defusing cell or component. This embodiment is similar to the embodiment of FIGS. 21V-1 through 21V-4 with a difference being that this embodiment includes first and second surfaces 214 and 216. The first and second surface are comprised of the same or similar material of the walls or of a different material composition (e.g., one or more materials). As shown, the first surface 214 is coupled (e.g., glued, welded, press-fit, fabricated, etc.) to the walls along the first perimeter 202 and the second surface 216 is coupled to the walls along the second perimeter 204.

FIGS. 21W-21X are side view diagrams of another defusing cell or component that include a flexible shell 99 and a cell platform 101. Each of the flexible shell 99 and cell platform 101 is comprised of a material composition that includes a rubber material, a plastic material, stainless steel, aluminum, and/or a carbon fiber material. The base of the flexible shell 99 fits within the cell platform 101 and is held within the cell platform via the encircling lip 103.

When no force is exerted on the cell, as shown in FIG. 21W, the flexible shell 99 is uncompressed and is not pushing on the encircling lip 103 of the cell platform 101. When an impact force is exerted on the cell, as shown in FIG. 21X, the flexible shell 99 is compressed and its edges are contained with the cell platform 101 via the encircling lip 103. The material composition of the flexible shell 99 is such that it can withstand the impact force, be compressed as shown in FIG. 21X, retained its shape (e.g., maintains a side wall angle), and substantially returns to the uncompressed state as shown in FIG. 21W when the force is removed.

In an example, the flexible shell 99 has a side wall angle of $\theta u$ when it in the uncompressed state and has a side wall angle of $\theta c$ when in the compress state. For instance, $\theta u$ is 45 degrees and $\theta c$ is 35 degrees.

Figure 21Y:
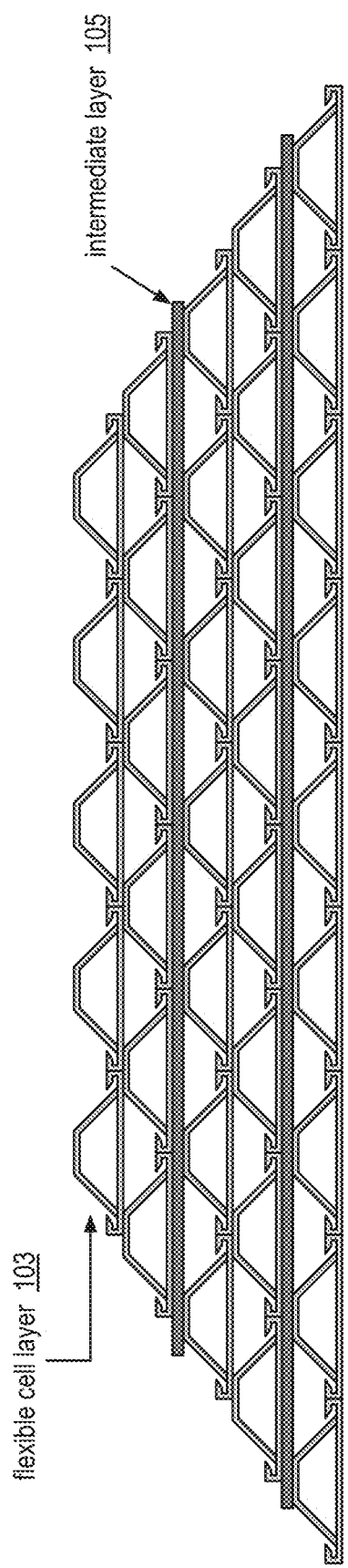
FIG. 21Y is a side view of a layer of components in accordance with the present invention.
Figure 21A:
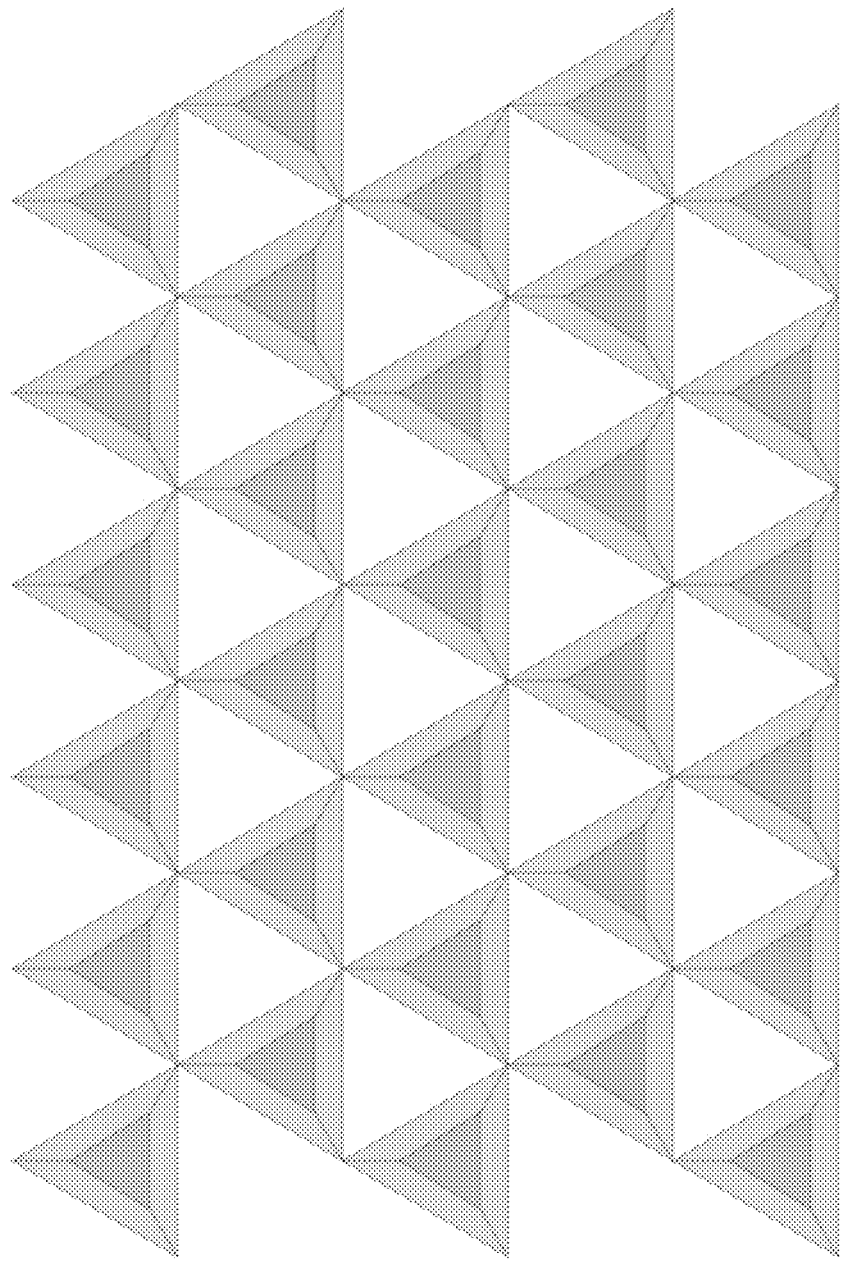
Figure 21A:
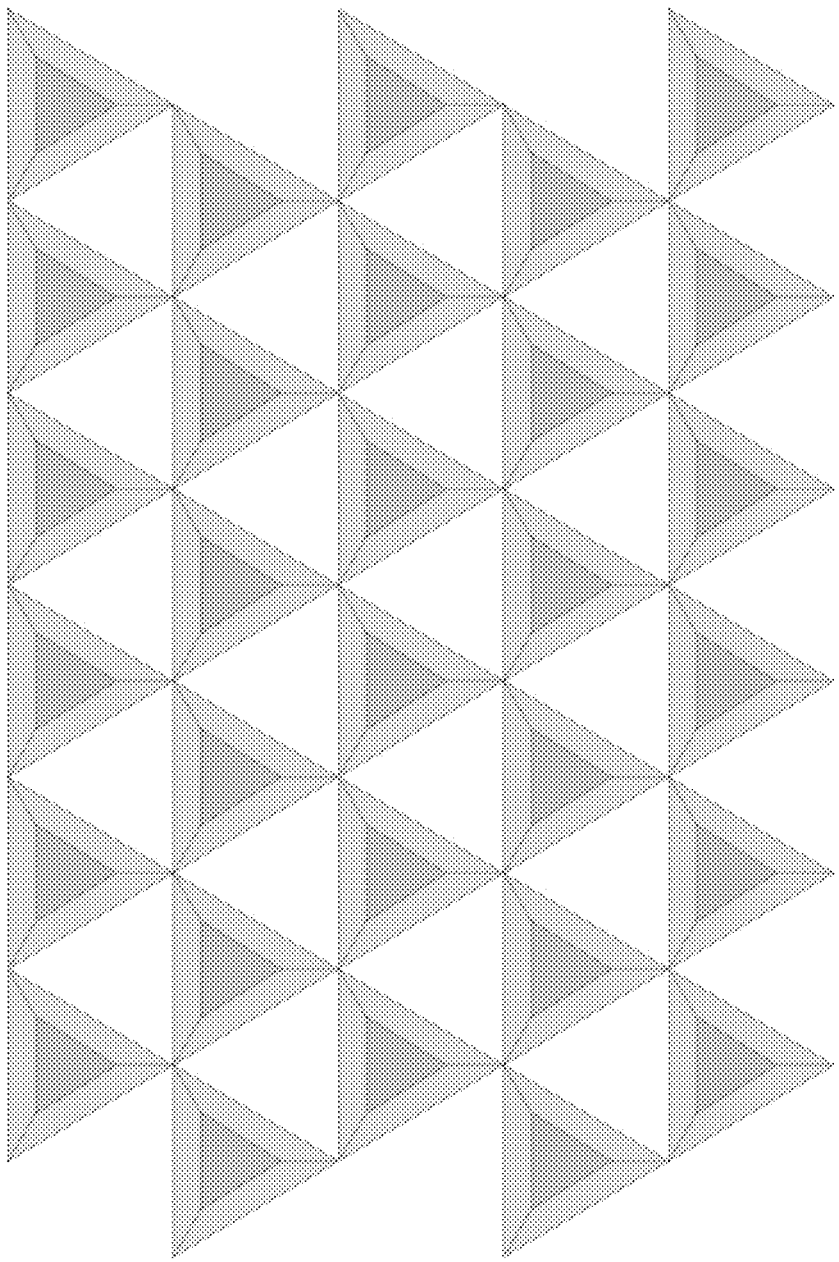
Figure 21A:
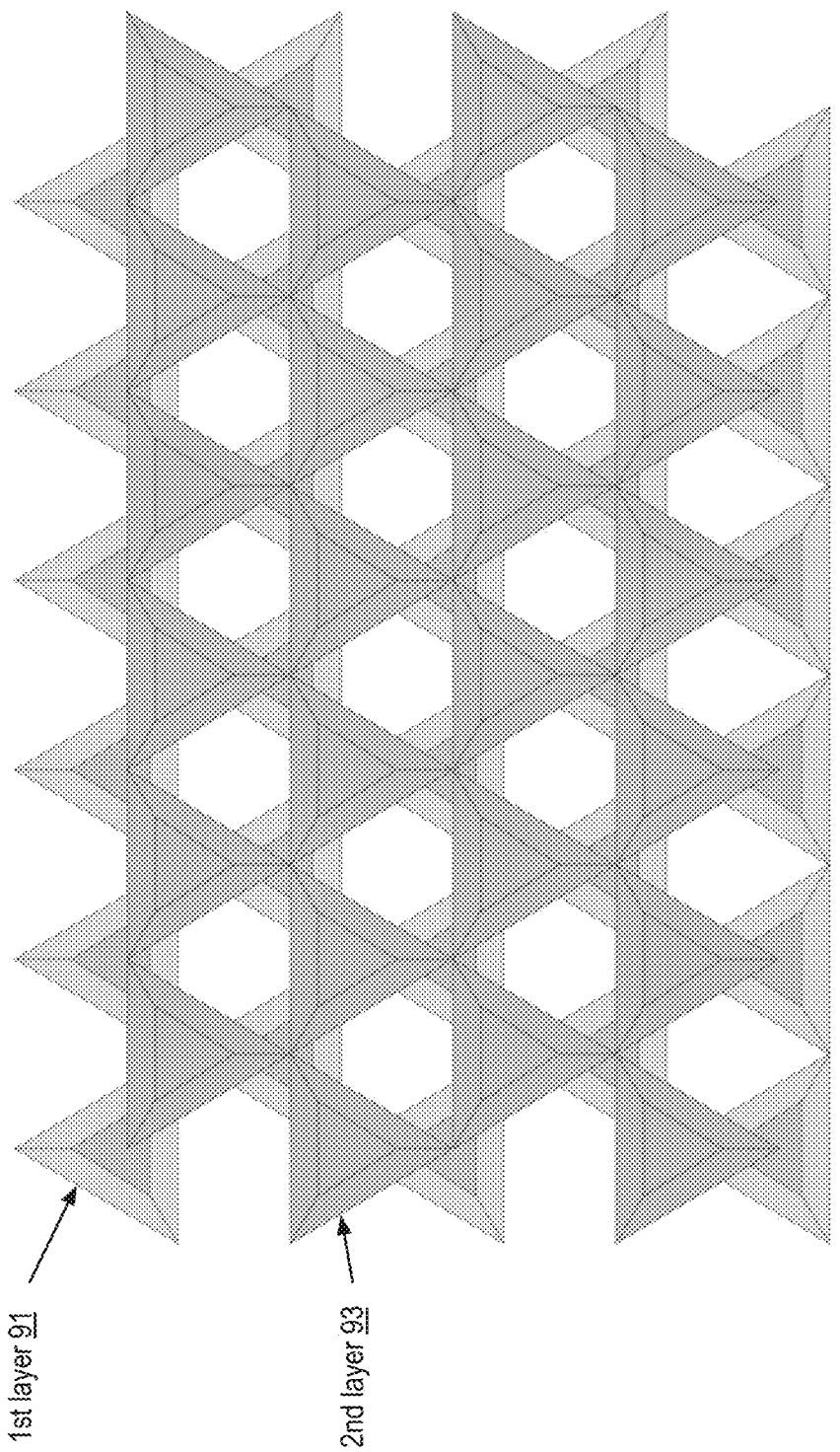

FIG. 21Y is a side view of layers 103 of flexible cells or components. The cells are compressible cells as discussed with reference to FIGS. 21W and 21X. Intermediate layers 105 are between one or more flexible cell layers 103. In this example, intermediate layers 105 are between the second and third flexible cell layers 103 and between the fourth and fifth flexible cell layers 103.

FIGS. 21Z-21AB are top, front, and side view diagrams of another defusing cell or component that has a triangular shape. The cell may be of any size (i.e., height, width, perimeter, and/or distance between the top and base surfaces) and/or of any material composition provided the side walls of the components are angled and the top surface area is less than the base surface area.

The distance "d" between the top surface area and the base surface area ranges from 1/32 of an inch to multiple inches, depending on the application of the body impact protection system. The angled side wall(s) are at an angle of $\theta$ with respect to the horizontal axis, where the angle is in the range of 25 degrees to 89 degrees. Depending on the angle $\theta$ and the distance "d", the base surface area is two or more times larger than the top surface area, where the top surface area is 1/256 square inches to tens of square inches depending on the application of the body impact protection system.

The cell is constructed (e.g., molded, press-formed, printed, etc.) of a material composition that includes one or more of a rubber material, a foam material, a padding material, a plastic material, a gel material, a carbon fiber material, a cloth material; a polyester material, a moisture absorbing material, a moisture wicking material and a silicon material. A characteristic of the material composition is that the cell retains the angle θ within +/−33% and retains the ratio of Ai (i.e., the base surface area) to Ao (i.e., the top surface area) to within +/−33%. Distance "d" may decrease while the impact force is being applied, but substantially returns to its pre-impact force value when the impact force is removed.

FIG. 21AC is a top view of a layer of the triangular components of FIGS. 21Z-21AB. With the triangular shape of the cells, the layer can be formed around complex surfaces (e.g., a head, an arm, an elbow, etc.).

FIG. 21AD is a top view of another layer of the triangular components of FIGS. 21Z-21AB. In this example, the layer would be used for any layer but the one closes to the body part. For the inner most component layer, there should be as few gaps between cells and possible, and each impacted cell should, as evenly as possible, distribute the force across its base surface area.

FIG. 21AE is a top view of another layer of the triangular components of FIGS. 21Z-21AB. In this example, the layer would be used for any layer but the one closes to the body part and is a complimentary layer to the layer of FIG. 21AD.

FIG. 21AF is a top view of two overlapping layers of components of FIGS. 21AD and 21AE. The first layer 91 is that of FIG. 21AD and the second layer 93 is that of FIG. 21 AE. When a cell of the second layer 93 receives an impact force, it spreads the dampened and defused impact force to three cells of the first layer 91.

FIG. 22 is a schematic block diagram, in a side view, of a portion of another embodiment of a layer of a body impact protection system 10. The portion includes a $1^{st}$ spherical component 90 of a first layer of the system 10 and two spherical components 92 and 94 of a second layer of the system 10. Each of the spherical components 90-94 is comprised of a material composition that will substantially maintain a spherical shape (e.g., up to 25% compression) when an impact force 96 is exerted on the components. For example, the spherical components are comprised of a rubber material, a plastic material, stainless steel, aluminum, and/or a carbon fiber material. Further, the spherical components 90-94 may be solid or hollow.

In an example, the first component 90 receives an impact force 96 and collides with the second and third components 92 and 94 at first and second collision angles 98 and 100, respectively. As a result of the collision between the first and second components, the second component 92 creates a $1^{st}$ normal force component 28-1 and a $1^{st}$ tangential force component 30-1. As a result of the collision between the first and third components, the third component 94 creates a $2^{nd}$ normal force component 28-2 and a $2^{nd}$ tangential force component 30-2.

If each of the first and second collision angles 98 and 100 is 45 degrees and the $1^{st}$ component 90 impacts the $2^{nd}$ and $3^{rd}$ components equally, then each of the second and third components receives ½ of the impact force at an angle of 45 degrees. Accordingly, the normal force components produced by each of the second and third components is 0.5*F*sin θ, where F is the impact force 96 and θ is the collision angle. As such, when the first spherical shaped object collides with the two or more second spherical shaped objects, a multi-dimensional collision is created that dampens and defuses the impact force 96.

Protective headgear (e.g., a helmet) was originally created to reduce the risk of skull fractures, but was not designed to reduce the incidence of concussion. Since the turn of the $21^{st}$ century, a helmet's ability to mitigate the incidence of concussions has been studied and, as a result, improvements have been made in helmets. It is generally accepted in the medical field that a concussion occurs as a result of a rapid acceleration and deceleration of the brain against the skull.

When object (e.g., another person's body part, another helmet, the ground, a ball, etc.) collides with protective headgear (e.g., a helmet) it produces an impact force that results in three collisions. The first collision is between the object and the helmet as shown in FIG. 23A, the second collision is between the helmet and the skull as shown in FIG. 23B, and third collision is between the skull and the brain as shown in FIG. 23C. The helmet includes an outer shell 77 and padding 79 and the head is shown generically to include a brain 75.

FIG. 23A illustrates, in a cross section front view, of an embodiment of a helmet at the instant it collides with an object. The average impact force created by the object colliding with the helmet is $F_1$. The reactive force of the helmet, which includes the force dampening of the padding 79 and the surface wave dissipation of the outer shell 77, which is designated $F_3$. The resulting force applied to the skull is $F_2$.

The average impact force $F_1$ of the object is calculated as m*a, where "m" is the mass of the object and "a" is the deceleration of the object as a result of the collision. Note that if the object is the ground, then mass and deceleration are of the person wearing the helmet. The deceleration is calculated as $v^2/2*d$, where "d" is impact distance (i.e., the distance the object travels from the start of the collision until the collision is over), and "v" is velocity at the instant of collision.

FIG. 23B illustrates, in a cross section front view, the helmet to skull collision. In this collision, the padding 79 of the helmet is compressed as a result of the impact force $F_1$. The force exerted on the skull $F_2$ is equal to the negative of the impact force $F_1$ minus the reactive force $F_3$ of the helmet. In equation form, $F_2=-(F_1-F_3)$. As such, the greater $F_3$, the less force $F_2$ that exerted on the skull.

FIG. 23C illustrates, in a cross section front view, the skull to brain collision. In this collision, the brain has a force $F_5$ exerted on it, which is the force exerted on the skull $F_2$ less the reactive force of the cerebrospinal fluid $F_4$. In equation form, $F_5=-(F_2-F_4)$. Via substitution, $-F_5=-(F_1-F_3)-F_4$. Thus, by reducing $F_2$ (i.e., the force on the skull), which is accomplished by increasing $F_3$ (i.e., the reactive force of the helmet), the force on the brain $F_5$ is reduced, which should reduce the risk of a concussion.

As previously discussed, however, current helmet testing protocols are based on G-Force measurements taken via a drop test and/or via a projectile test. As also previously discussed, G-Force is a ratio of deceleration versus earth's gravitational field. Many assumptions in the helmet testing are made to equate G-Force to reducing the impact force on the brain $F_5$. One assumption that is made in the testing is the mass of the object or the player. In testing, an 11 pound headform, which includes an accelerometer in its core, wears the helmet as the drop test and/or projectile test are performed.

Another assumption is that the impact force F1 and the force exerted on the skull F2 are average forces and evenly distributed across the entire surface of the helmet and head, respectively. In actuality and as discussed with reference to FIG. 1, the impact force F1 is received in a very small area of the helmet and a conventional helmet does little to expand the impact area as it reaches the skull. Thus, even if the G-Force measurements are in acceptable ranges and F2 seems relatively mild, a concussion can still result of the skull impact area is small (e.g., less than a few square inches) and the risk for concussion increases as the skull impact area decreases.

FIG. 23D is a schematic block diagram, in a side view, of an embodiment of a helmet 115 that includes a body impact protection system 10. In general, the helmet 115 includes an outer layer, an inner layer, and an impact force dampening and defusing structure. The outer layer includes a first material composition and has a geometric shape to form an exterior surface of the helmet. The inner layer includes a second material composition and, when the helmet is worn, the inner layer is adjacent to a head. In an embodiment, the outer layer includes a rubber material and/or a plastic material and the inner layer includes a foam material and/or a gel material.

The impact force dampening and defusing structure is positioned between the inner layer and the outer layer. It includes a plurality of components arranged into more or more layers. The layer(s) of components function to reduce pressure on the head from a collision with an object. For example, the collision with the object creates an impact force on the outer layer of the helmet in a given area (e.g., a helmet impact area). Layer by layer, the components dampen the impact force and diffuse it over a larger and larger area. Thus, when the impact force reaches the head, it has been substantially reduced and spread out over a larger area creating a low impact pressure to substantially reducing the risk of concussion and the severity of a concussion if one did occur.

FIG. 23E is a schematic block diagram, in a side view, of a portion of an embodiment of a helmet 115 that includes a force dampening and defusing outer shell 117, force dampening and defusing layers 121, dampening viscous layers 123, and a padding layer 125. The dampening and defusing layers 121 includes four layers of cells, or components 16. The dampening viscous layers 123 include gel and/or padding that further dampens the impact force in both the linear direction and rotational direction as will be discussed in greater detail with reference to FIGS. 23F and 23G. The force dampening and defusing outer shell 117 includes a plurality of cells, or components 16, that are laminated, encased, or impregnated with a rubber material, a plastic material, and/or other material to create a smooth, but compressible surface.

The cells of the outer shell 117 and the cells of the force dampening and defusing layers 121 convert the external impact force, which is exerted on the helmet in an outer surface impact area 119, into a substantially reduced impact force spread out over a much larger area (i.e., the body impact area 127). The impact force is further reduced by the dampening viscous layers 123.

As an example, the side wall angle θ for the cells of each layer is 45 degrees, the mass of the player wearing the helmet is 200 pounds, is traveling at 16 miles per hour (mph), and collides head first with an object and has an impact distance of 1.25 inches. Further, the dampening factor of each layer of the viscous layers is 0.667 and the dampening factor of the padding layer is 0.5. From these parameters, $F_2 \cong (0.707)^5 * F_1 * (0.667)^{(5-1)} * 0.5 = 0.017 * F_1$.

The 200-pound player creates a G-Force of 82 G's, which is borderline concussion level based on research that suggests a concussion in football can occur from an impact that produces a G-Force of 100 g's+/−30 g's. This equates to an external impact force F1 of 16.4K force-pounds and, as result of the dampening of the helmet, creates a head impact force F2 of about 290 force-pounds. With a conventional helmet that does not increase the impact area, an impact area of 0.375 square inches yields an impact pressure of 770 PSI. In contrast, the helmet with the dampening and defusing system 10, produces an impact pressure of about 36 PSI. 36 PSI presents substantially less risk of an injury than 770 PSI, even though both have the same G-Force measurements and head impact force.

FIG. 23F is a schematic block diagram, in a side view, of a portion of an embodiment of a helmet of FIGS. 23D and 23E. In this illustration, the helmet is receiving an angular impact force. In conventional helmets, this creates a rotational force that studies suggest increase the risk of injury.

FIG. 23G is a schematic block diagram, in a side view, of the portion of the helmet of FIG. 23F. In this illustration, the viscous layers 123 slide along the force dampening and defusing layers 121 to dampen the angular and rotational forces produced by the angular impact force.

FIG. 24A is a schematic block diagram, in a side view, of an embodiment of a chest protector 135 that includes a body impact protection system 10. The chest protector 135 may be used for baseball, football practice, hockey, motor-cross, mountain bicycling, riot gear, combat gear, and/or other applications where the chest needs to be protected from impacting objects. Further, the materials and implementation of the body impact protection system 10 create flexible chest protector 135 that allow for form fitting and movement with the person wearing the chest protector.

In general, the chest protector 135 includes an outer layer, an inner layer, and an impact force dampening and defusing structure. The outer layer includes a first material composition and has a geometric shape to conform to the shape of a human torso. The inner layer includes a second material composition and, when the chest protector is worn, the inner layer is adjacent to the chest. In an embodiment, each of the inner layer and the outer layer includes a rubber material, a foam material, a padding material, a plastic material, a gel material, a carbon fiber material, a cloth material, a polyester material, a moisture absorbing material, a moisture wicking material, and/or a silicon material. In an embodiment, the first and second material compositions are the same. In another embodiment, the first and second material compositions are different.

The impact force dampening and defusing structure 137 is positioned between the inner layer and the outer layer. It includes a plurality of components arranged into more or more layers. The layer(s) of components function to reduce pressure on the chest from a collision with an object. For example, the collision with the object creates an impact force on the outer layer of the chest protector in a given area (e.g., a system impact area). Layer by layer, the components dampen the impact force and diffuse it over a larger and larger area. Thus, when the impact force reaches the chest, it has been substantially reduced and spread out over a larger area creating a low impact pressure to substantially reducing the risk of injury and the severity of an injury if one did occur.

FIG. 24B is a schematic block diagram, in a side view, of an embodiment of a chest protector 135 that includes a vest 141 and a plurality of dampening and defusing sheets 139. A dampening and defusing sheet 139 includes one or more component layers and may further include the inner layer and/or the outer layer. Further, the sheet 139 may have a variety of top or front view perimeter shapes (a front view is the shown the present figure). Still further, each dampening and defusing sheet 139 has an overall width and an overall height, where the overall width is in the range of 1 inch to 10 inches or more and the overall height is in the range of 1 inch to 8 inches or more.

The vest 141 has a shape corresponding to the torso and is comprised of a foam material, a padding material, a cloth material, a polyester material, a moisture absorbing material, and/or a moisture wicking material. The vest 141 includes a plurality of receptacles for receiving the plurality of dampening and defusing sheets 139. For example, the vest 141 includes a plurality of re-sealable pockets for receiving the sheets 139. In another example, the vest 141 includes pockets that, once the sheets are inserted, are sealed.

The size and positioning of the sheets 139 are on the vest 141 may vary based on the application of the chest protector 135. Further, the outer layer of the sheets may include a bullet-proof material when the chest protector is used in combat or as riot gear. Still further, the area around the heart may include a special sheet that includes more component layers than other sheets, may include a different outer layer than other sheets, and/or may include a different inner layer than other sheets to provide more protection for the heart than other parts of the torso.

FIG. 25 is a schematic block diagram, in a side view, of an embodiment of a knee protection apparatus 151 that includes an outer layer 153, an inner layer 155, and a force dampening and defusing structure 157. The outer layer 153 includes a first material composition and has an exterior surface that includes a substantially planer area. The first material composition includes a rubber material, a foam material, a padding material, a plastic material, a gel material, a carbon fiber material, and/or a silicon material.

The inner layer 155 includes a second material composition and has a shape corresponding to the shape of a knee. The second material composition includes a rubber material, a foam material, a padding material, a plastic material, a gel material, a cloth material, a polyester material, a moisture absorbing material, a moisture wicking material, and/or a silicon material. Note that the inner layer is adjacent to the knee when the knee protection apparatus 151 is worn.

The force dampening and defusing structure 157 is positioned between the inner layer 155 and the outer layer 153. From the front and side views, the force dampening and defusing structure 157 has a shape corresponding to a difference between the shapes of the inner and outer layers. In particular, the structure 157 includes components 16 that are arranged to reduce pressure on the knee when a force is applied to the outer layer. As shown, to achieve the desired shape of the structure 157, some components are longer than others.

The substantially planar area of the outer layer 153 allows the knee protection apparatus to have a large impact area with the ground or other surface on which the knee protection apparatus will be used. As shown in FIG. 27, the planar area 161 has, from a front view perspective, a rectangular shape, but could have a different polygonal shape. In the cross-section view the player area 161 provides a flat surface on which to kneel. As is further shown, the outer layer 153 also includes a concave area 163 that at least partially encompassing the substantially planer area.

FIG. 26 is a schematic block diagram, in a side view, of another embodiment of a knee protection apparatus 151 that includes an outer layer 153, an inner layer 155, a multi-layered force dampening and defusing structure 157, and an intermediate layer 159. The intermediate layer 159 includes a third material composition that includes a rubber material, a foam material, a padding material, a plastic material, a gel material, a carbon fiber material, and/or a silicon material.

The multi-layer force dampening and defusing structure 157 includes one layer of components between the inner layer 155 and the intermediate layer 159 and includes a second layer of components between the intermediate layer 159 and the outer layer 153. From the front and side views, the first layer of components has a shape corresponding to a difference between the shapes of the inner and intermediate layers. In particular, the first layer of components 157 includes components 16 that are arranged to reduce pressure and where some components are longer than others.

The second layer of components includes that are arranged to further reduce pressure and the components are of the same size. Note that the outer layer 153 may have a configuration as described with reference to FIG. 27.

FIG. 28 is a schematic block diagram, in a side view, of an embodiment of a body limb protection apparatus 165 that includes an outer layer 171, an inner layer 169, and a force dampening and defusing structure 173 that includes one or more component layers. The outer layer 171 including a first material composition and has an exterior surface that includes a substantially planer area 167.

The inner layer 169 includes a second material composition and has a shape corresponding to a body limb portion 175 (e.g., knee, shin, elbow, ankle, forearm, upper arm, thigh, calf, etc.). When the apparatus 165 is worn on the body limb portion, the inner layer 169 is adjacent to the body limb portion.

The force dampening and defusing structure 173 is positioned between the inner layer 169 and the outer layer 171 and includes a plurality of layers of components. For an example of multiple component layers, an inner layer, and an outer layer, refer to FIG. 15. The apparatus 165 functions to reduce pressure on the body limb portion when a force is applied from an impacting object (e.g., a baseball, a helmet, the ground, etc.). On a layer by layer basis, the apparatus dampens and defuses the impact force such that, by the time it reaches the body part, the impact force is substantially attenuated and distributed over a large area.

FIGS. 29A and 29B are side and top views of a layer of components 16 arranged in a pattern 181 to produce a layer of an impact force dampening and defusing structure. In this embodiment, the components have a flat-top pyramid shape and are arranged in a pattern 181 of rows and columns. A component 16, from the side view of FIG. 29A, includes angled side walls, a top surface area (e.g., away from the body part), a base surface area (e.g., towards the body part), and a distance "d" 74. The distance "d" is the distance between the top surface area and the base surface area and ranges from $\frac{1}{32}$ of an inch to multiple inches depending on the application of the body impact protection system. The angled side walls are at an angle of $\theta$ with respect to the horizontal axis, where the angle is in the range of 25 degrees to 89 degrees. Depending on the angle $\theta$ and the distance "d", the base surface area is two or more times larger than the top surface area, where the top surface area is $\frac{1}{256}$ square inches (e.g., $\frac{1}{16}$ by $\frac{1}{16}$) to tens of square inches depending on the application of the body impact protection system.

The components are placed on an inner or intermediate layer that is flexible and allows each cell to move independently. This allows sheets of layers to be flexible and form fitting to a particular body part. Such layers of components may be molded, casted, printed, etc. as individual pieces and then adhered to the supporting layer. Alternatively, a layer of components is produced via or molding, casting, printing, etc. as a single piece.

FIG. 30 is a schematic block diagram, in a side view, of an embodiment of a force defusing inert 185 for use in a variety of impact protection gear (e.g., as thigh pads, as shoulder padding, as rib padding, as shin padding, as elbow padding, etc.). The insert includes one or more layers of components 16, an outer layer 171, an inner layer 169, and an encasing 191. The one or more layers of components 16, an outer layer 171, an inner layer 169 are implemented in accordance with one or more embodiments previously discussed and/or as subsequently discussed. Note that the outer layer is on the impact receiving side 187 of the insert 185 and the inner layer 169 is on the impact defusing side 189.

The encasing 191 houses the one or more layers of components 16, an outer layer 171, an inner layer 169 and is comprised of one or more materials that are flexible, provides additional padding, are moisture wicking, and/or are moisture absorbent. For example, the encasing 191 is comprised of a foam material, a padding material, a gel material, a cloth material, a polyester material, a moisture absorbing material, and/or a moisture wicking material.

FIG. 31 is a schematic block diagram, in a side view, of another embodiment of a force defusing inert 185 that is similar to the one of FIG. 30 with the addition of a second component layer, an intermediate layer 195, and a padding layer 193. The two layers of components 16, the outer layer 171, the inner layer 169, the intermediate layer 195, and the padding layer 193 are implemented in accordance with one or more embodiments previously discussed and/or as subsequently discussed.

FIG. 32 is a schematic block diagram, in a side view, of another embodiment of a force defusing inert 185 that includes eight layers of components 16, seven intermediate layers 195, the outer layer 171, the inner layer 169, and the encasing 191. The various elements of this insert 185 are implemented in accordance with one or more embodiments previously discussed and/or as subsequently discussed.

FIG. 33 is a schematic block diagram, in a side view, of another embodiment of a force defusing inert 185 that includes a plurality of layers of components 16 (five in this example, but could be more or less), an inner layer 169, an outer layer 171, and an encasing 191. In this embodiment, the layers of components are in direct contact with each other (i.e., no intermediate layers). The various elements of this insert 185 are implemented in accordance with one or more embodiments previously discussed and/or as subsequently discussed.

FIGS. 34 and 35 are side and front views of another embodiment of two force defusing layers for use in an impact protection system. The first layer includes $1^{st}$ spherical objects 110 and the second layer includes $2^{nd}$ spherical objects 112. Each layer is arranged in an array that, from layer to layer, is complimentary. Each of the spherical objects 110-112 is comprised of a material composition that will substantially maintain a spherical shape (e.g., up to 25% compression) when an impact force is exerted on the objects. For example, the spherical objects are comprised of a rubber material, a plastic material, stainless steel, aluminum, and/or a carbon fiber material. Further, the spherical objects 110-112 may be solid or hollow. Still further, the material composition is such that, as a result the collision, the magnitude of the impact force is reduced.

In an example, one or more objects of the first spherical objects 110 receives an impact force and collides with two or more objects of the second spherical objects 112 at collision angles, respectively. As a result of the collision between spherical objects of the first and second spherical objects 110 and 112, each of the impact spherical objects of the second spherical objects 112 92 creates a normal force component and a tangential force component.

If each of the first and second collision angles is 45 degrees and the spherical object of the first spherical objects 110 impacts the two or more objects of the second spherical objects 112 equally, then each of the objects in the second spherical objects receives an equal portion of the impact force at an angle of 45 degrees. Accordingly, the normal force components produced by each of the impacted spherical objects of the second spherical objects 112 is $1/x*F*\sin \theta$, where F is the impact force, x is the number objects in the second layer of spherical objects that are impacted, and $\theta$ is the collision angle.

FIG. 36 is a schematic block diagram, in a side view, of another embodiment of a force defusing layers for use in an impact protection system that includes the first and second layers of spherical objects of FIGS. 34 and 35 and further includes an inner padding layer 116 and an outer layer 114. Note that the first spherical objects 110 and the second spherical objects 112 are of substantially identical spherical shapes, where the spherical shapes include a sphere, an ellipsoid, and/or a spheroid.

The outer shell 114 is juxtaposed to the first layer of spherical objects 110 and is comprised of a material as used for other outer layers as described herein. The inner padding layer 116 is juxtaposed to the second layer of spherical objects 112 and is towards the body part being protected. The inner padding layer 116 is comprised on a material composition that includes a rubber material, a foam material, a padding material, a gel material, a cloth material, a polyester material, a moisture absorbing material, and/or a moisture wicking material.

FIG. 37 is a schematic block diagram, in a side view, of another embodiment of a force defusing layers for use in an impact protection system that is similar to one of FIG. 36 with the addition of a third layer of spherical objects 118. A spherical object of the third layer 118 has a sphere shape, an ellipse shape, and/or a spheroid shape. The spherical object is comprised of a rubber material, a plastic material, stainless steel, aluminum, and/or a carbon fiber material. Further, the third spherical objects 118 may be solid or hollow. Still further, the material composition of the third spherical object is such that, as a result the collision, the magnitude of the impact force is reduced.

FIG. 38 is a schematic block diagram, in a side view, of another embodiment of a force defusing layers for use in an impact protection system that is similar to one of FIG. 36 with the addition of a fill material 120. The fill material 120 at least partially encases at least some of the first spherical objects 110 and at least some of the second spherical shaped objects 112. The fill material has a force dampening property (e.g., a force dampening ratio of 0.5 to 0.95) and is comprised of a rubber material, a foam material, a padding material, and/or a gel material.

FIG. 39 is a schematic block diagram, in a side view, of another embodiment of a force defusing layers for use in an impact protection system that is similar to one of FIG. 38 with the addition of a padding layer 122. The padding layer 122 force dampening property (e.g., a force dampening ratio of 0.5 to 0.95) and is comprised of a rubber material, a foam material, a padding material, and/or a gel material.

FIG. 40 is a schematic block diagram, in a side view, of an example of an impact protection system that includes a plurality of component layers 50 54 60-64, an outer layer 24, an inner layer 12, and a plurality of intermediate layers 52 66-70. While the present example shows 5 component layers and 4 intermediate layers, the system could have more or less component layers and/or more or less intermediate layers.

Each component layer 50 54 60-64 includes a first layer of spherical objects 110 and a second layer of spherical objects 112 as described with reference to FIGS. 34 and 35. When a force 96 impacts the outer layer, the component layers, on a layer by layer basis dampens and defuses the impact force 96. The intermediate layers 52 66-70 may further reduce the impact force such that, by the time the impact reaches the body part, it is substantially attenuated and spread out over a large area. The gray shaded spheres depict the diffusing of the impact force over a large and larger area with each layer.

FIG. 41 is a schematic block diagram, in a side view, of another example of force diffusion via force defusing layers for use in an impact protection system, which is similar to the one of FIG. 40 with the subtraction of the intermediate layers. As, each layer of spherical objects are in direct contact with the next layer. The gray shaded spheres depict the diffusing of the impact force 96 over a large and larger area with each layer such that, by the time it reaches the inner layer 12, it has been spread out over a large area.

FIG. 42 is a schematic block diagram, in a side view, of another embodiment of a force defusing layers for use in an impact protection system that includes a first component layer 50, a second component layer 54, an intermediate layer 52, and an inner padding layer 116. The first component layer 50 includes a first layer of spherical objects 110 and a second layer of spherical objects 112. The second component layer 54 also includes a first layer of spherical objects and a second layer of spherical objects, but are larger than the first and second layer spherical objects 110 and 112.

FIGS. 43A-43C are schematic block diagrams, in a side view, of examples of impact force dampening and diffusion via force defusing layers of an impact protection system. FIG. 43A depicts the embodiment of FIG. 38 just prior to impact. FIG. 43B illustrates the embodiment of FIG. 38 having a rigid outer shell 114 that bows a little due to the impact force. Even though the outer shell does not bow much, a majority of the impact force is still applied to the spheres closest to the impact area. FIG. 43C illustrates the embodiment of FIG. 38 having a softer outer shell 114 bows due to the impact force. With the bowing the outer shell 114, the impact force is applied to the spheres within the impact area.

FIGS. 44 and 45 are top and side views of another embodiment of a force defusing layers for use in an impact protection system. In this embodiment, spherical objects or components are grouped to produce an individual component group. Each component group is a separate piece that can be individually places to create various patterns and/or configurations. The groups 130 can be configured into layers 132, which can be stacked to create further patterns for the protection system.

The impact protection system described herein has been directed towards the use of protecting body parts from injury due to an impact with an object. The impact protection system works equally well to protect parts of animals from an impacting object. The impact protection system further works to inanimate things from impacting objects, from being dropped during shipping, etc.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A defusing cell comprises:
a plurality of walls physically connected together to form a first perimeter having a first surface area and a second perimeter having a second surface area, wherein a wall of the plurality of walls has a length, wherein the first perimeter is separated from the second perimeter by a distance based on the length and an angle of the wall with respect to the first to second perimeters, wherein the second perimeter is larger than the first perimeter, wherein the plurality of walls form a hollow center region, and wherein when the first perimeter receives an impact force, an impact pressure applied across the first surface area is greater than the impact pressure applied to the second perimeter across the second surface area based on the angle of the wall and the second surface area being greater than first surface area; and
a plurality of spheroid elements within the hollow center region, wherein the plurality of spheroid elements is arranged in a desired pattern to distribute and disperse the impact force impacting the defusing cell from the second perimeter with respect to the first perimeter, wherein the plurality of spheroid elements substantially maintain the desired pattern when the impact force is impacting the defusing cell.

2. The defusing cell of claim 1 further comprises:
a first surface coupled to the plurality of walls along the first perimeter.

3. The defusing cell of claim 1 further comprises:
a second surface coupled to the plurality of walls along the second perimeter.

4. The defusing cell of claim 1, wherein a spheroid element of the plurality of spheroid elements comprises:
one or more materials formed into a prolate spheroid;
one or more materials formed into a sphere;
one or more materials formed into an ovoid;
one or more materials formed into a cylinder;
one or more materials formed into a cone; or
one or more materials formed into an arc.

5. The defusing cell of claim 1, wherein the plurality of spheroid elements comprises:
a first layer of spheroid elements; and
a second layer of spheroid elements, wherein the first layer of spheroid elements is positioned closer to the first perimeter than the second layer of spheroid elements, wherein a spheroid of the first layer of spheroids makes contact with at least spheroids of the second layer of spheroids when an impact force is applied to the defusing cell.

6. The defusing cell of claim 1 further comprises:
a suspension material within the hollow center region to substantially hold the plurality of spheroid elements in a desired pattern when negligible impact force is applied to the defusing cell.

7. The defusing cell of claim 1 further comprises:
the plurality of walls being constructed of one or more materials that substantially maintain a desired shape of the defusing cell when the impact force is impacting the defusing cell.

* * * * *